US008360474B2

(12) United States Patent  (10) Patent No.: US 8,360,474 B2
Lurie  (45) Date of Patent: Jan. 29, 2013

(54) WHEELED CART FOR CARRYING AND SECURING SNOWSPORTS EQUIPMENT AND PERSONAL ITEMS, AND BUSINESS METHODS AND SYSTEMS FOR VENDING SAME

(75) Inventor: Martin S. Lurie, Denver, CO (US)

(73) Assignee: Ski Carriers LLC.

( * ) Notice: Subject to any disclaimer, the term of this patent is extended or adjusted under 35 U.S.C. 154(b) by 1098 days.

(21) Appl. No.: 10/854,410

(22) Filed: May 25, 2004

(65) Prior Publication Data

US 2008/0111330 A1 May 15, 2008

Related U.S. Application Data

(60) Provisional application No. 60/545,457, filed on Feb. 17, 2004, provisional application No. 60/473,592, filed on May 25, 2003.

(51) Int. Cl.
 *B62B 1/26* (2006.01)
(52) U.S. Cl. ..................................... 280/814; 280/47.26
(58) Field of Classification Search .................. 280/814, 280/815, 47.2, 47.24, 47.26, 47.33
 See application file for complete search history.

(56) References Cited

U.S. PATENT DOCUMENTS

| 3,210,787 A * | 10/1965 | Allsop ......................... 12/120.5 |
| 3,590,608 A * | 7/1971 | Smyth et al. ...................... 70/15 |
| 3,838,585 A * | 10/1974 | Foote ............................... 70/18 |
| 4,165,027 A * | 8/1979 | Briggs ......................... 294/147 |
| 4,268,050 A * | 5/1981 | Kennedy, Sr. ................. 280/814 |
| 4,746,159 A * | 5/1988 | Webb et al. ................... 280/814 |
| 4,779,362 A * | 10/1988 | Citrowske ...................... 36/132 |
| 4,792,073 A * | 12/1988 | Jacober ......................... 280/814 |
| 4,856,811 A * | 8/1989 | Bressler et al. .............. 280/652 |
| 4,968,060 A * | 11/1990 | Rooney ......................... 280/814 |
| 5,106,112 A * | 4/1992 | Sargent ..................... 280/47.26 |
| 5,282,535 A * | 2/1994 | Rowland .................... 206/315.1 |
| 5,340,153 A * | 8/1994 | Parker ....................... 280/47.24 |
| 5,639,122 A * | 6/1997 | Churchill ..................... 280/814 |
| 6,070,906 A * | 6/2000 | Allen ........................... 280/814 |
| 6,158,762 A * | 12/2000 | Wong .......................... 280/47.2 |

* cited by examiner

*Primary Examiner* — Frank Vanaman

(57) ABSTRACT

A two-wheeled cart for carrying snowsports equipment including skis, boots, poles, snowboards, helmets and personal items is disclosed. The cart incorporates a weather-resistant security compartment to serve as a locker for storing street shoes and personal items. The cart has a collapsed mode for compact storage, a narrow-travel mode for use on shuttle buses, and a fully-deployed mode. The mass distribution on a loaded cart is such that the load is balanced, leaving very little vertical load on the user's pulling hand. To secure the cart while it is left unattended, users lock the cart to some structure close to the ski lift by means of an incorporated locking cable and locking mechanism. Additional locking cables provide security against theft of equipment left on the cart. Business methods for renting the carts from ski resort parking lots and other locations are disclosed.

13 Claims, 49 Drawing Sheets

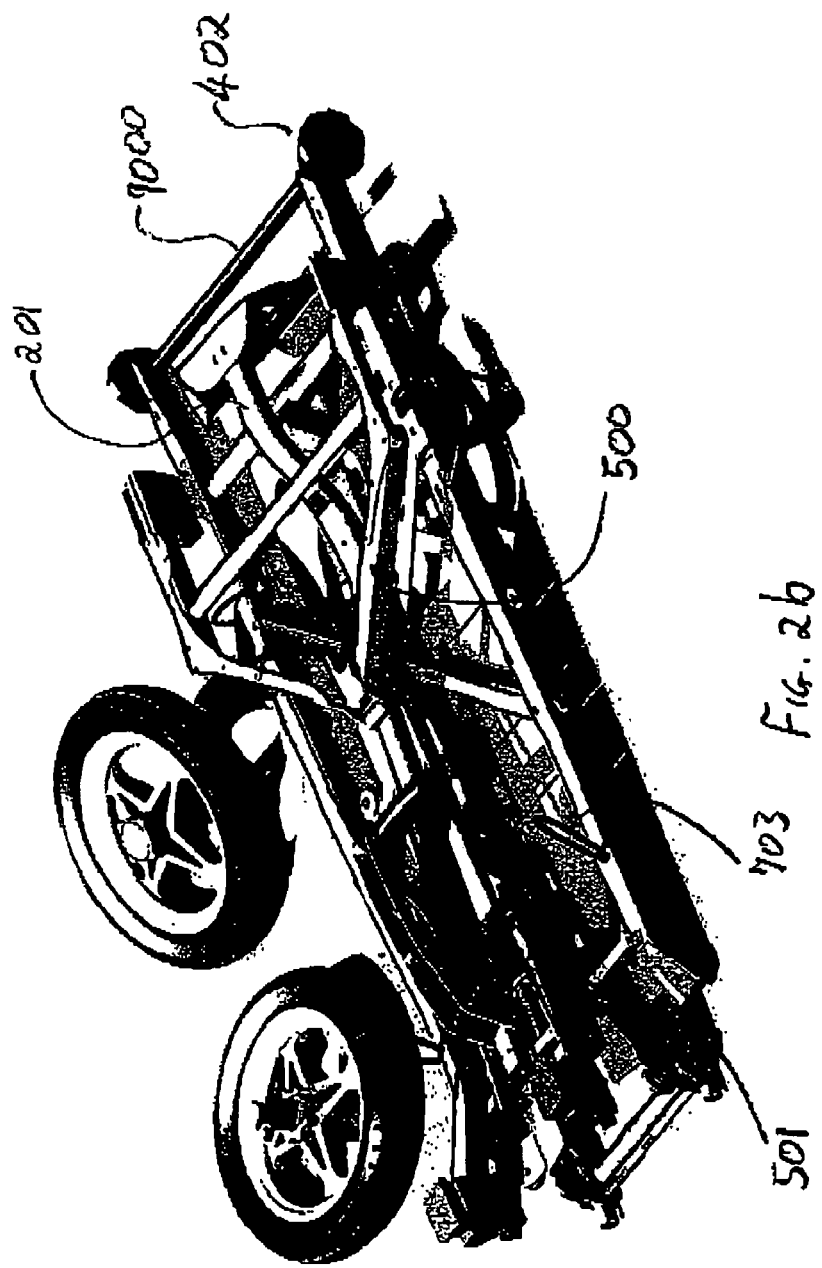

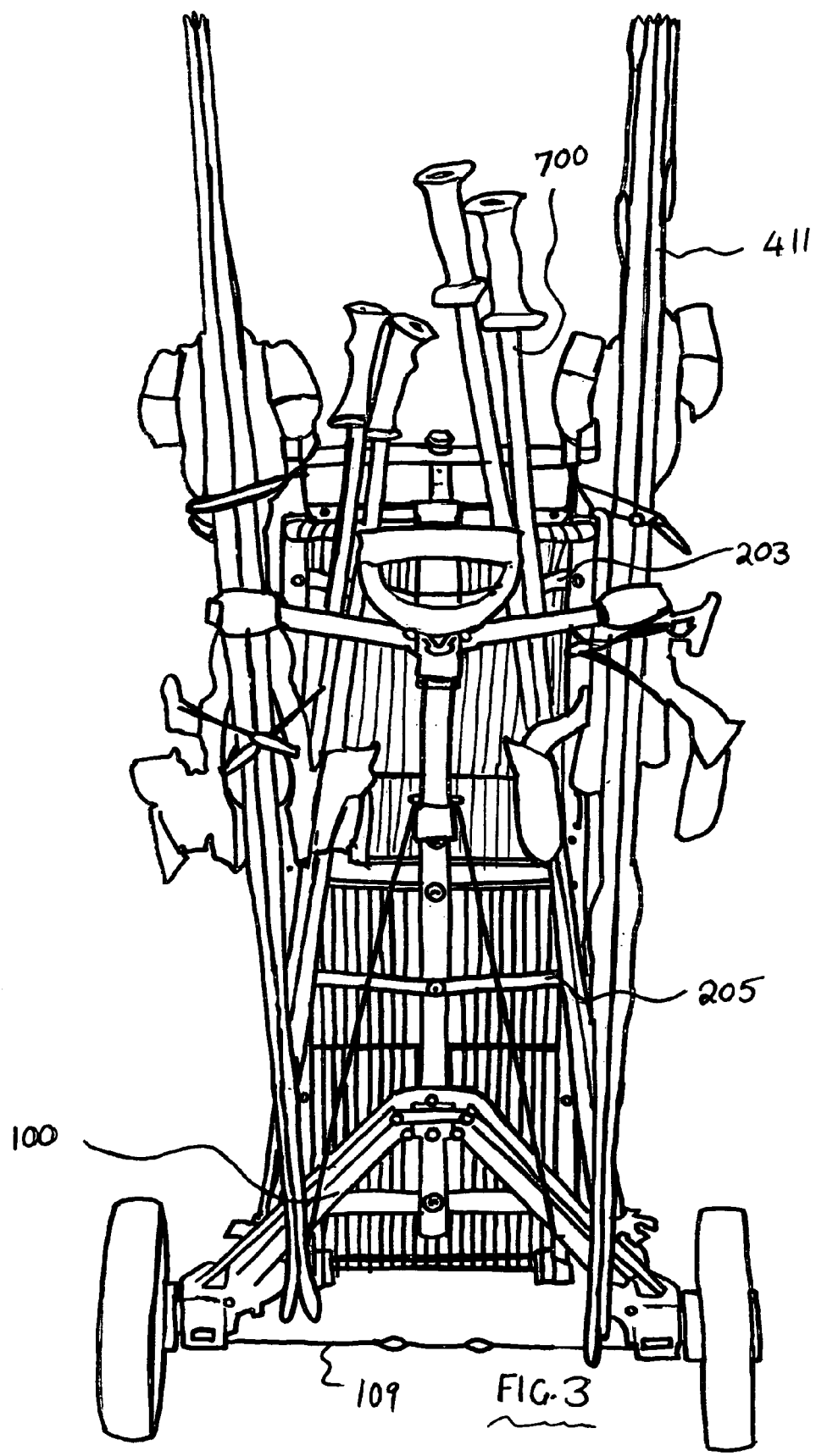

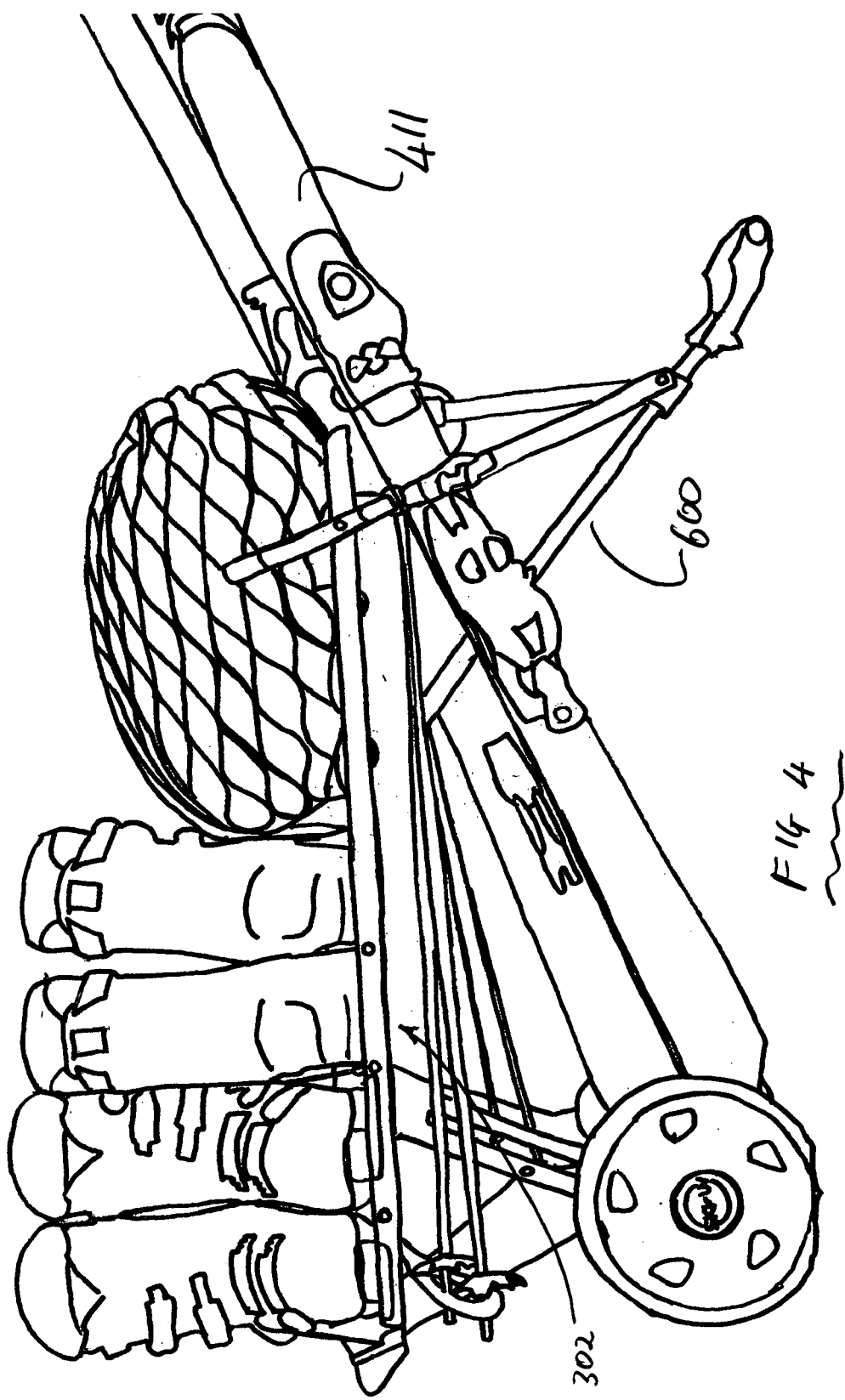

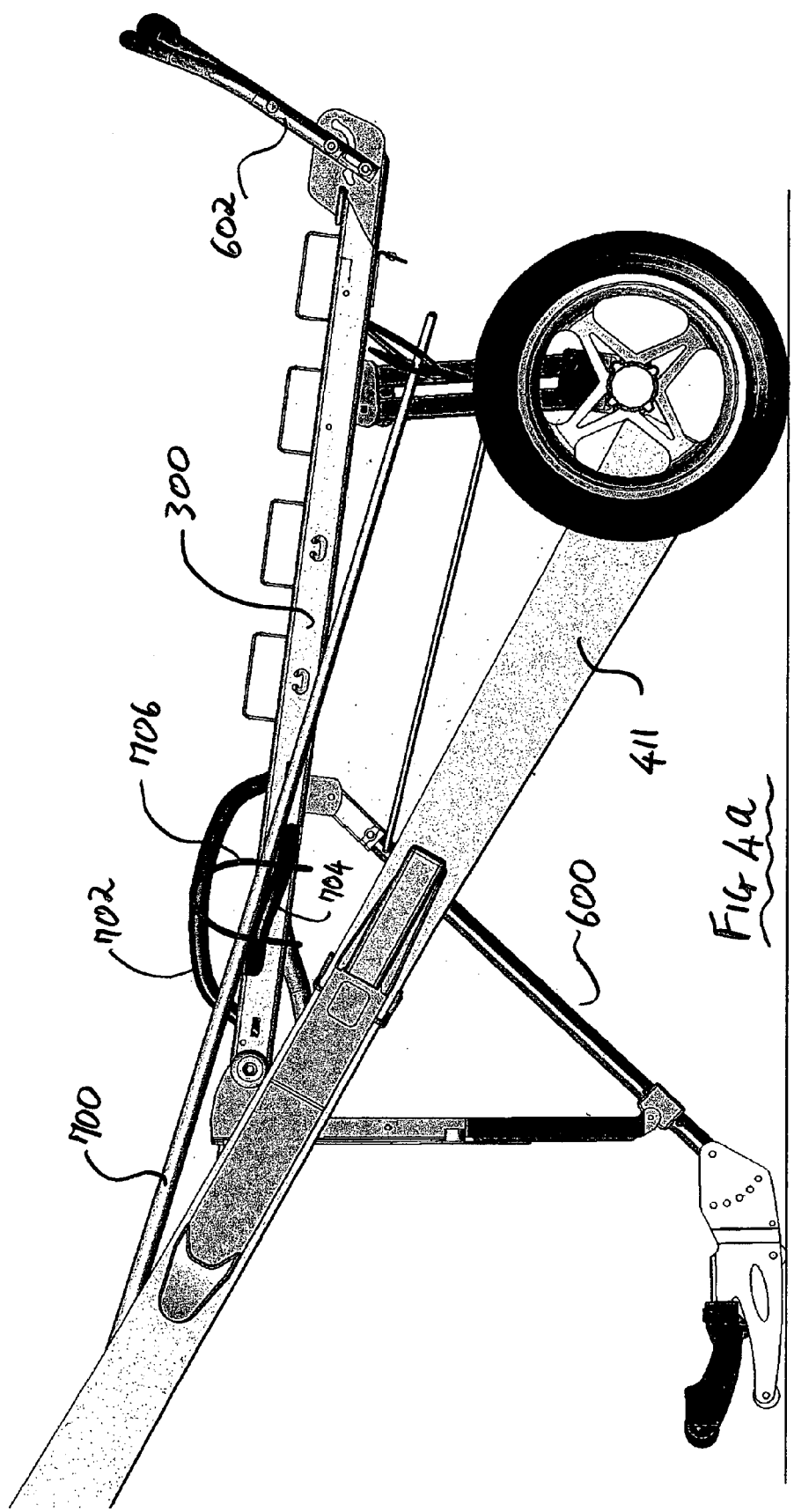

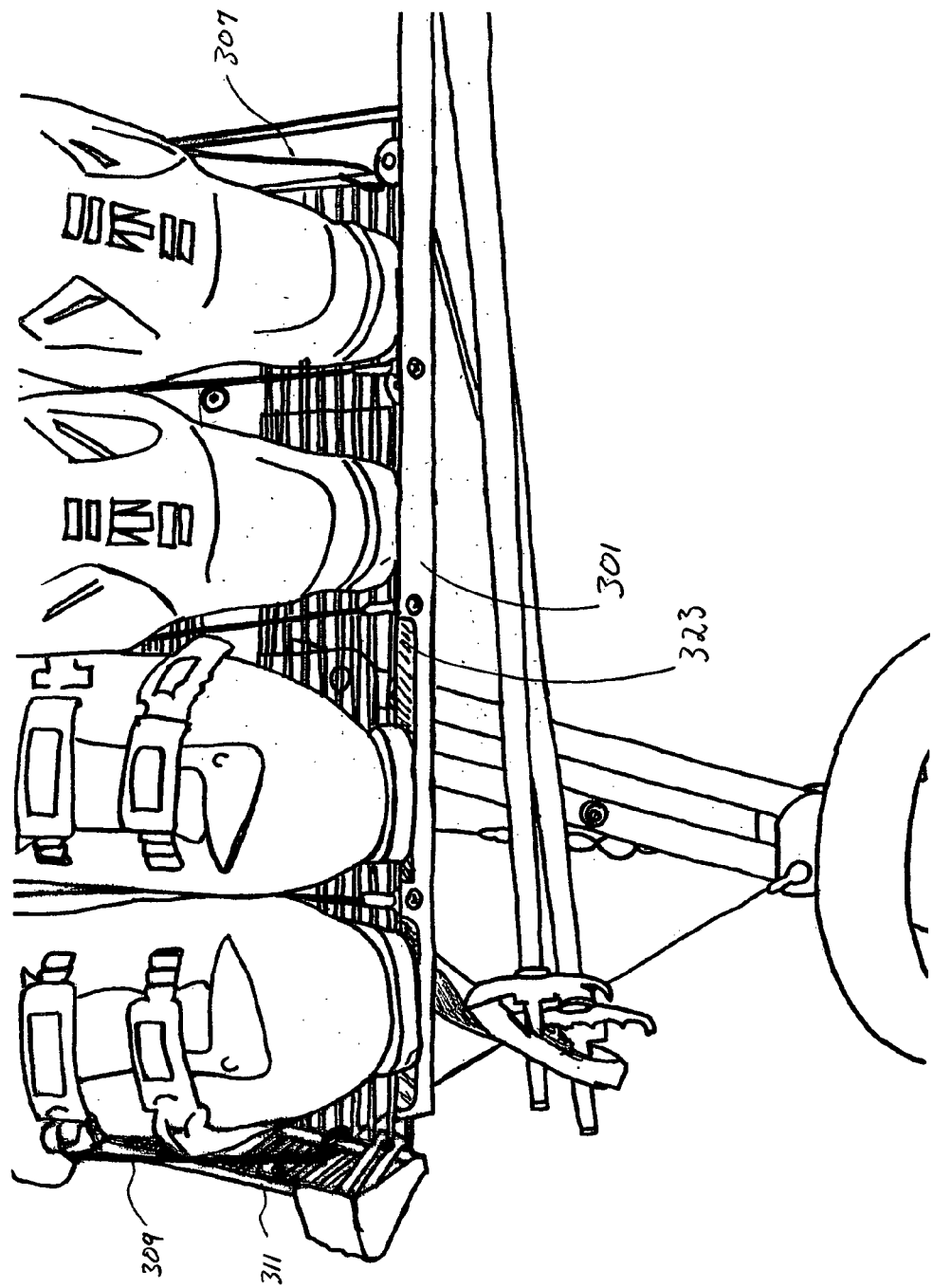

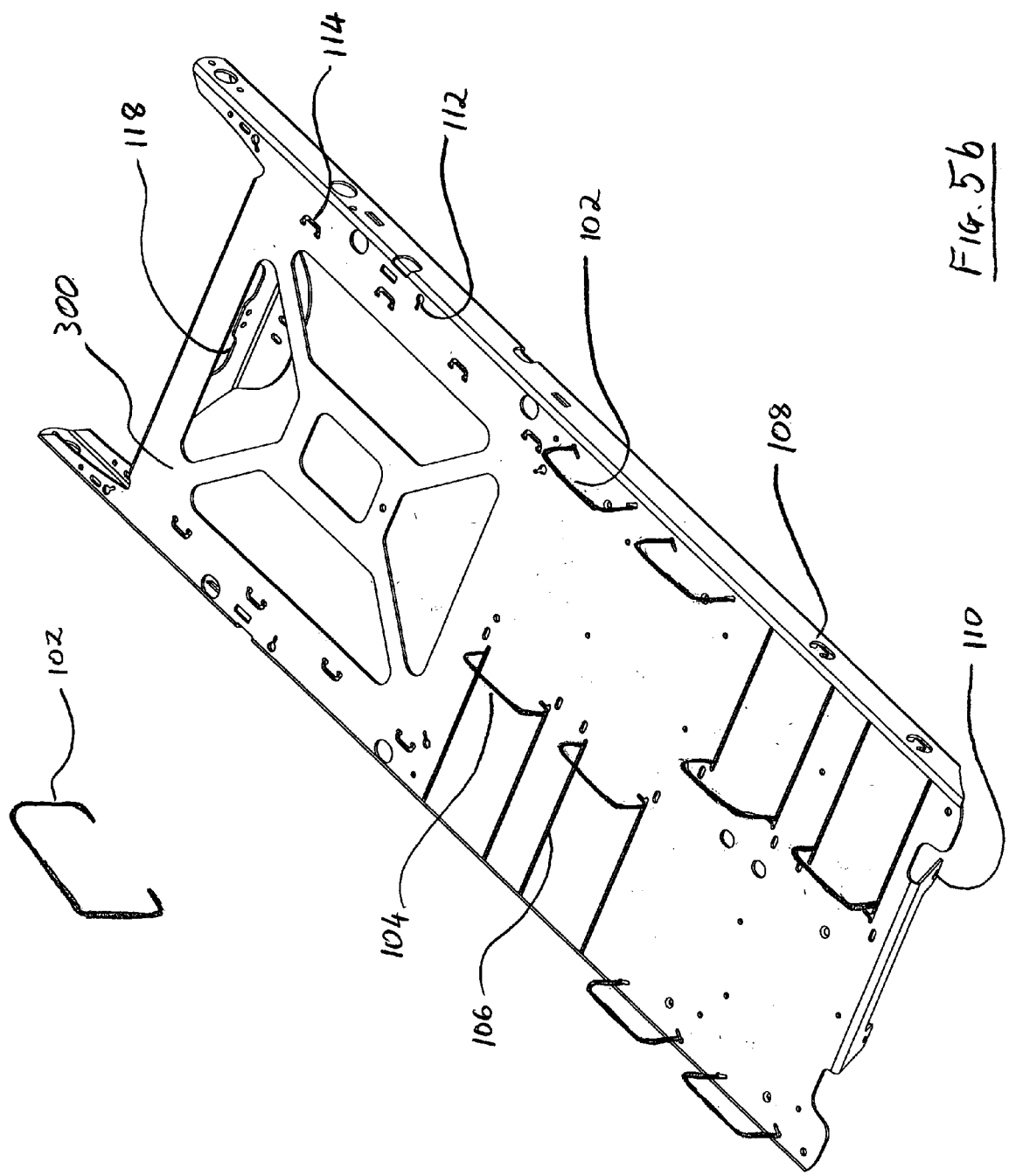

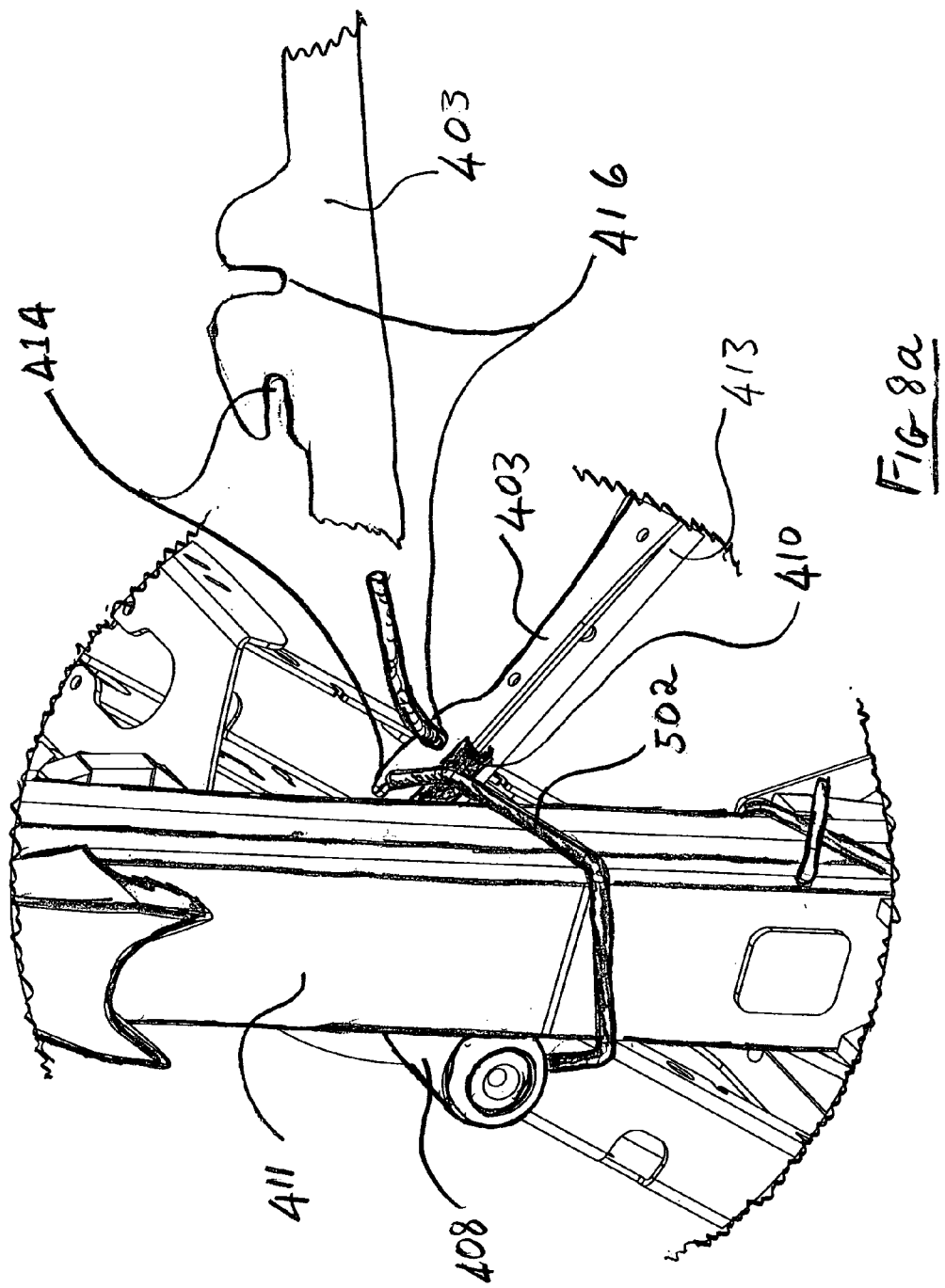

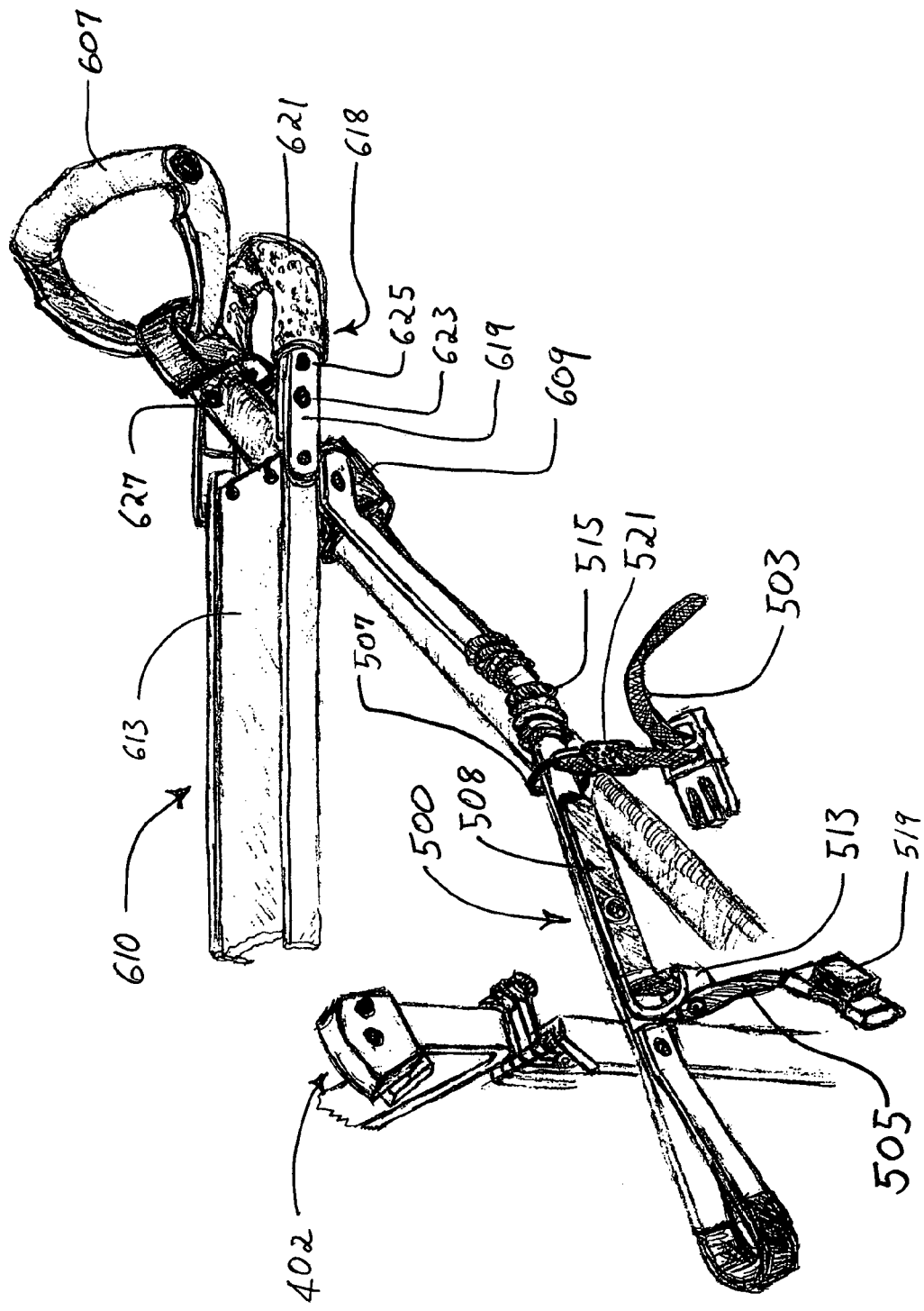

Figure 1:
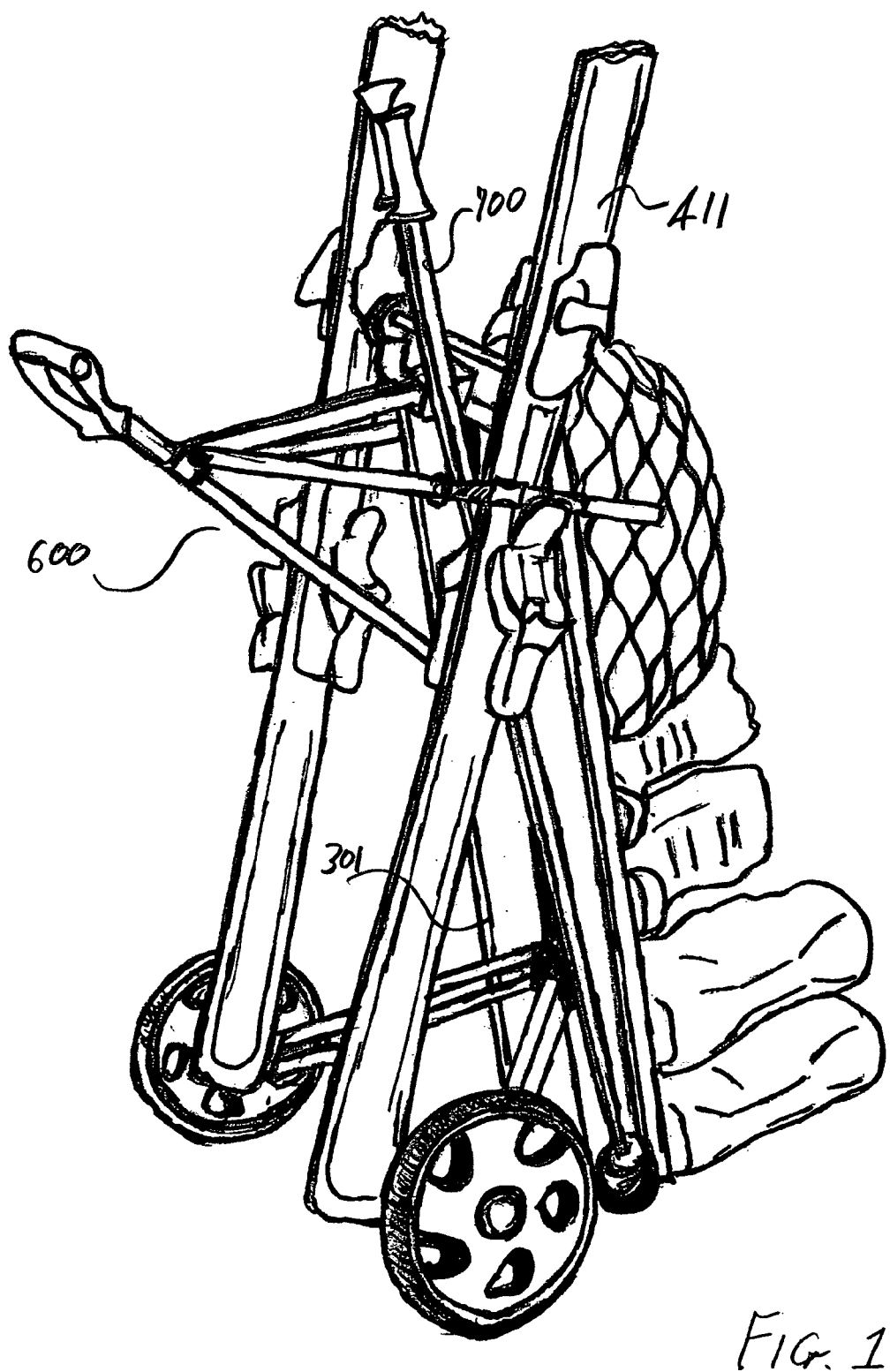

WHEELED CART FOR CARRYING AND SECURING SNOWSPORTS EQUIPMENT AND PERSONAL ITEMS, AND BUSINESS METHODS AND SYSTEMS FOR VENDING SAME

CROSS-REFERENCE TO RELATED APPLICATIONS

This application claims the benefit of U.S. Provisional Application No. 60/473,592, filed May 25, 2003, and Provisional Application No. 60/545,457, filed Feb. 17, 2004.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention is part of the field relating to portable devices for carrying and storing ski equipment and accessories. More particularly, the invention relates to wheeled hand-carts used to assist in these and other functions.

2. Description of Related Art

Many skiers find that having to walk to a ski lift in ski boots while carrying their skis is uncomfortable at best, and painful and exhausting for many participants of the sport. Apparently as a consequence of this experience, many devices have been proposed to ease access to the slopes for many of those whose have to carry their equipment to the ski lift during any walk that takes longer than two or three minutes.

Prior-art devices incorporating wheels for carrying ski equipment may conveniently be classified into two kinds. One kind would be those that use the carried ski equipment as a structural element, usually by attaching wheels and brackets or straps to the skis. Another kind would be the type where a structurally self-sufficient wheeled cart may be loaded with some or all of the equipment capable of being carried by the device, without the need for any of the carried equipment to serve as a structural element of the assemblage.

Yet another useful classification of the related art would be to divide devices for carrying ski equipment into one class in which the user must bear a substantial portion (perhaps half) of the weight of the carried equipment, and another class in which the intended mode of use is to pull the cart along with the weight of the loaded cart substantially balanced about the axis of its wheels, leaving very little vertical weight for the user to bear.

A further important class is those devices which do not carry ski boots, but instead require the user to either walk in the ski boots or else carry the boots independently of the device.

In all the classes above, devices have previously been proposed that would provide some means of securing at least some of the ski equipment and/or allow small personal items to be stored on the device.

However, it appears that none of the previous devices have succeeded in providing an elegant device that would allow a user to expend very little effort in pulling along a balanced load, carry all ski equipment and accessories, and serve as a secure and dry mobile locker that may be locked near the ski lift, in which skiers may leave their street shoes and other items that are not immediately needed.

ADVANTAGES

Aspects and features of the invention—referred to here as a "cart"—are described under the headings below.

a. Equipment Carrying Features:

The cart:

i. Carries two sets of ski equipment (skis, poles, and boots) or two sets of snowboard equipment (boards and boots) or one set of ski equipment and one set of snowboard equipment, in the fully loaded configuration.

ii. In a partially loaded configuration, can carry any subset of the load combinations described above without being out of balance or becoming unstable.

iii. Carries clothing and accessories in a waterproof bag.

iv. Requires no adjustment to accommodate skis up to about 200 cm in length and all but the longest commonly available snowboards. Can accommodate all sizes of ski and snowboard boots.

v. Requires no adjustment to fit with most types and sizes of ski or snowboard bindings, or with different thicknesses of skis and snowboards.

vi. Will carry all widths of skis and snowboards in the correct position without needing adjustment.

vii. Secures all pieces of equipment firmly so that items will not shake loose or fall off.

b. Security Features:

The present cart embodiment;

i. Serves as a locker located at the slope-side ski racks.

ii. An integrated security compartment can store street shoes, clothing and other possessions while the unit is left unattended.

iii. Has locking cables to lock skis, poles and snowboards to the frame to help prevent theft of these items.

iv. Incorporates a coiled locking cable that secures the unit itself to a ski rack, pole or other suitable tethering point.

v. Achieves all these securing functions using a single standard padlock.

vi. Is configured so that the unit can easily be tethered where it is in full view of skiers resting at slope-side facilities, serving as a deterrent to tampering.

c. Modes of Use:

In this embodiment, the cart serves a range of purposes and functions effectively in a number of different conditions. The cart:

i. Allows for much easier, faster and safer access to and from the slopes by carrying all one's ski equipment and accessories while letting users walk in street shoes rather than ski boots.

ii. Can easily be pulled and maneuvered in corridors, through standard doorways, on tarmac, over the uneven gravel of ski resort parking lots, on packed snow and through up to six inches of fresh snow.

iii. Is configured so that two adults can carry a fully-loaded cart up or down stairs and around corners in stairwells.

iv. Can be used on parking-lot shuttle buses: skis detach easily for stowing on the outside of the bus, and then a single movement folds the cart into the configuration of a dolly to wheel the rest of the load in the confined spaces of the bus aisle.

v. Keeps boots dry and retains warmth by carrying them between a waterproof cover that stretches over all four boots and a vinyl sheet underneath.

vi. Folds up flat for transport in the trunk of a sedan or for storage, facilitated by removable wheels and a collapsible mesh security bag constructed from flexible aircraft cable.

vii. Can serve between ski trips as a compact organizer for storing boots, poles, helmets and accessories by transferring the folded and partially loaded cart directly from the car to hooks on the garage wall.

viii. Is suitable for a range of compact storage configurations in vending situations.

ix. Offers the possibility of advertising space on a banner mounted on the outside of the security bag.

Ease of Use:

The cart:

x. Exerts negligible vertical load on one's pulling hand, because in the walking position the design puts the center of gravity directly over the wheel axles.

xi. Does not require any special skill to pull, since the walking position keeps the tips of long skis well clear of the back of the puller's head and shoulders.

xii. Allows for easy removal and reloading of any piece of ski equipment, since skis or poles do not form part of the cart's structure.

xiii. Adjusts from ski-carrying to snowboard-carrying mode by the simple flip of a lever, with no change needed for switching between ski boots and snowboard boots.

xiv. Secures boots firmly in individual harnesses, so that heavy boots do not rattle about, and a separate boot bag is not needed.

xv. Has boot harnesses that will accept boots slung in pairs from commonly-used carry-straps.

xvi. Places the boot deck at a convenient height and horizontal orientation for boot mounting and dismounting, when the unit is tipped forward to rest on its handle.

xvii. Is stable for traversing sloping ground, making toppling unlikely on any surface graded for access by people walking in ski boots.

xviii. Is stable for any order of loading, when loaded on level ground.

xix. Eliminates the need for the wide clearance zone required for shoulder-carried skis, since the cart holds skis in a more or less vertical orientation when being pulled along and when at rest. This reduces the danger of injury from flailing skis and poles.

xx. Uses familiar clips and buckles for holding skis and boots in place.

xxi. Folds down with the release of one clip, and each wheel can be detached or attached by flipping a lever.

xxii. Is constructed with materials for buckles, connectors and moving joints that repel water and are resistant to freezing together.

xxiii. Has instruction decals positioned close to the functions they address, as well as a pull-out instruction card tucked under the upper platform.

xxiv. Employs color-coded decals and fittings to help show users how different features work.

xxv. Can have the cloths for the security bag liner and the outer banner selected from a range of colors, so that users are able to identify their unit among others on the ski racks by the particular color combination.

xxvi. Can be hosed down to wash away mud and slush.

d. Economy of Small-Volume Manufacture:

The current embodiments are designed to allow economical manufacture in smaller production runs than would typically be required for mass production of this type of product. These versions:

i. Use the type of undercarriage and main tube commonly found on collapsible pull-carts sold for carrying golf bags. Any mass-produced golf pull-cart that has parallelogram-style undercarriage arms, removable wheels and is sufficiently robust can be adapted to the configuration described here.

ii. Do not require any injection-molded or cast components for their manufacture.

BRIEF SUMMARY OF THE INVENTION

A two-wheeled cart for carrying snowsports equipment including skis, boots, poles, helmets and personal items is disclosed. The cart incorporates a weather-resistant security compartment to serve as a locker for storing street shoes and personal items. The cart has a collapsed mode for compact storage, a narrow-travel mode for use on shuttle buses, and a fully-deployed mode. The mass distribution on a loaded cart is such that the load is balanced, leaving very little vertical load on the user's pulling band. To secure the cart while it is left unattended, users lock the cart to some structure close to the ski lift by means of an incorporated locking cable and locking mechanism. Additional locking cables provide security against theft of equipment left on the cart.

DESCRIPTION OF THE INVENTION

The subject invention is a two-wheeled pull cart for carrying snowsports equipment. The cart provides security for the equipment and incorporates a security compartment to store street shoes and personal items. The embodiments described here incorporate components of mass-produced golf carts available from third party distributors in order to make production of relatively small quantities of the product economically feasible.

Two embodiments of the invention's main structure are described in this filing. Embodiment X ("Emb. X" in the text) is most suitable for small-scale production since the main structural components, and in particular the main platform, are fabricated from standard bar or sheet materials. Embodiment Y ("Emb. Y" in the text) is most suitable for larger-scale production since the main structural components are fabricated from formed sheet materials.

Embodiment Y does not incorporate fittings and mounts for carrying snowboards, but such fittings may be added along the lines of the fittings shown in Embodiment X. Note that common mechanical elements such as fasteners, pins and washers are usually not shown in the figures for Embodiment X, but the holes through which they fit have been shown.

In cases where the text does not identify whether the figure relates to Embodiment X or Embodiment Y, the classification may be found by inspection and comparison with other figures.

LIST OF FIGURES

Figure 1A:
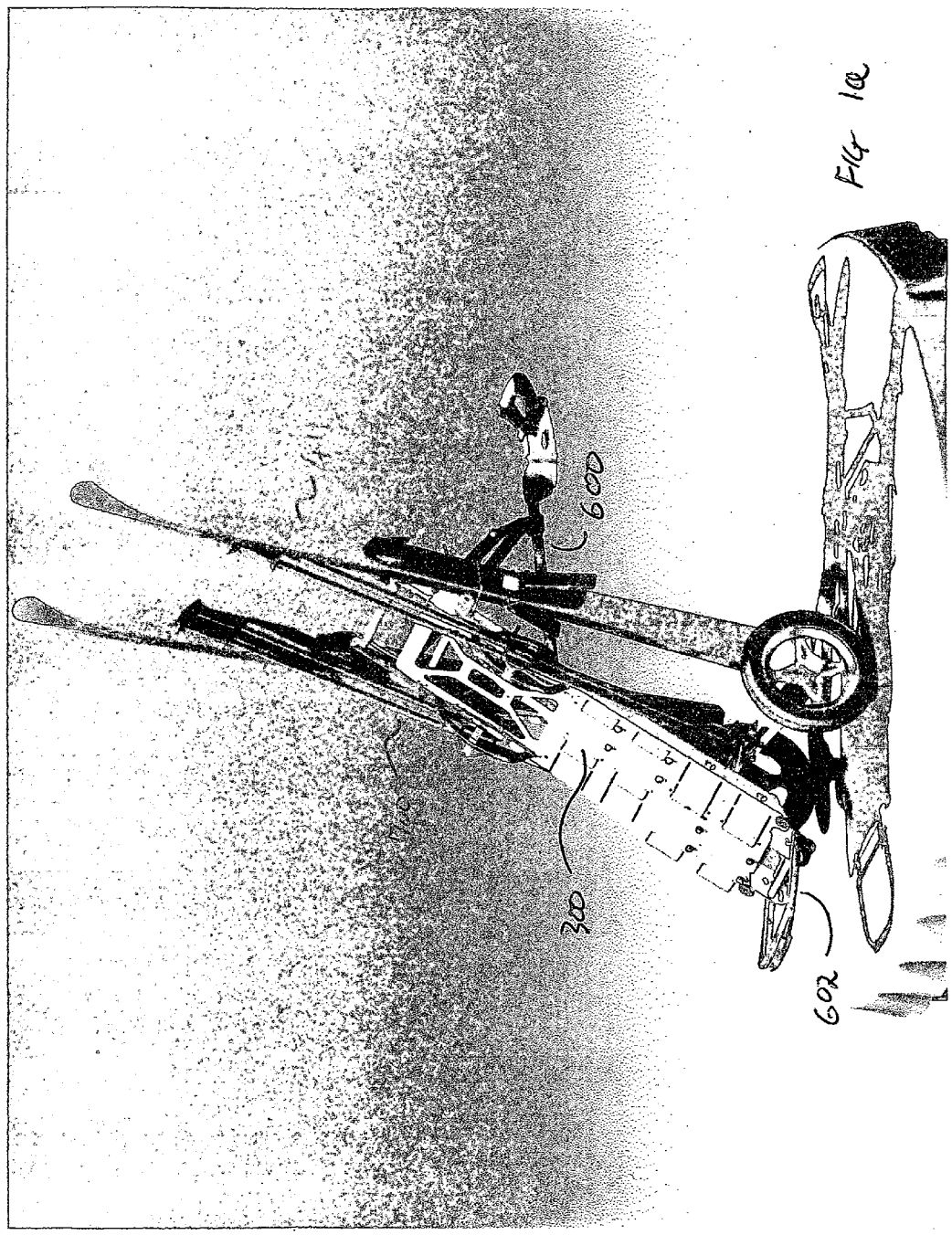

FIG. 1 Loaded, general view.
FIG. 1a Partially Loaded, general view, Emb. Y
FIG. 2 Loaded, general view from rear.
FIG. 2a Folded for transport or storage, side view, Emb. Y
FIG. 2b Folded for transportation or storage, underside. Emb
FIG. 3 Loaded, general view from front.

Figure 3A:
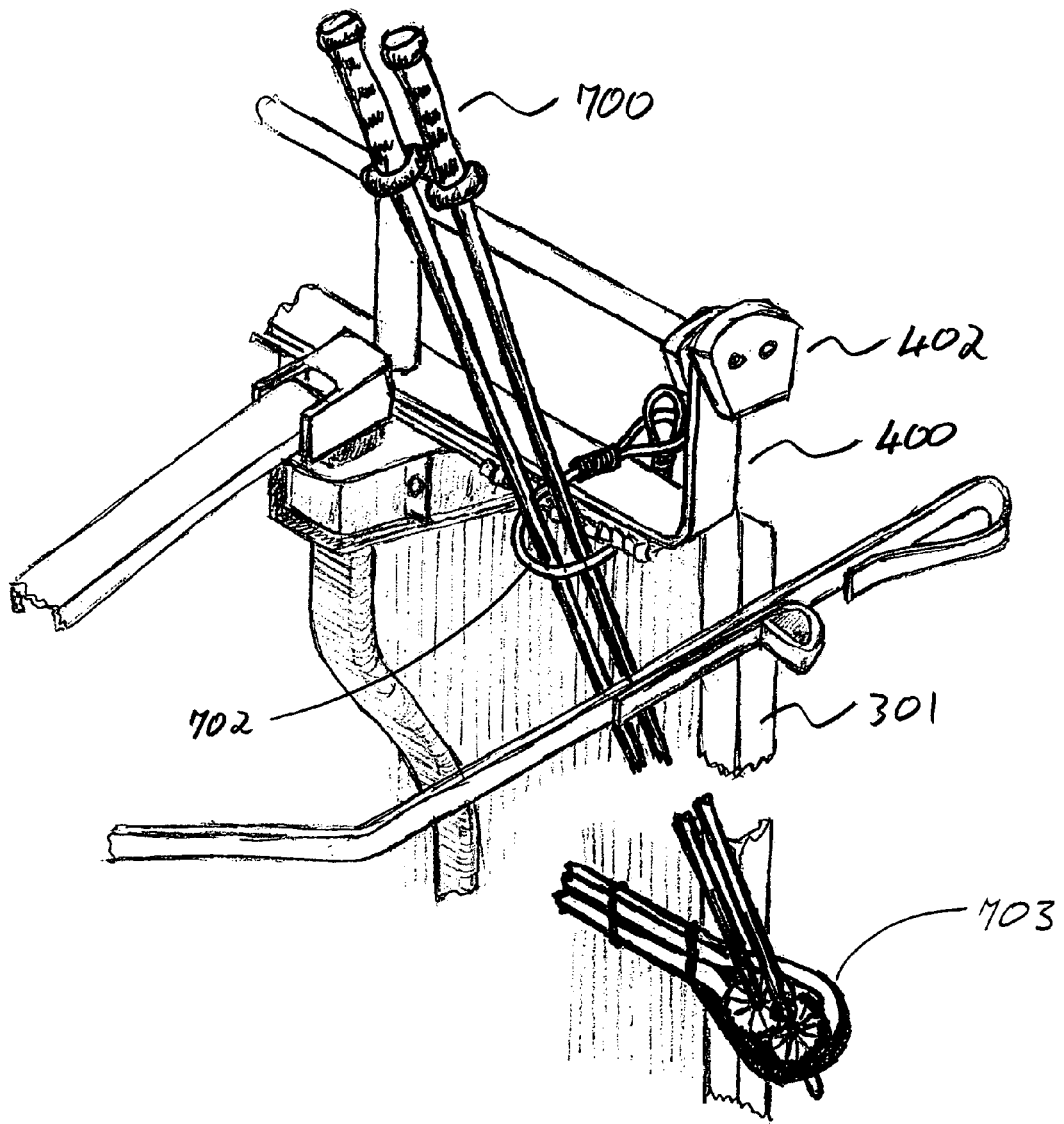
Figure 36:
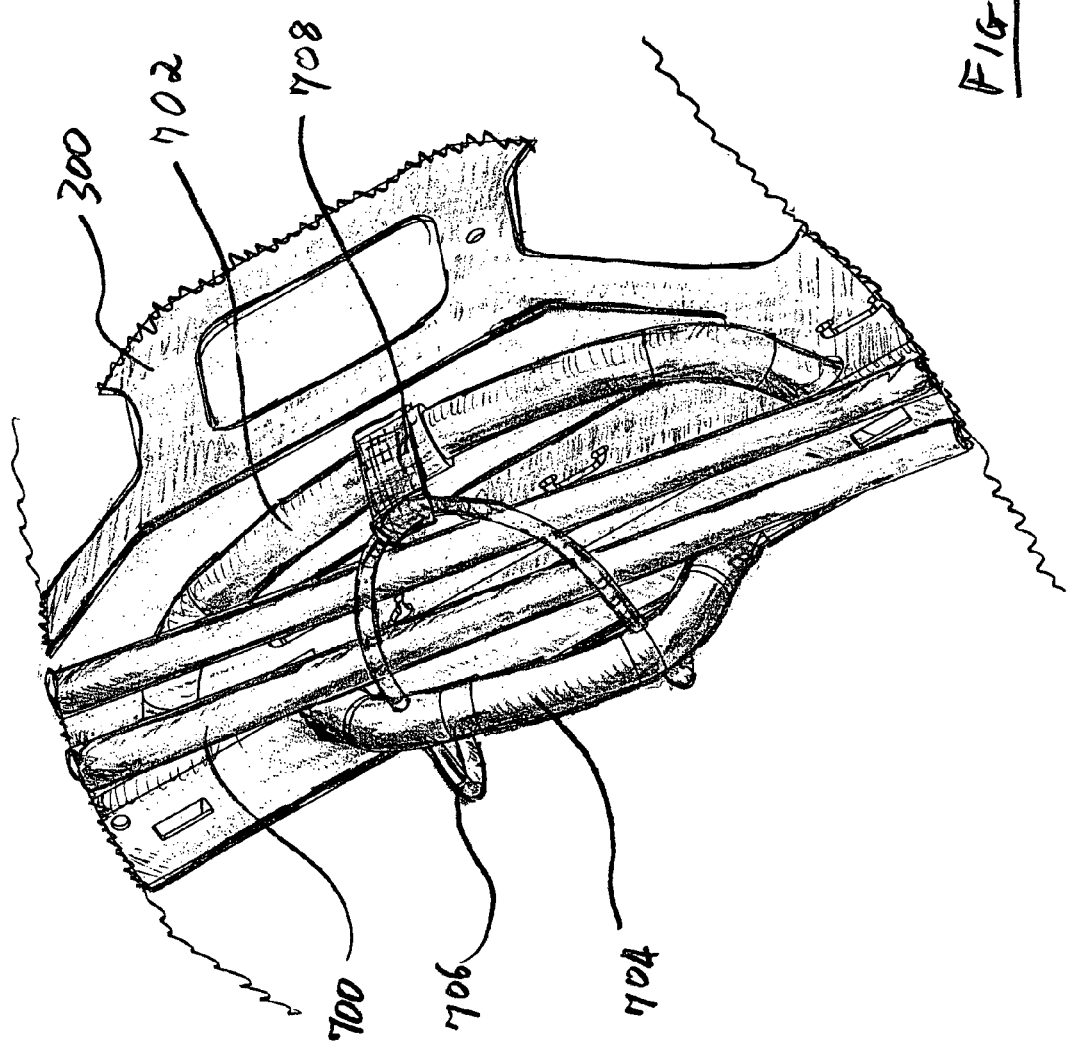
Figure 5A:
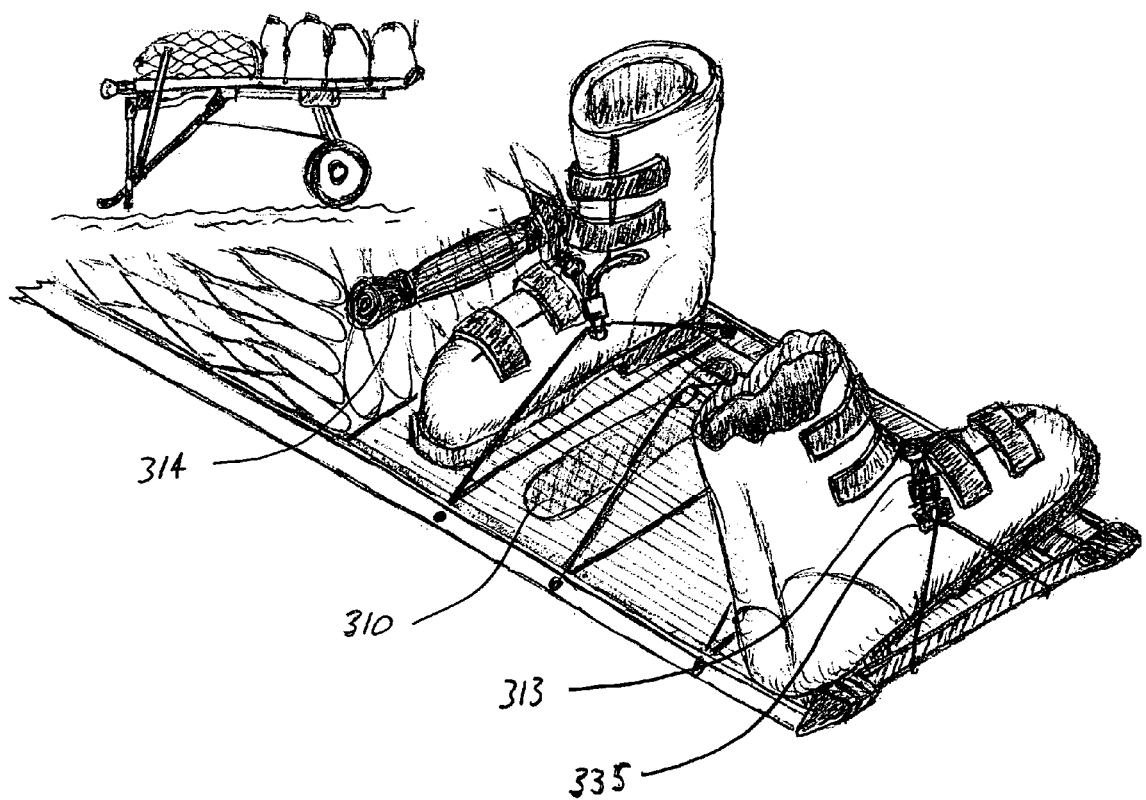
Figure 6:
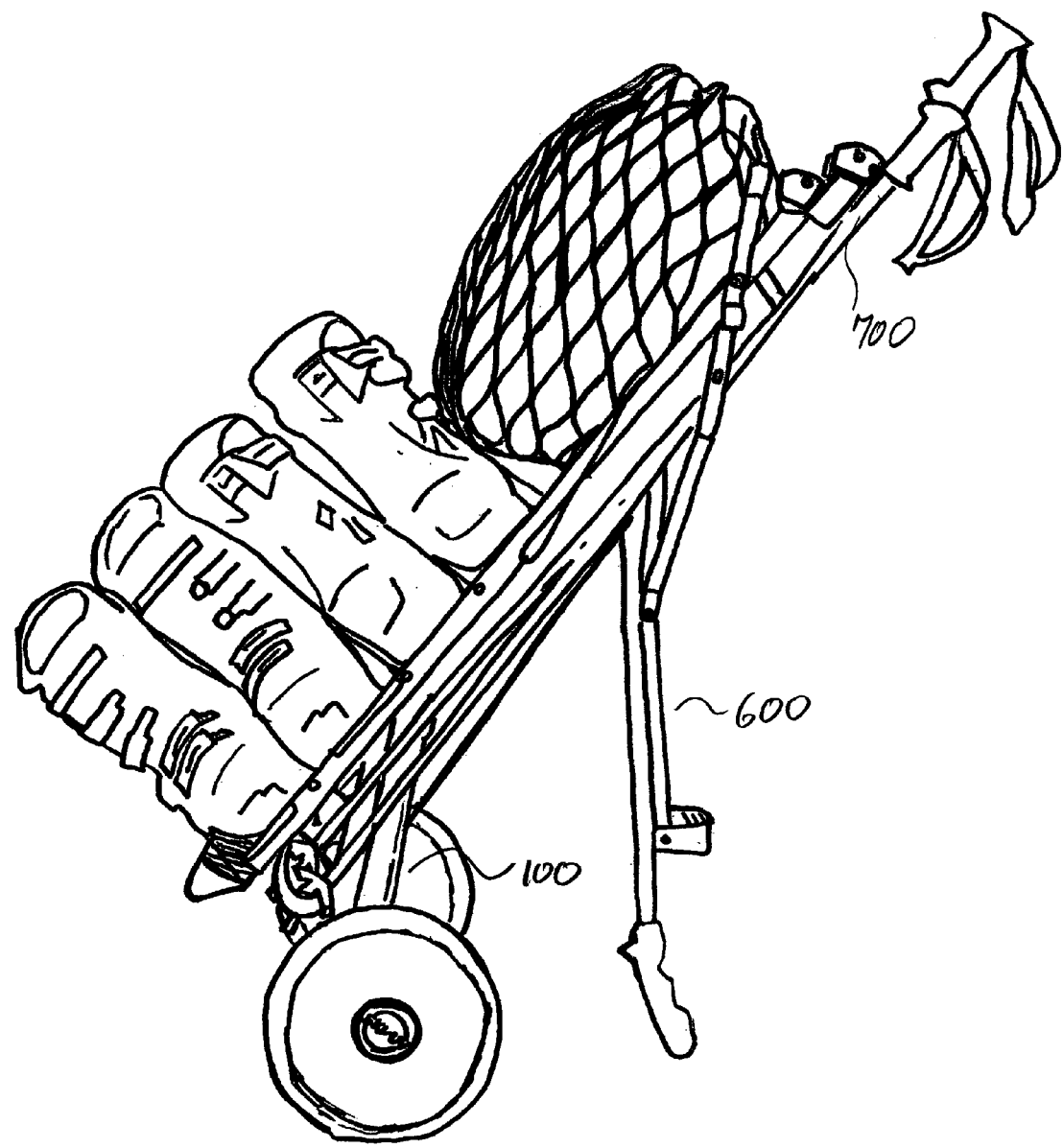
Figure 7:
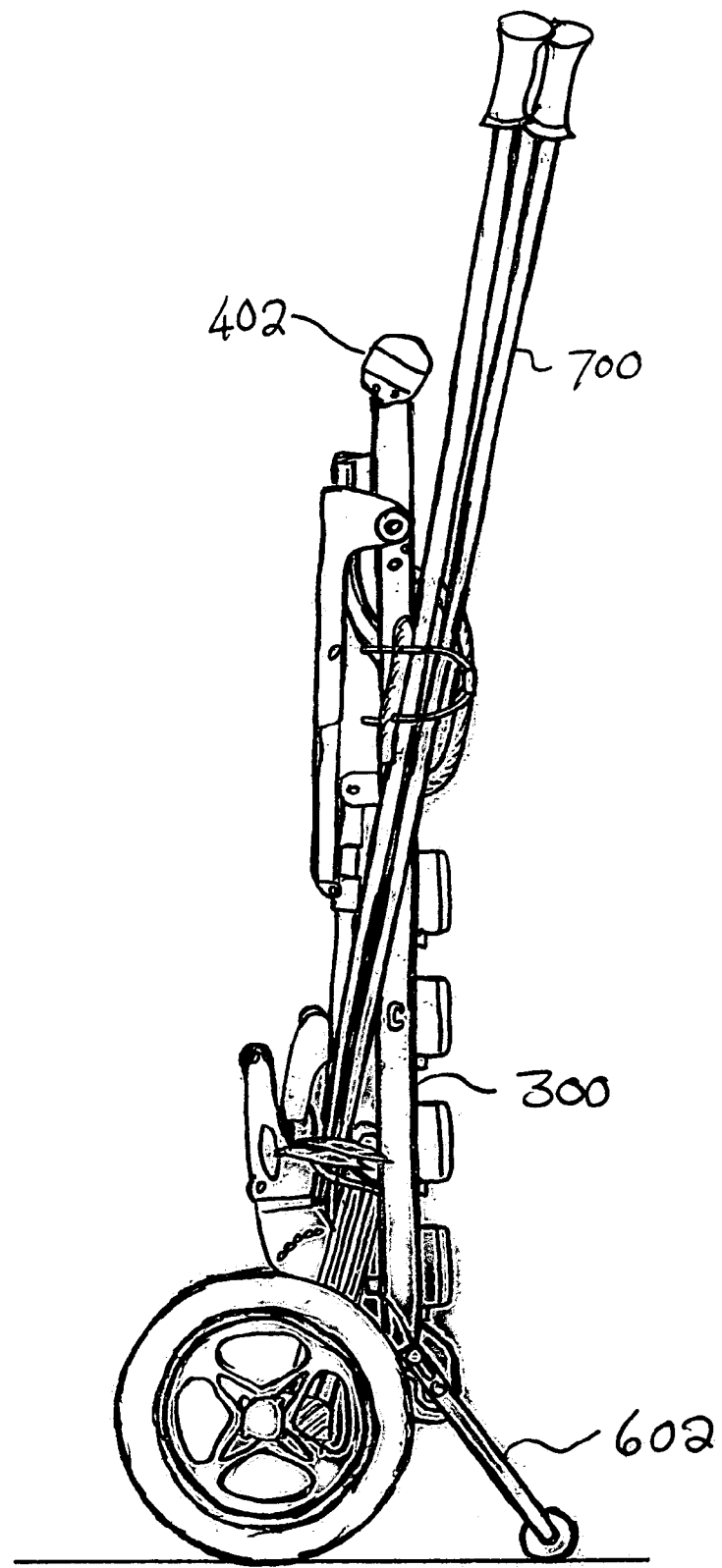
Figure 8:
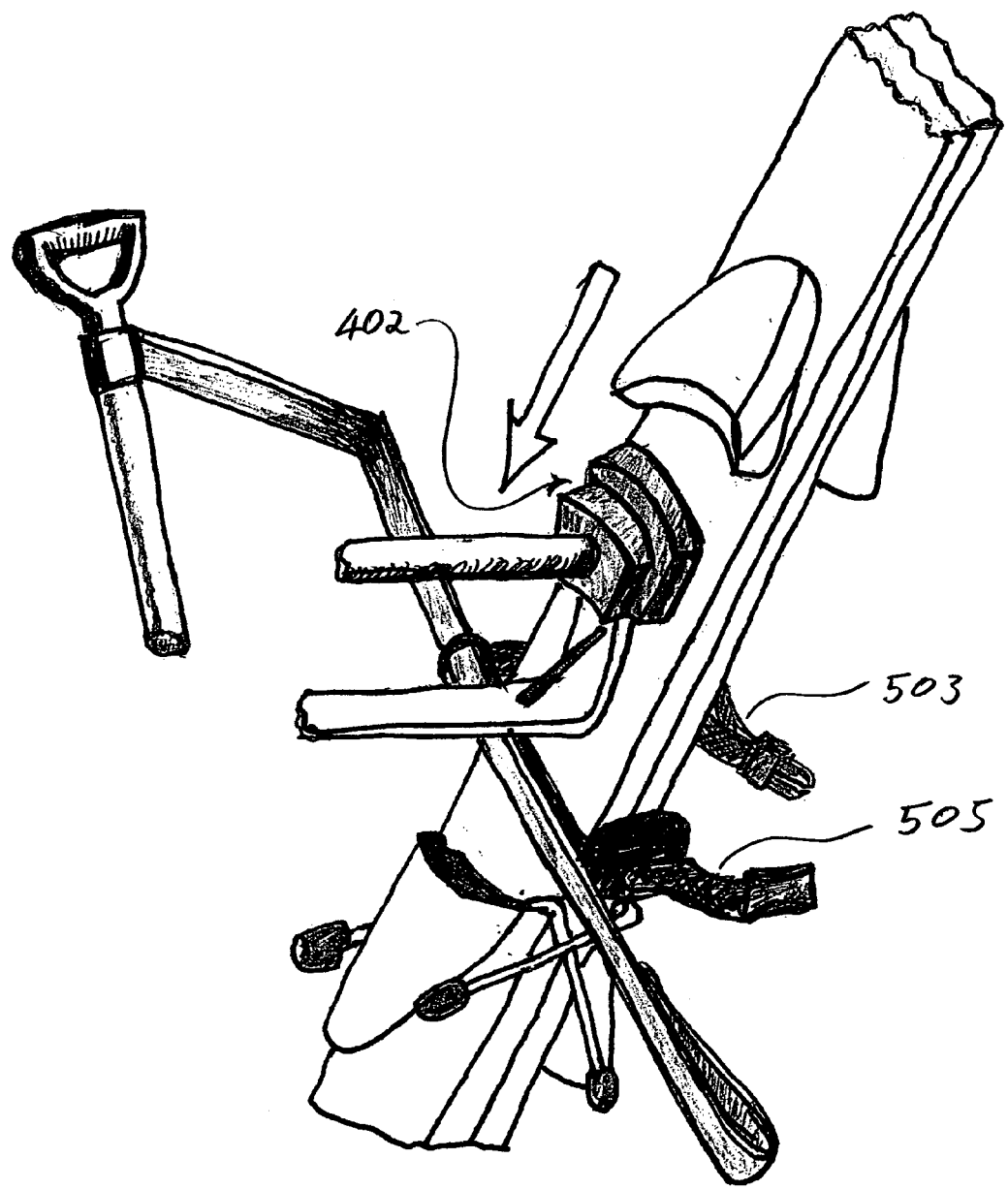
Figure 14:
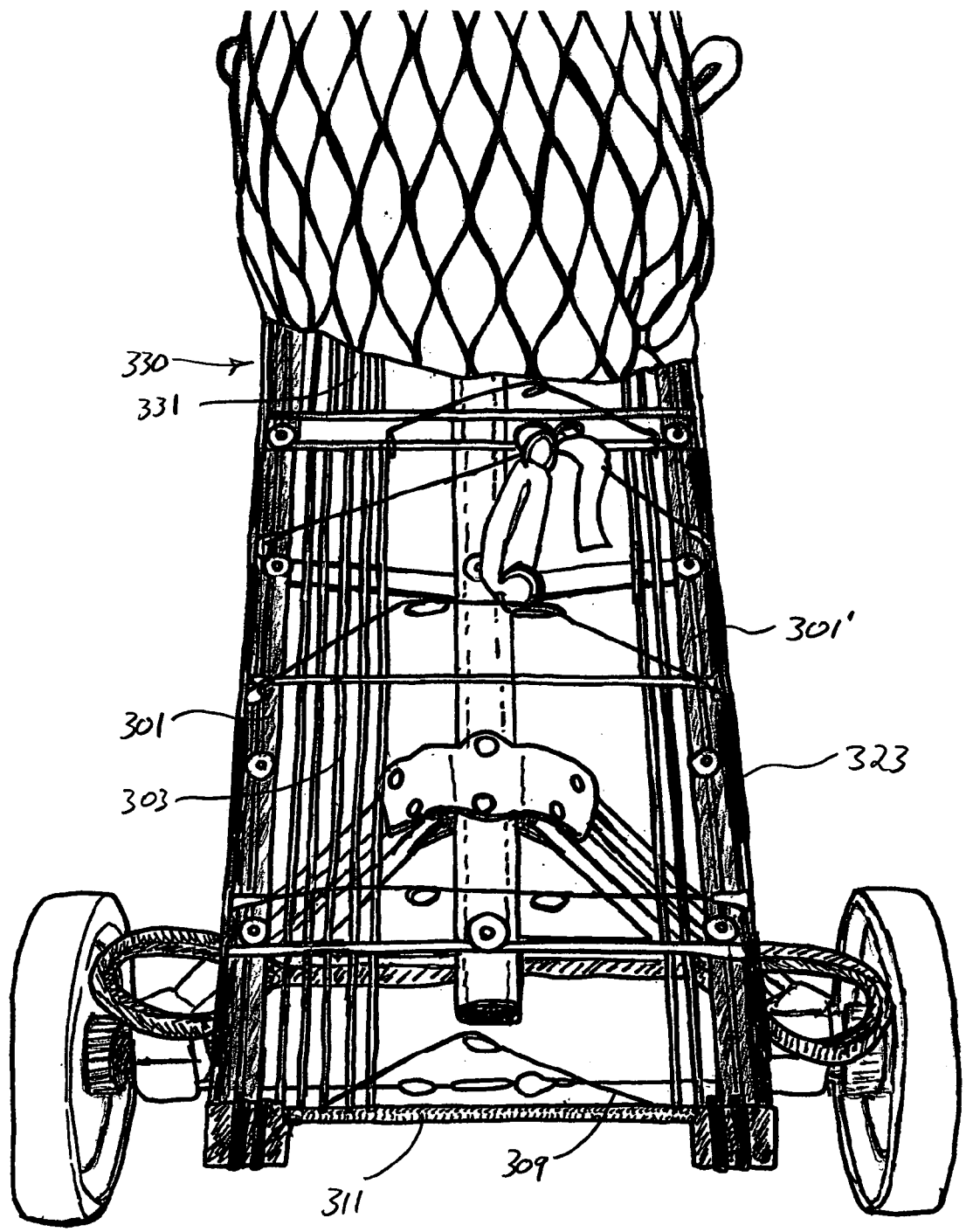
Figure 14A:
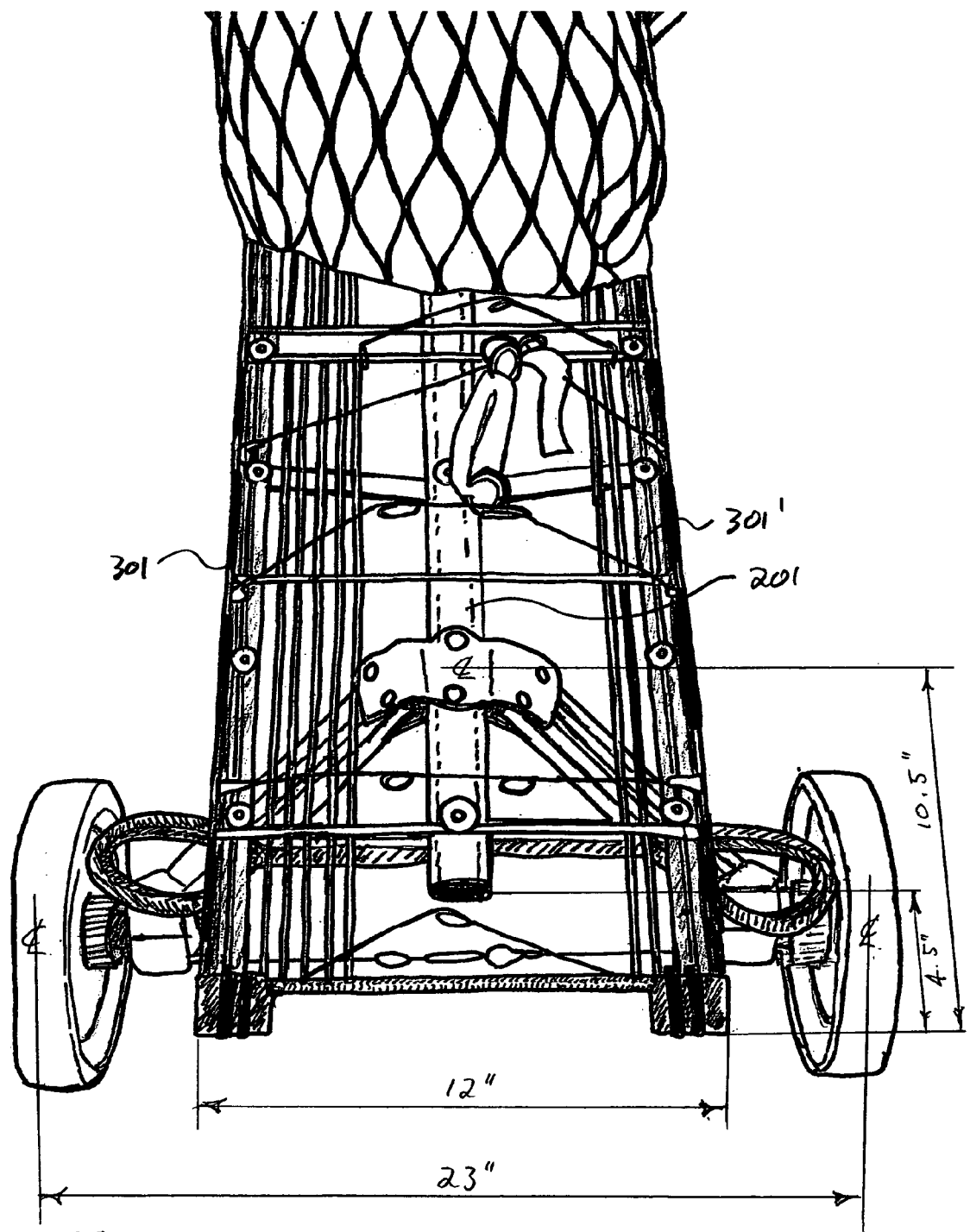
Figure 15A:
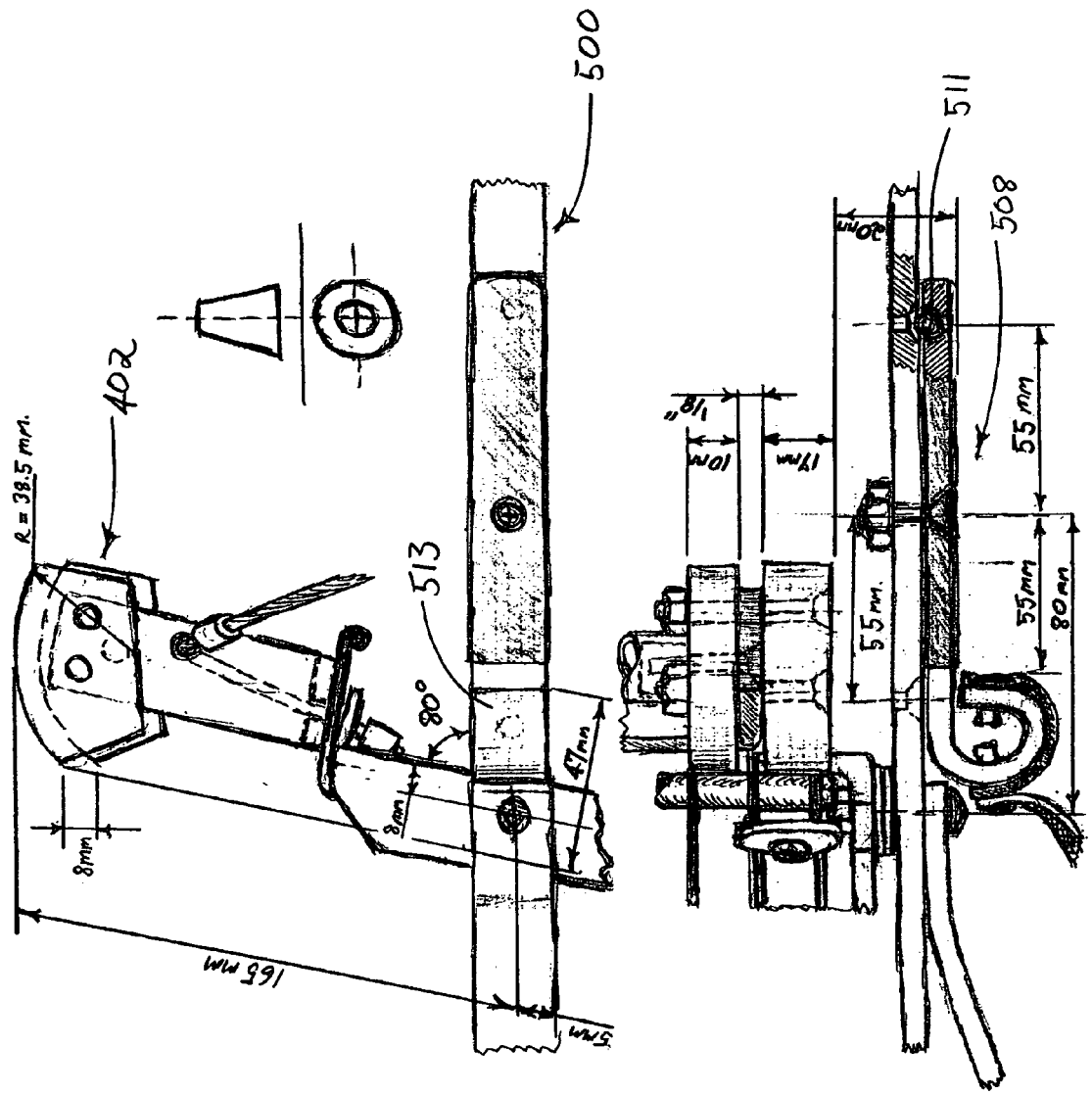
Figure 16:
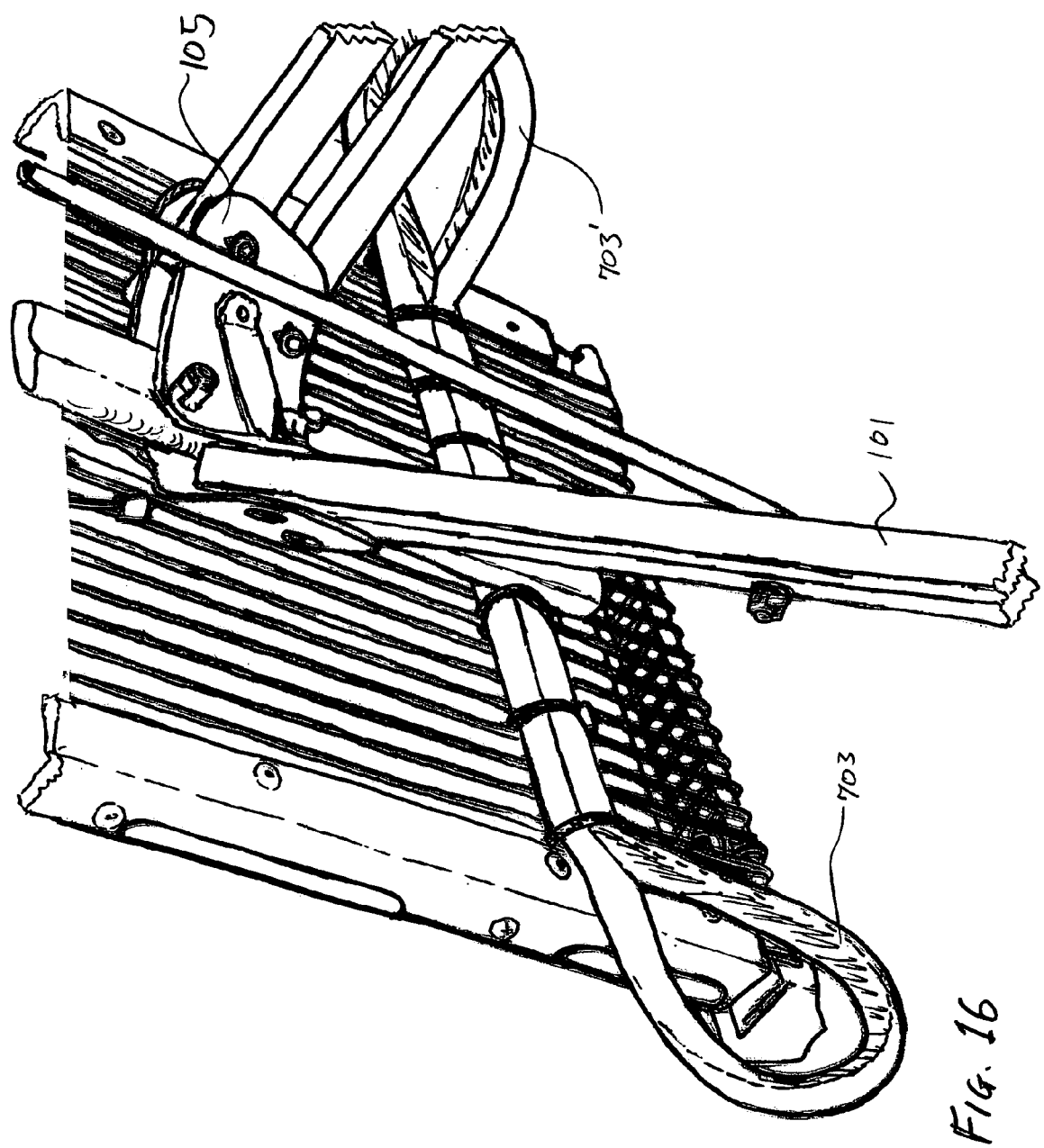
Figure 17:
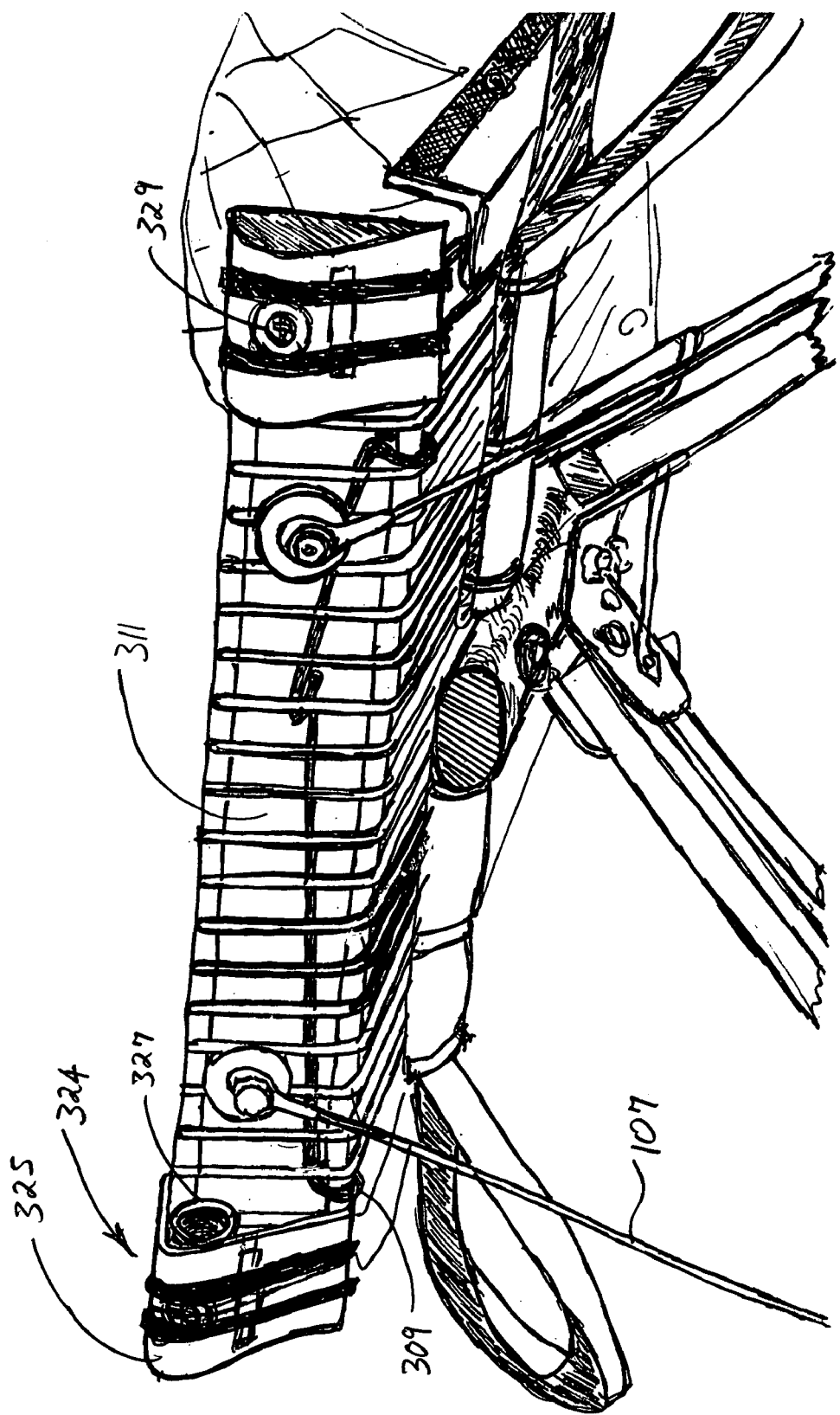
Figure 18:
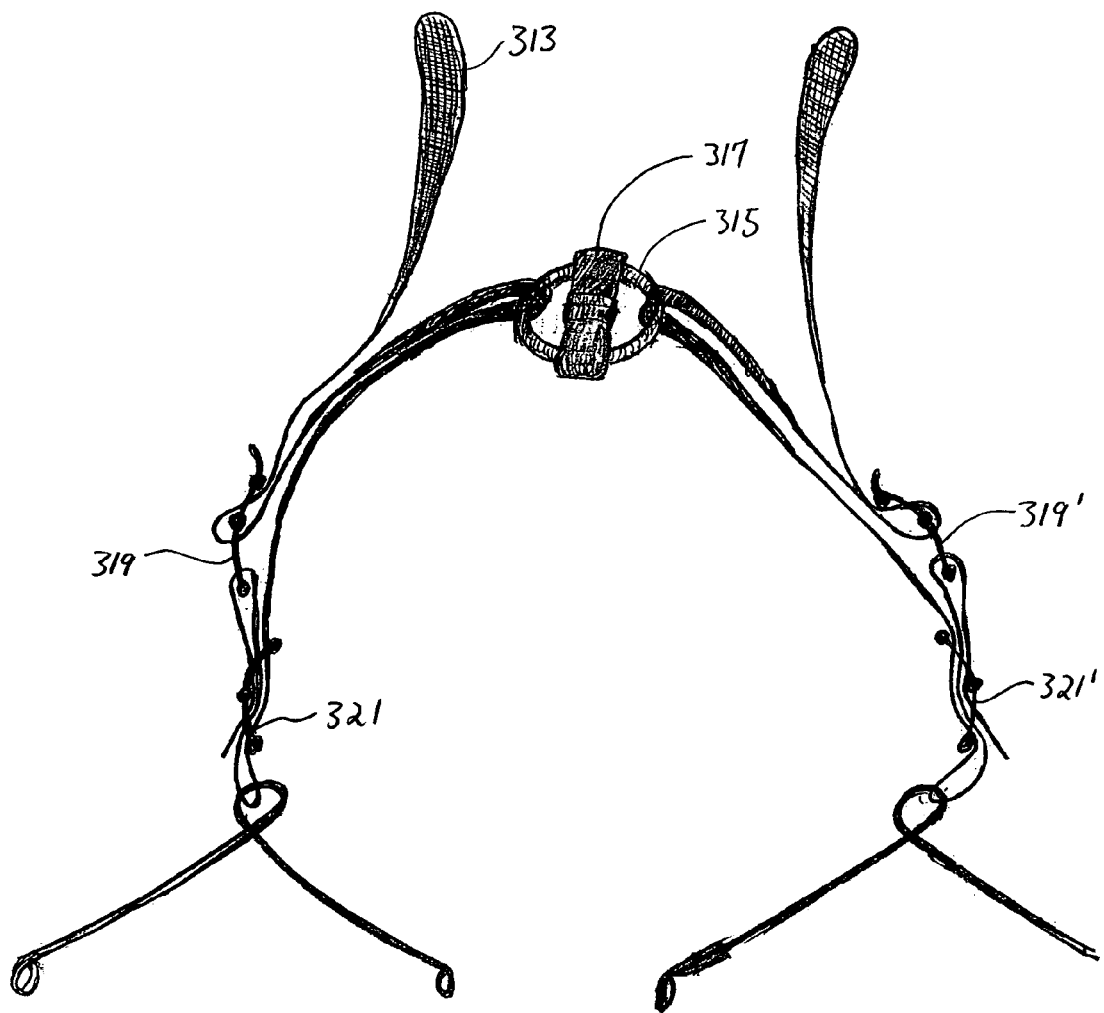
Figure 19:
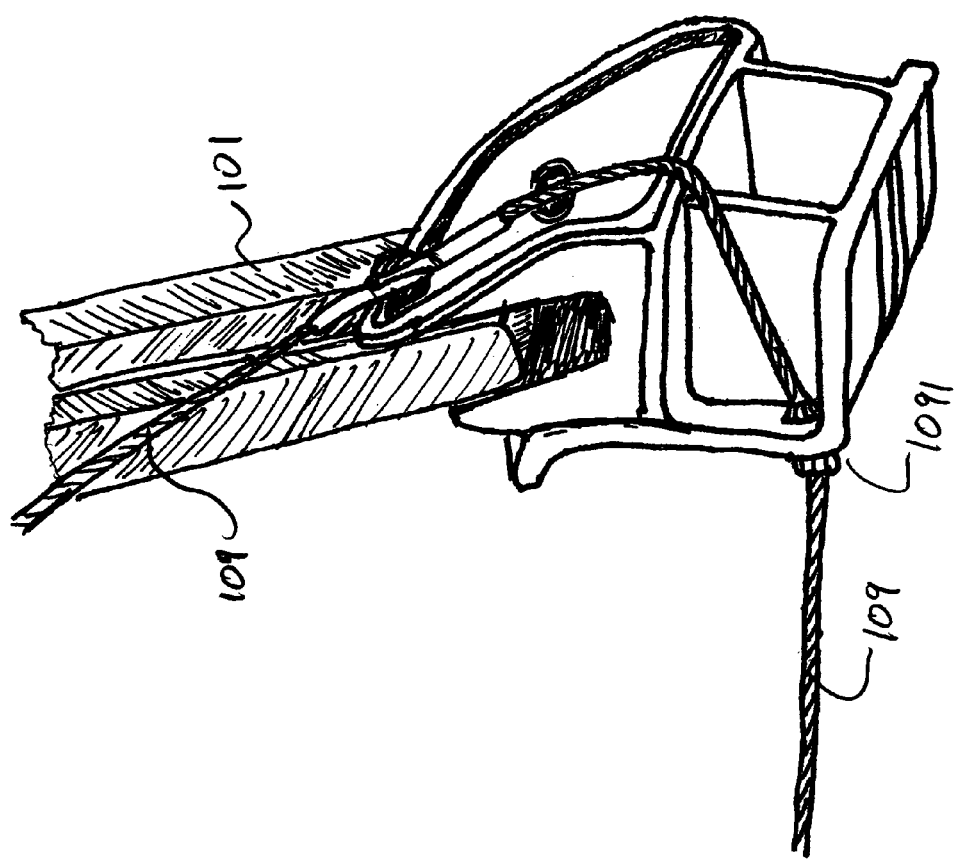
Figure 20:
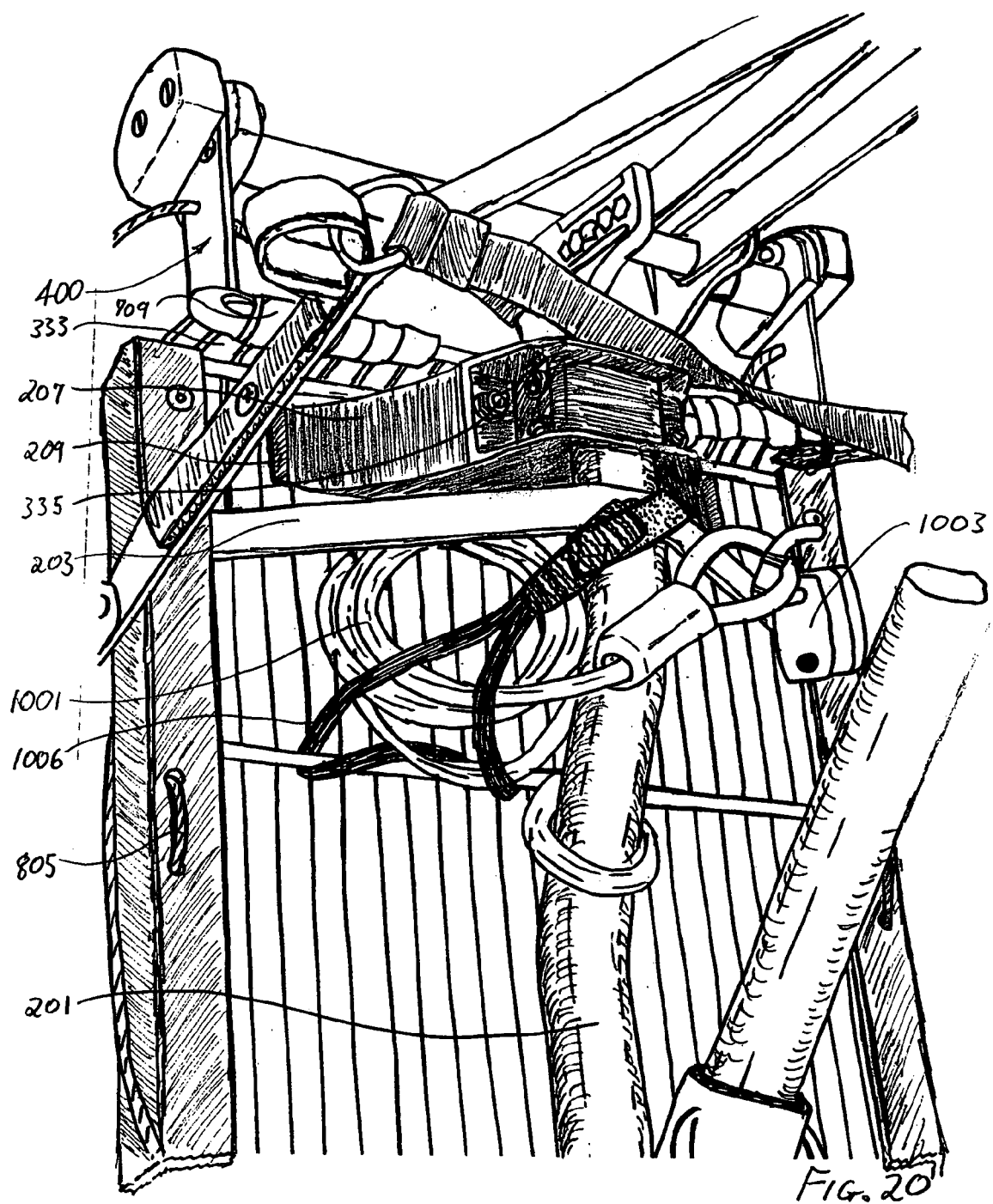
Figure 21:
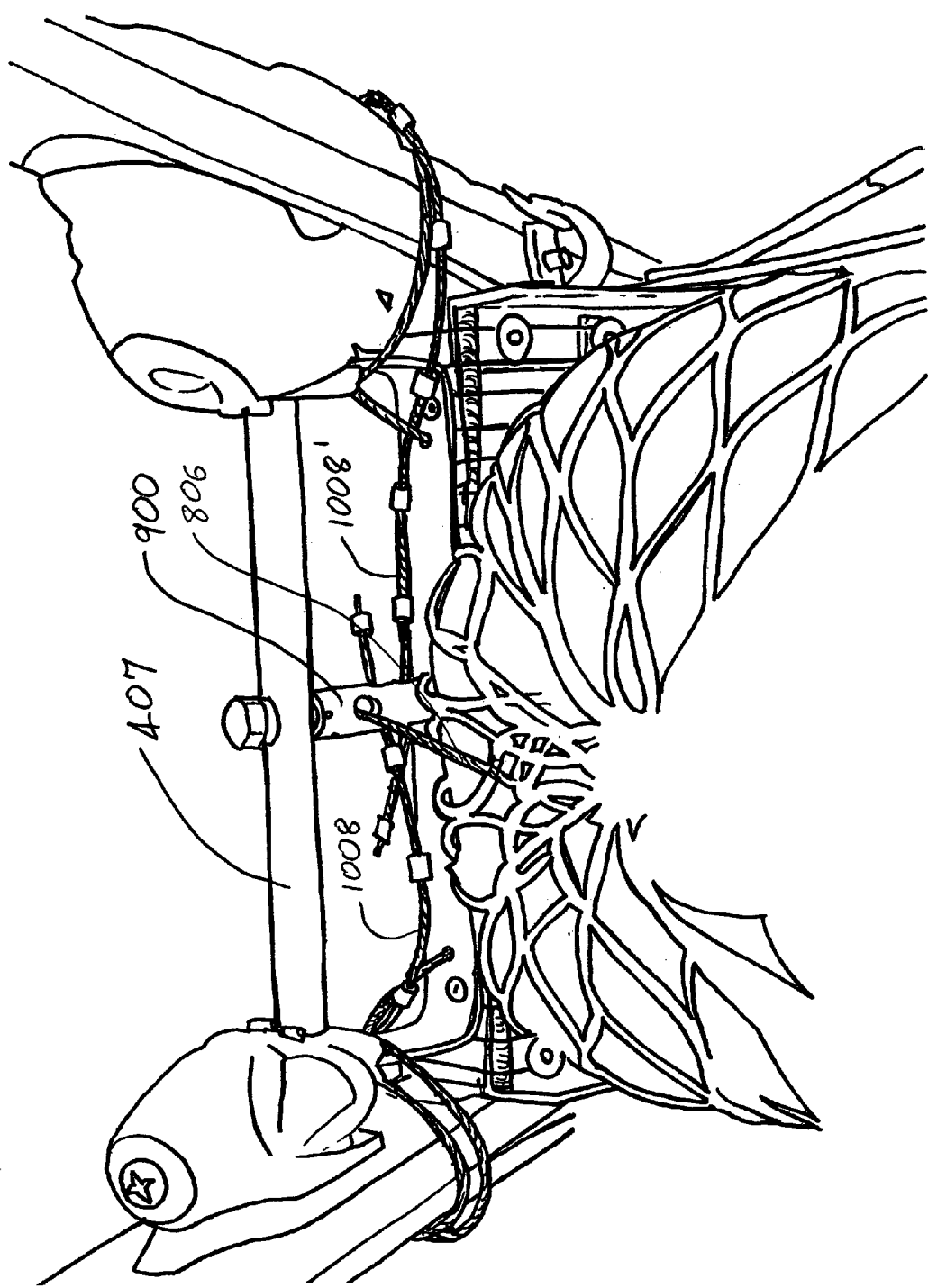
Figure 22:
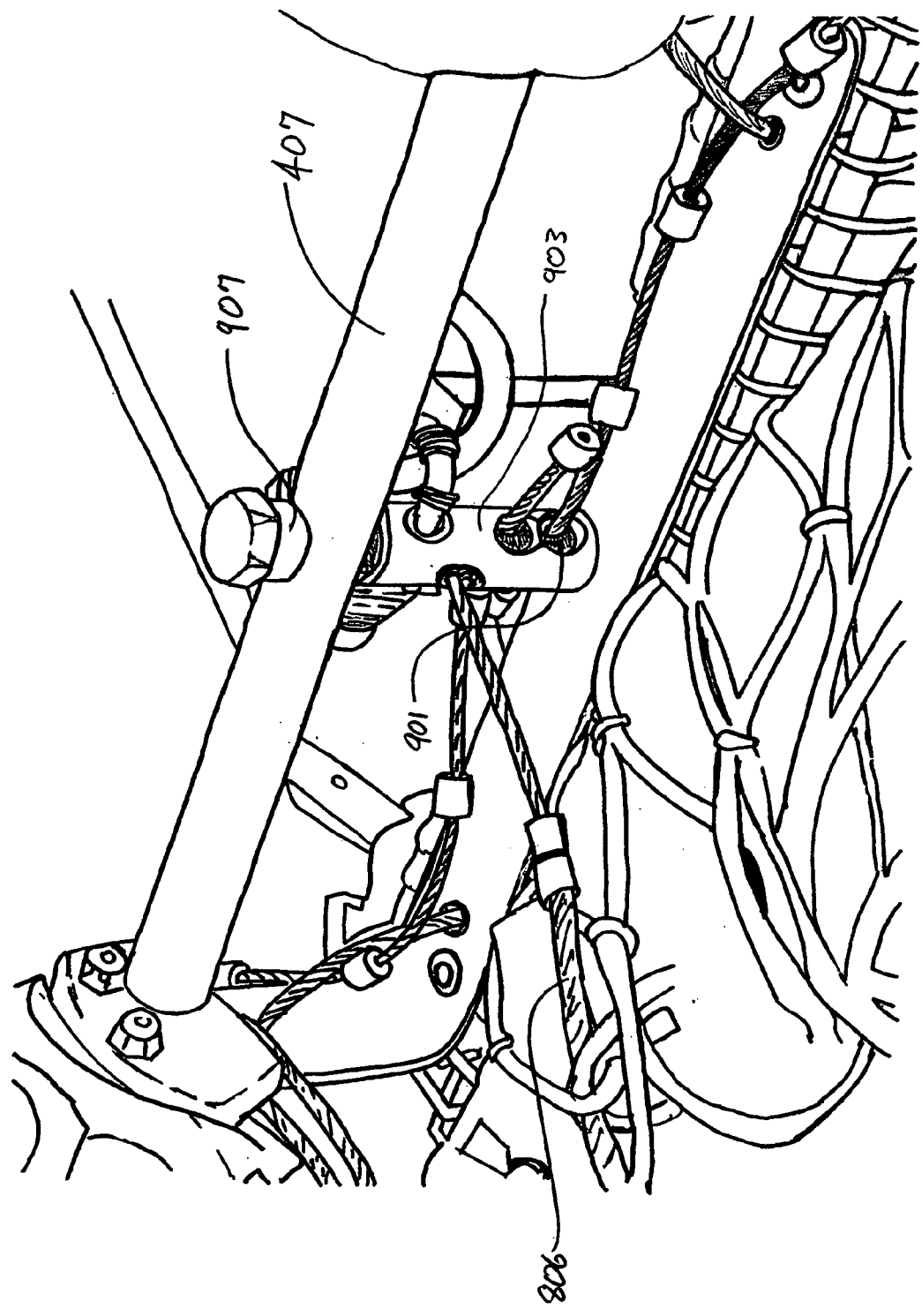
Figure 23:
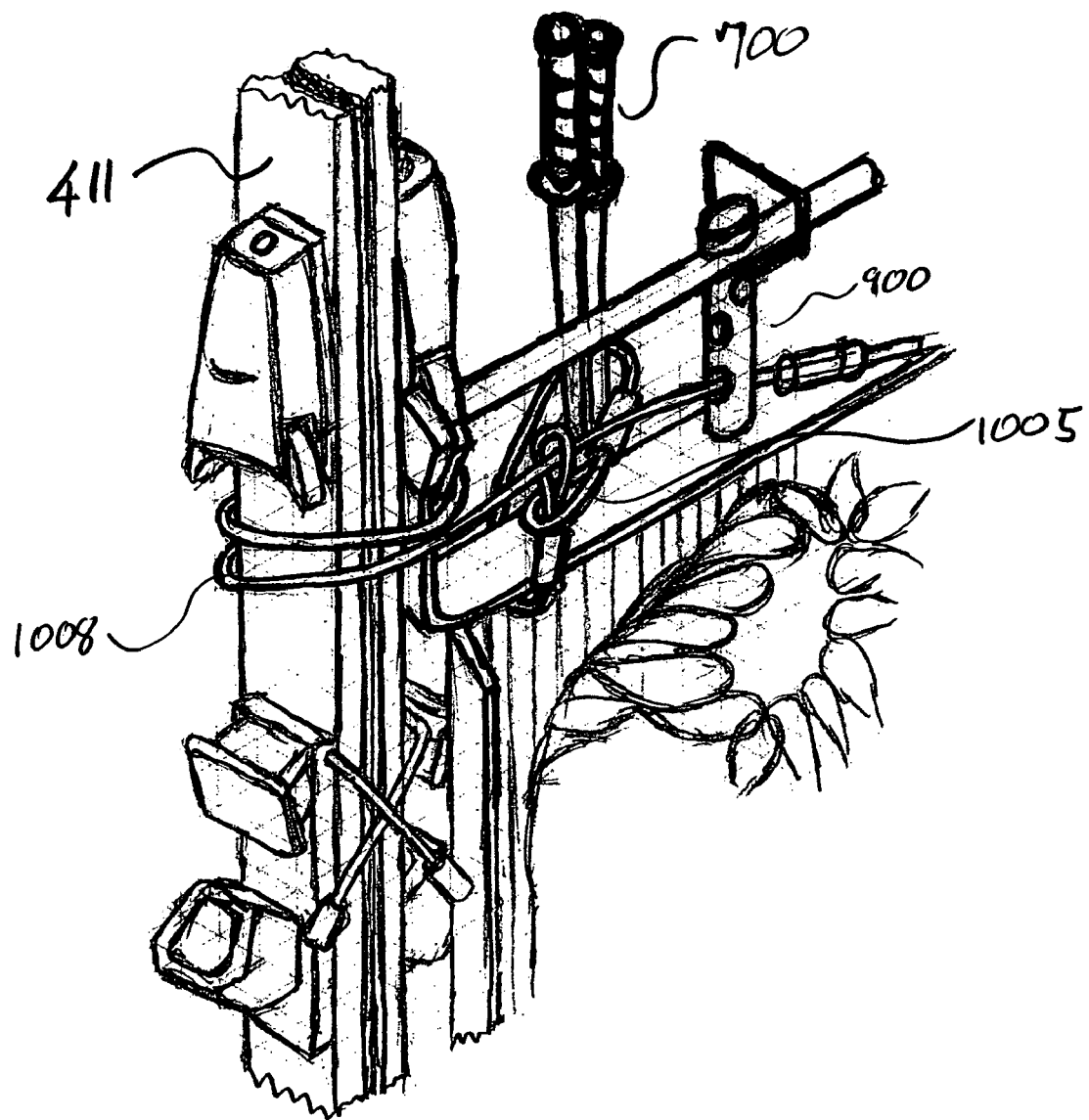
Figure 24:
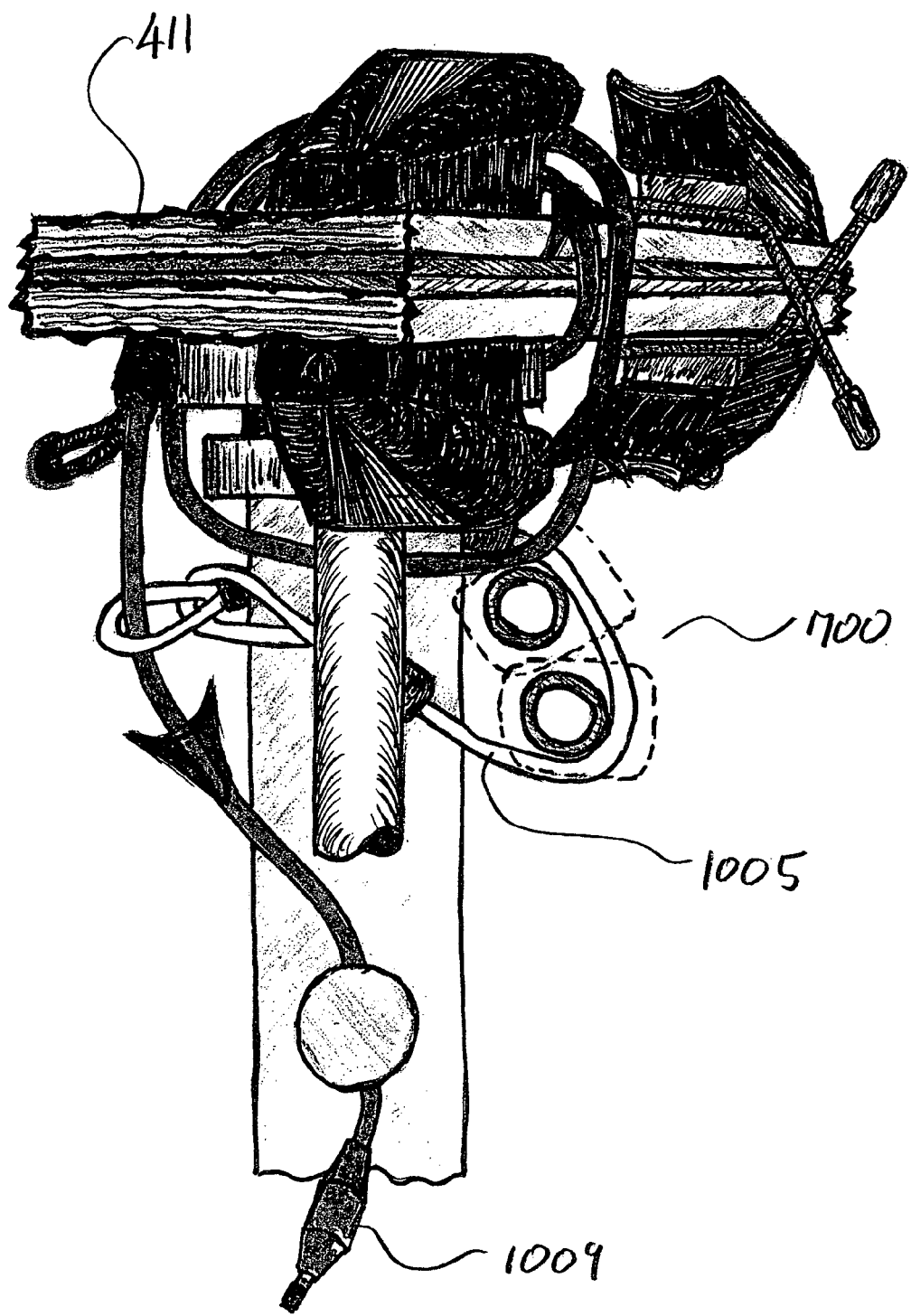
Figure 25:
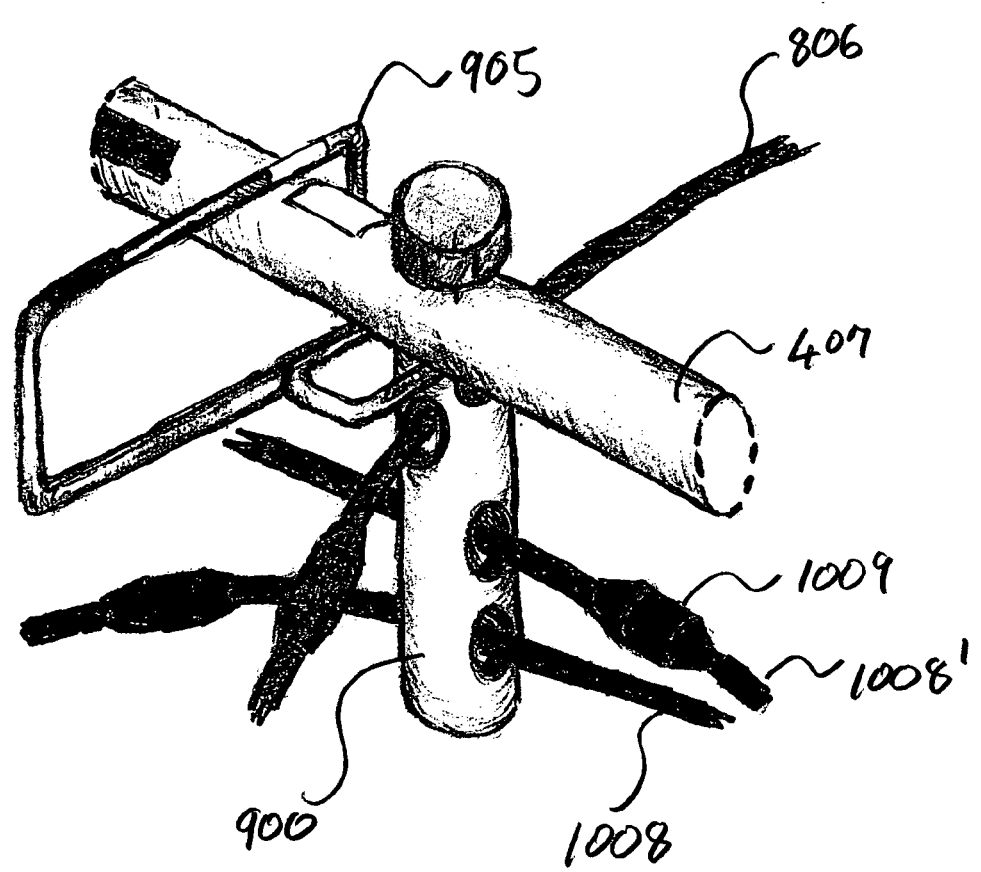
Figure 25A:
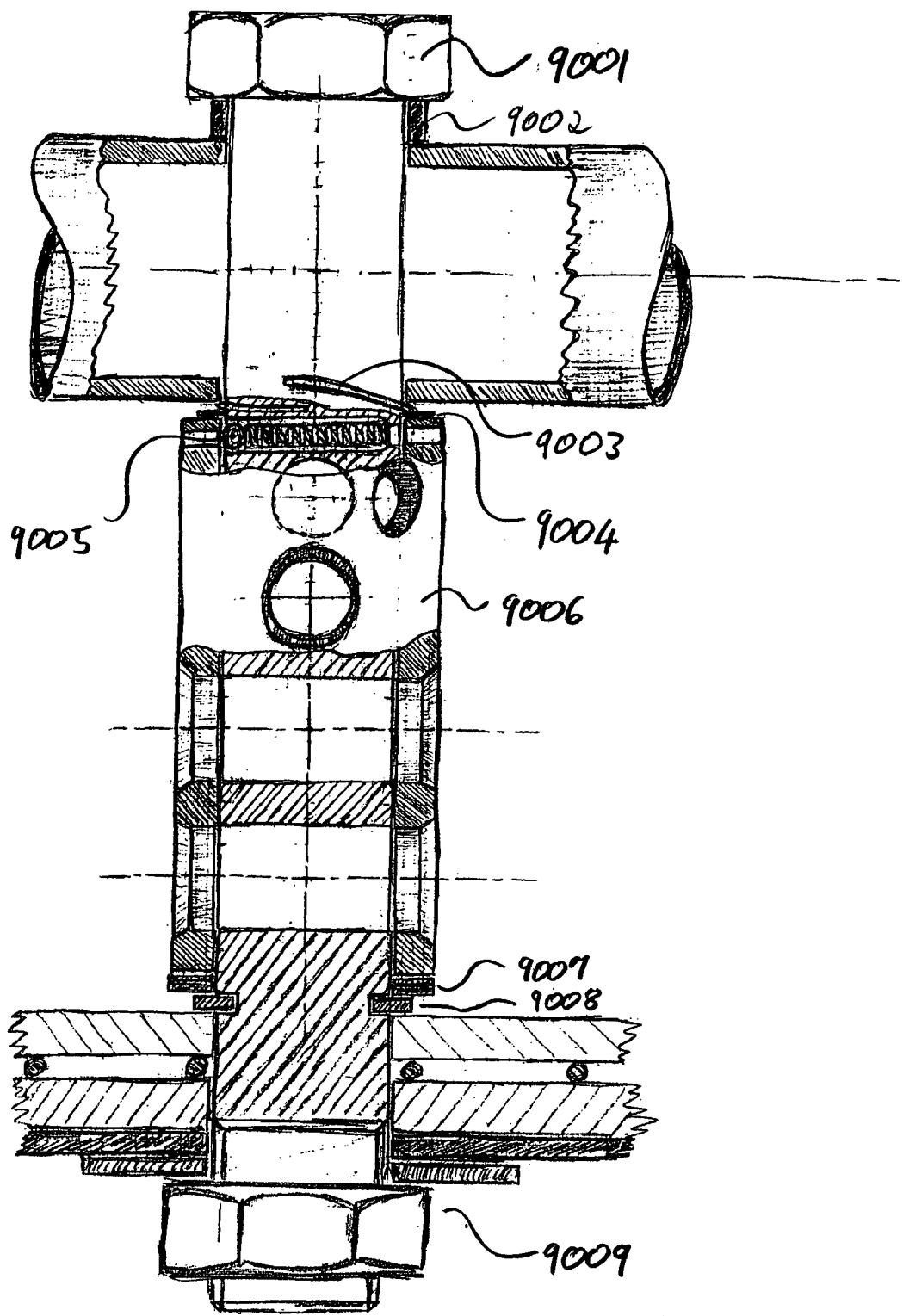
Figure 25B:
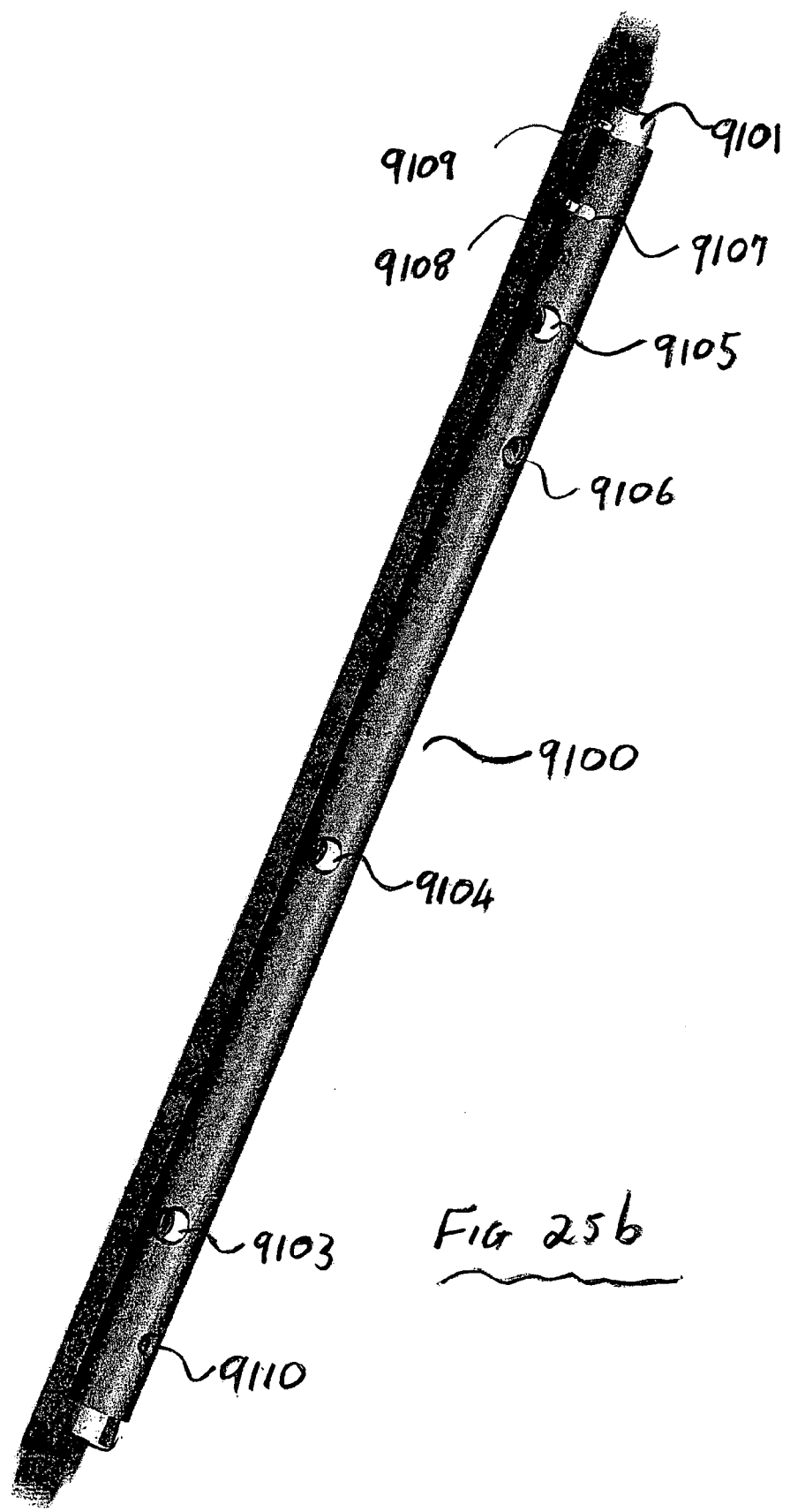
Figure 26:
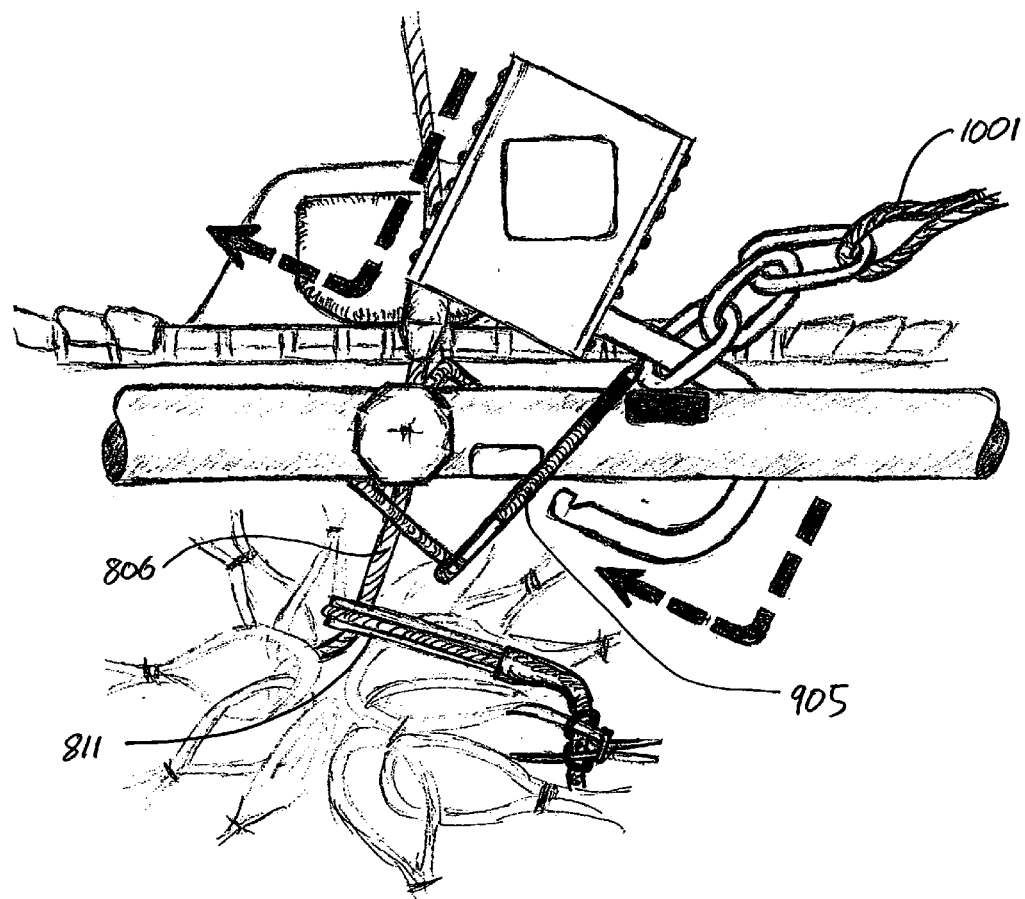
Figure 27:
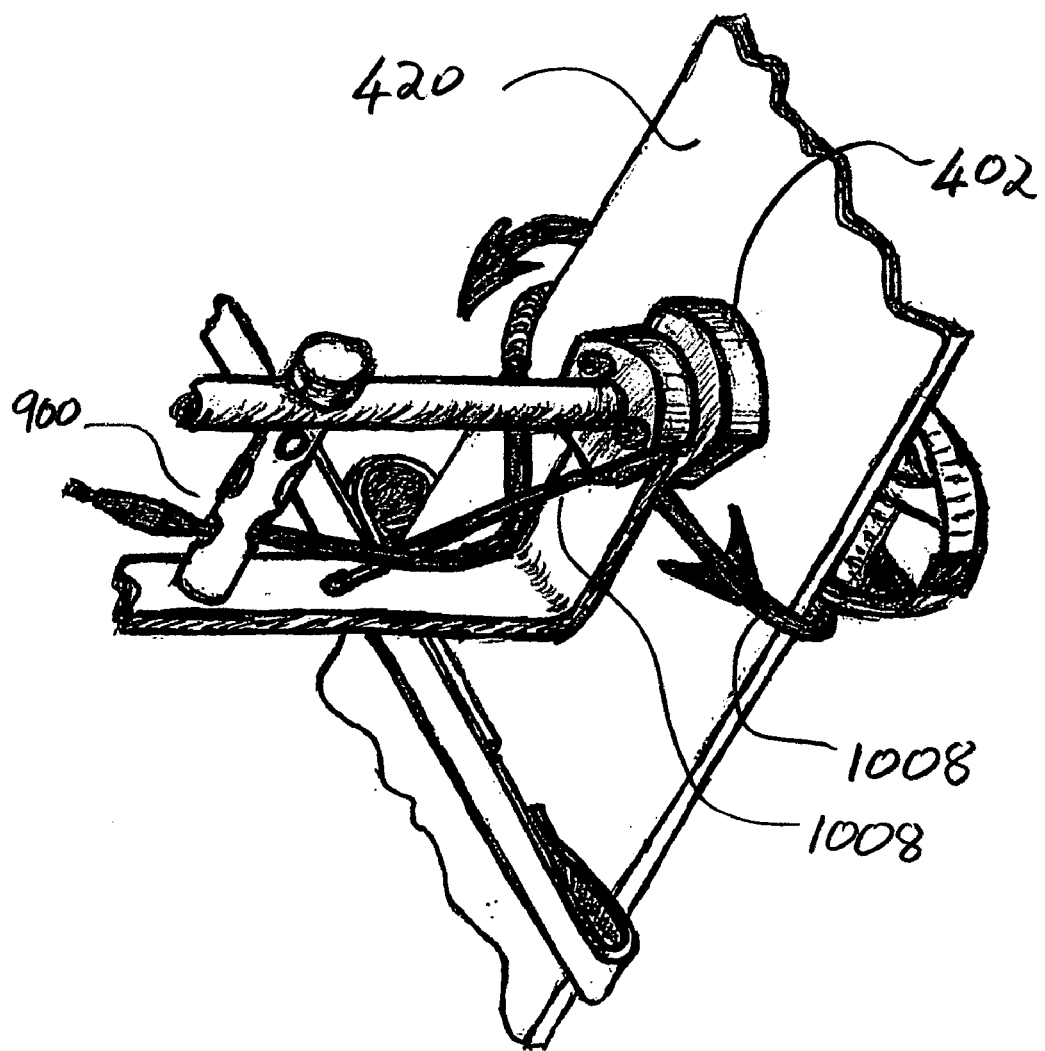
Figure 28:
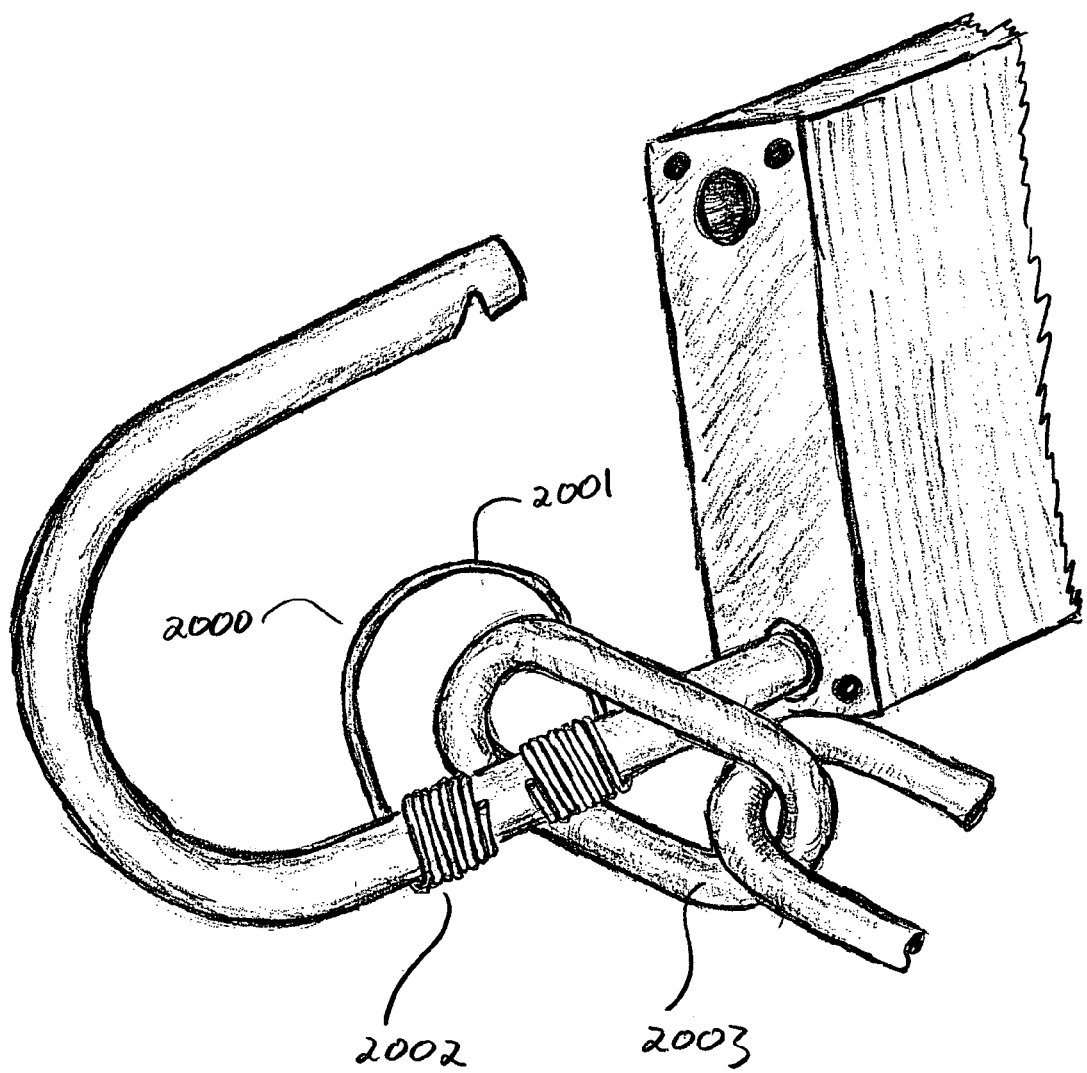

FIG. 3a Ski pole mounting.
FIG. 3b Ski pole upper mount, Emb. Y
FIG. 4 Loaded, laid down for boot access.
FIG. 4a Positioned for boot mounting, Emb. Y
FIG. 5 Boots mounted on platform.
FIG. 5a Root mounting sequence.
FIG. 5b One-piece formed sheetmetal deck with boot-mounting clips, Emb. Y
FIG. 5c Arrangement for tensioning the toe clips, Emb.
FIG. 6 Partially loaded and folded for shuttle bus access.
FIG. 7 Skis and wheels dismounted for storage.
FIG. 8 Ski mounting.
FIG. 8a Ski-mounting details, lower ski mounting bracket, Emb. Y
FIG. 8b Lower ski mounting bracket main arms, Emb. Y
FIG. 9 Snowboard mounting.
FIG. 10 Unloaded, view from front
FIG. 10a Storage position for bottom handle, Emb. Y
FIG. 10b Partially loaded, view from side, Emb. Y
FIG. 10c Subframe and kickstand or bottom hoop assembly, Emb. Y
FIG. 11 Unloaded, view from side.
FIG. 11a Security bag panels.
FIG. 12 Main handle, upper structures ans lower mounting brackets.
FIG. 12a Adjustable main handle, Emb. Y
FIG. 13 Bottom of platform, undercarriage and ski pole placement.
FIG. 14 Boot deck from above.
FIG. 14a Dimensions, viewed from behind.
FIG. 15 Lower mounting bracket, main handle and support prop.
FIG. 15a Dimensions, upper and lower mounting brackets.
FIG. 16 Stirrups for ski poles.
FIG. 17 Bottom end of platform and support cables.
FIG. 18 Boot securing straps, threading diagram.
FIG. 19 Wheel receiver, support cables.
FIG. 20 Upper section structures, main locking cable stowage.
FIG. 21 Locking: skis and security bag, general view.
FIG. 22 Ski and bag locking cables threaded through locking post.
FIG. 23 Locking, skis and poles.
FIG. 24 Locking cable path for ski and pole locking, viewed from above.
FIG. 25 Locking post with index lever.
FIG. 25a Locking post assembly.
FIG. 25b Transverse locking tube assembly.
FIG. 26 Padlock insertion into locking post.
FIG. 27 Locking, snowboard.
FIG. 28 Spring clip for padlock retention.

DETAILED DESCRIPTION OF FIGURES

The figures depict two versions of the invention: one version is of an earlier prototype, and the other is of a later version with some preferred design details. Each drawing is internally consistent, and variations of the design details are described in connection with the relevant drawing.

FIG. 1 Loaded, General View, Emb. X

FIG. 1 shows the cart loaded with two pairs of skis, two pairs of ski boots, one pair of ski poles and with the security bag partially filled. The unit rests on the wheels and the lower end of the platform. The front of the unit is defined as the direction in which the handle extends. This arrangement of the main structural and load elements is stable for any order of loading, although the most stable sequence is to load the boots first. To pull the cart along, one first pushes down on the handle to raise the rear of the cart until the balance point is reached, after which one pulls with one hand.

FIG. 1a Partially Loaded, General View, Emb. Y

Figure 2:
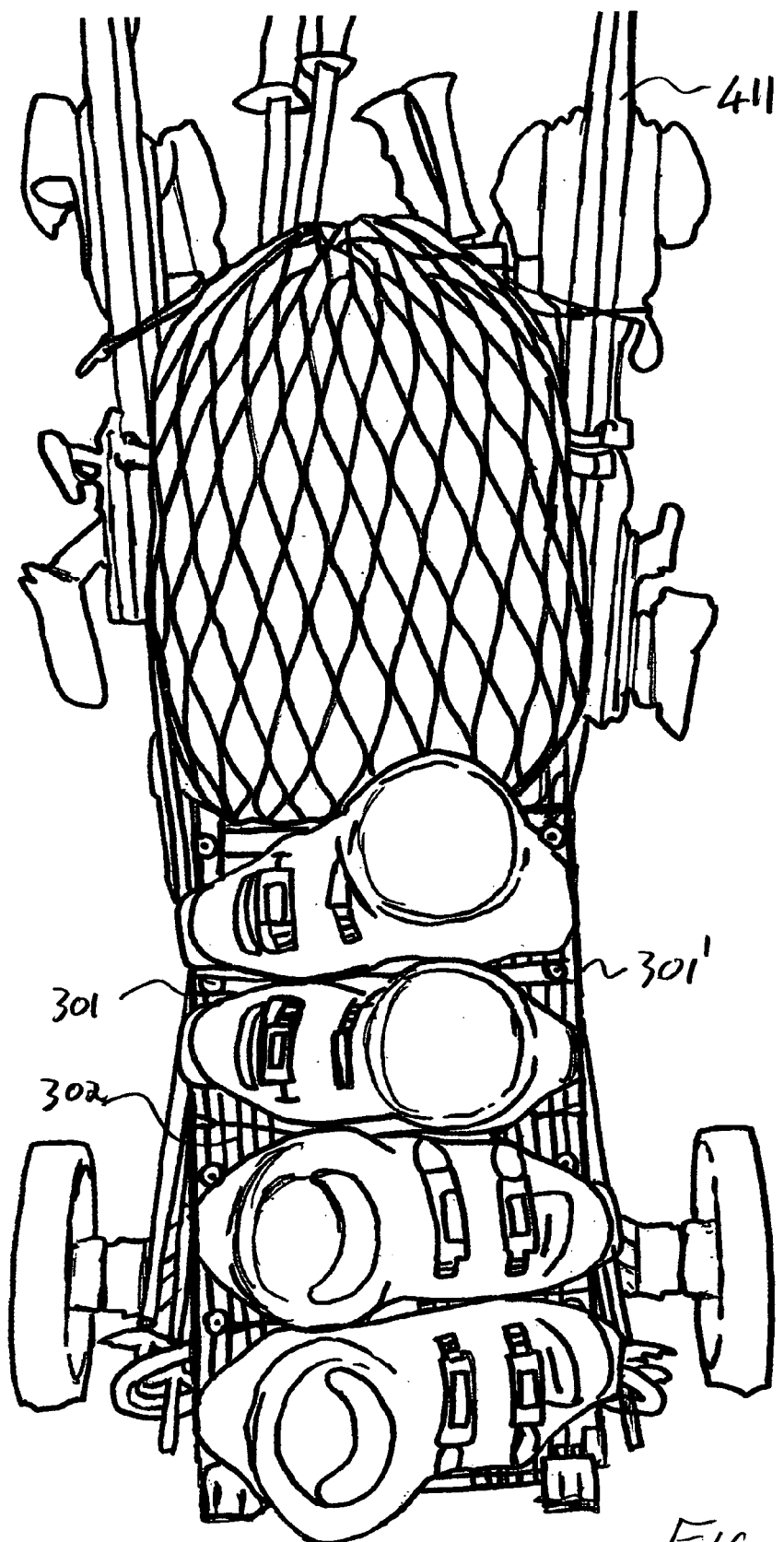
Figure 2A:
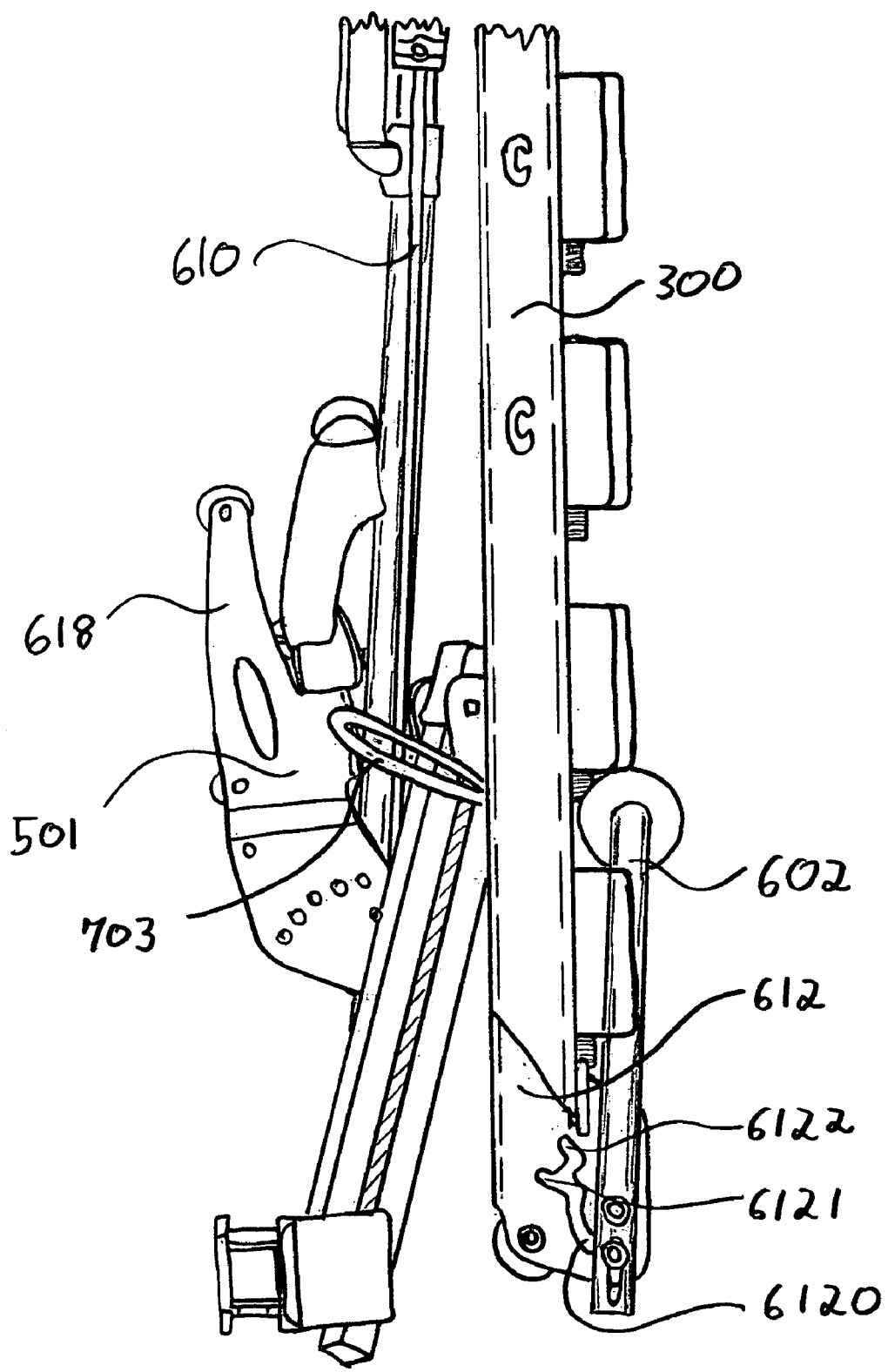
Figure 2C:
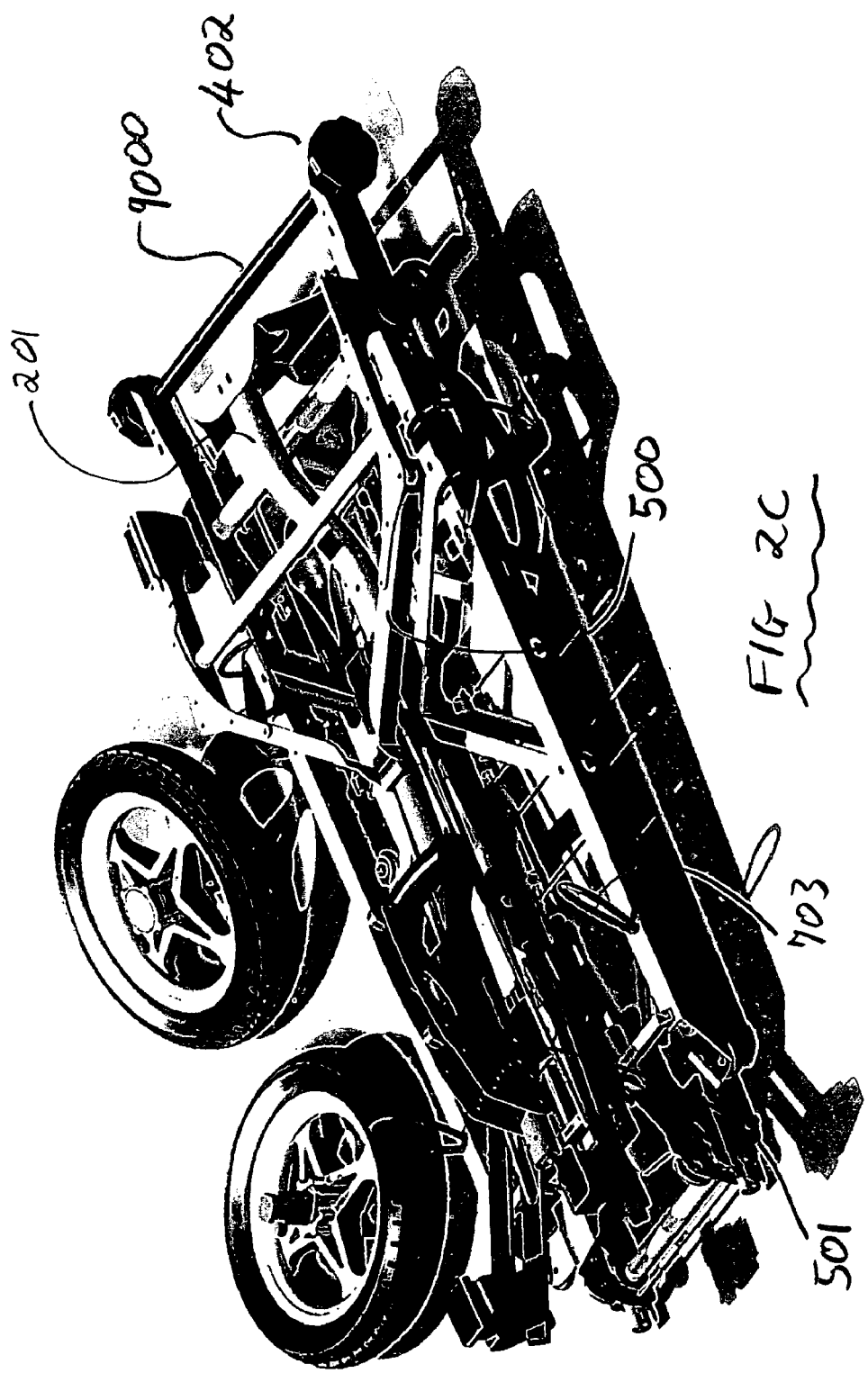

FIG. 2 Loaded, General View from Rear, Emb. X

The wheels are the widest part of the loaded assembly, and the bindings on the outer skis do not protrude to snag door frames or other obstructions. The bottoms of the ski poles are held in a position that does not present a tripping or laceration hazard. The mesh security bag encloses a waterproof nylon bag similar to a "stuff bag" used for packing sleeping bags. The ski boots are shown mounted on the lower part of the platform, referred to as the boot deck. In this illustration the harnesses holding the boots in place have been omitted.

The load surrounds the longitudinal axis of the cart in a compact way, giving a relatively low moment of inertia about the long axis. This helps to reduce forces on the undercarriage when moving over uneven ground.

The center of gravity relative to the wheel base is such that the cart is very stable against toppling over sideways.

FIG. 2a Folded for Transport or Storage, Side View, Emb. Y

Note the shape of the slot for the detent rod travel.

FIG. 2b Folded for Transportation or Storage, Underside. Emb. Y

After removing skis or snowboards and detaching the wheels, the cart can be folded for transport in an automobile. The length of the folded cart allows it to fit in the trunk of a mid-sized sedan. This feature allows users to keep most of their snowsports equipment and accessories together in a compact package.

FIG. 3 Loaded, General View from Front, Emb. X

This view shows the ski poles nested behind the bindings of each of the inner skis. The tails of the skis are positioned between the wheels and just forward of the wheel mounts.

The load distribution on the cart leads to a relatively high moment of inertia about the wheel axis, and this gives the handle a more stable feel when moving over uneven ground. Because the loaded cart has a relatively low moment of inertia about a vertical axis, quick changes of direction are easy to make.

FIG. 3a Ski Pole Mounting, Emb. X

Each pair of ski poles (700) is held in place by two retaining devices. The lower device is a flexible loop or stirrup (703) shaped to support the pole baskets, which should preferably be clipped together prior to insertion. The upper device is a length of vinyl-covered aircraft cable with a swaged loop at each end. The cable is mounted through the mesh of the upper platform as shown, and the loop sizes differ slightly, so that the loop at the end of the free length is slightly larger to allow it to be easily pushed over the other loop. The stiffness of a 3/32" diameter 7×7 strand aircraft cable together with the angle of intersection is sufficient to stop the poles from rattling free. This upper cable loop also serves as the locking cable when the poles are locked onto the cart.

The ski poles lie between the main structure and the inner ski bindings, so the easiest way to mount the ski poles is before mounting the skis.

FIG. 3b Ski Pole Upper Mount, Emb. Y

Each pair of ski poles (700) rests in a saddle formed by three elements. The lateral (704) and dorsal (702) pole supports are made from flexible but moderately stiff material, such as thick-walled rubber hose. The flexibility allows the guides to conform to different shapes of ski pole bundles, and to be deflected when necessary. A flexible polymer cord (706) is stiff enough to stop the pair of poles from sliding off the lateral support during loading. A hook-and-loop strap (708)

ties the bundle firmly for travel. The friction of the materials used to form the support bundle helps to keep the lower ends of the pole bundle securely in the stirrups, not shown in this view.

FIG. 4 Loaded, Laid Down for Boot Access, Emb. X

Laying the cart down on its main handle presents the lower part of the platform or boot deck (302) in a horizontal position that facilitates mounting and dismounting boots. The illustration shows how the skis and ski poles can be in place when the front of the cart is lowered for this prone position, but usually boots would be mounted before mounting skis and poles, and the latter would be unloaded before the cart is lowered for unloading the boots. The arrangement is such that the skis' bottom ends do not snag on either the ground or the undercarriage when the cart is lowered into this position.

FIG. 4a Positioned for Boot Mounting, Emb. Y

The handle extension rests on the ground. The ski mounting is such that the tail of the ski is within the sweep of the wheel. This allows the unit to traverse stairs like a conventional dolly without the skis interfering with the stairs.

FIG. 5 Boots Mounted on Platform, Emb. X

The figure shows four ski boots mounted on the platform, with the boot-holding straps omitted for clarity. If boots are too long to fit between the side-rails (301), the toes of the boots are positioned to rest on the edge of the side-rails, where non-slip tape (323) helps to keep them in place. For all boot sizes, the boot heels rest down on the deck with the back of the heels pressing against non-slip tape lining the inside of the side-rails.

Five anchor wires transfer load from the boot-holding straps to the boot deck. The three anchor wires sandwiched between boots span the deck, and the anchor wires at the upper (307) and lower ends (309) are hinged off cross-bars of the wire mesh deck. The lowest anchor wire (309) is of a heavier gauge than the others, and is arranged so that when it is rotated upwards it comes to rest against the upper cross-bar on the flange (311). This support along with its resistance to bending allows it to resist the downward load from the lowest boot when the cart is lifted to the walking position.

The anchor wires are all connected to the boot deck in a way that allows them to fold down for storage. The three intermediate wires have terminal eyes bent into the plane of the side-rail flanges and are fastened by machine screws to the side rails. The anchor wires at the upper and lower ends are hinged off cross-bars of the wire mesh deck by means of loops closed around the cross-bars.

FIG. 5a Boot Mounting Sequence, Emb. X

The figure shows just the top and bottom of four boots, with the two inner boots omitted for clarity. The inset shows the cart resting on the front handle with the boot harnesses standing ready and the straps opened far enough to allow easy boot insertion through the archway formed by each harness. To prevent snagging and interference, the lever clips on each boot should be snapped closed before attempting to mount a boot on the cart. Each boot is mounted by inserting it under the loop formed by the boot-holding straps, positioning the heel correctly and then pilling up on both of the boot-holding straps.

Boots are mounted in pairs, with left and right boots in the proper position. The two pairs face in opposite directions across the boot deck. This equalizes the load and reduces the deck length needed to accommodate four boots. For the optimum overall center of gravity and so that the lower pair of boots can support the upper pair, the smaller pair of boots goes into the upper two bays. If only one pair of boots is being carried, that pair is mounted in the lowest pair of bays.

Of four boots, the boot nearest the mesh bag is mounted first; this avoids having to squeeze the last boot into a confined space between another boot and a bulging mesh bag. The boot-holding straps on each boot should be pulled tight before the next boot is mounted. This sustains a chain of tension through the series of harnesses, allowing part of the overturning moment exerted on the lower boots to be countered by tension in the uppermost anchor wire As an additional means of preventing the stack of boots from lozenging downwards when the cart is jostled, a rubber pad (335) is attached just below the apex of the lowest anchor wire. When the boot-holding straps (313) are pulled tight, friction between the rubber pad and the shell of the boot helps to prevent the boot from rotating within its harness.

For communicating the correct way to mount the boots, the boot deck can have footprint silhouettes (310) attached below the wire mesh. By their shape, size and direction these stylized footprints illustrate that boots must be inserted in pairs, show the direction of insertion for each pair, indicate that the smaller pair fits nearest the bag, and that long boots must rest with their toes on the edge of the side-rail. Text instructions on the footprints communicate the preferred order for loading and unloading boots, and that heels must be positioned on the deck and backed up against the side rail.

A preferred alternative to individual stylized footprints is to mount a sheet of vinyl or other suitable material just underneath the mesh, so that it extends between the side-rails for the full 20" length of the boot deck. The footprints can then be painted directly onto the sheet, making for easier manufacture. A sheet thickness of between 0.010" and 0.020" offers sufficient stiffness while still allowing the sheet to be sandwiched between the mesh and the side-rails and to be held in place with the same fasteners that hold the latter two elements together. A cut-out in the sheet allows clearance for the undercarriage mounting bracket projecting up through the plane of the mesh.

To keep rain and snow out of the boots, and to help the boots retain heat during the walk to the slopes, the cart can be furnished with a boot cover. A suitable boot cover comprises a rectangle of flexible waterproof fabric that has edges folded and sewn into hems through which a loop of elastic such as shock cord has been run. Where two hems meet at a corner, the corners are left open to facilitate threading and fastening the shock cord. One narrow end of the rectangular cover is anchored to the bottom of the mesh security bag, adjacent to the uppermost boot (314). Hog rings can be used to join the shock cord to the vinyl-covered cable of the bag. By stretching the cover out and pulling it over the leg of the lowest boot, the leg portion of all four boots can be covered. When not in use, the boot cover is rolled up and held in place at the bottom of the mesh bag by two pairs of hook-and-loop fasteners or other suitable means. Light-weight shock cord of about 0.125" diameter and of sufficient length to allow the cover to be easily stretched over the lowest boot also serves as an additional restraint to keep the boots in place.

The combination of the boot cover stretched over the boots and the vinyl sheet underneath the boots serves to keep the boots warmer on the walk to the slopes.

FIG. 5b One-Piece Formed Sheetmetal Deck with Boot-Mounting Clips, Emb. Y

The platform or deck (300) of FIG. 1 is cut from a single sheet of metal such as aluminum and formed to generate the bent features shown. The upper part of the deck to which the cable mesh bag (not shown) is secured, does not incorporate the wire mesh surface of the earlier embodiment. Because the earlier embodiment of the cable mesh bag used the wire mesh as part of one side, the cable mesh bag used with this style of deck has all of its component panels sized so that the cable mesh panels, when joined together, form a complete bag. Eight identical wire clips (102) serve to secure four ski boots to the deck. Although the clips are identical, clips that hold the toe of the boot are mounted differently from those holding the heel. The toe clips (104) are arranged to be able to slide in parallel slots against an elastic tension, while heel clips (102) are positioned near the opposite edge of the deck. Ski boots are mounted by first angling the toe of the boot down to the surface of the deck and inserting the toe lip under the toe clip, then sliding boot's sole toward the edge of the deck so that the toe clip is pulled along. When the heel of the boot has followed far enough to be inboard of the heel clip, the heel lip is captured by lowering the heel to the surface of the deck, and then allowing the heel to be pulled back under the heel clip.

This form of heel and toe clip automatically compensates for variations in the heights between the heel and toe lips and the boot sole. Both clips are arranged so that they can pivot below the level of the deck when loaded. The clips lean outwards until each pinches the boot down onto the surface of the deck. The angle of the toe clip to the deck surface provides a component of force that pulls the boot down onto the deck. The tension provided by the elastic element to the toe clip mast be sufficient to hold the boots firmly on the deck.

Apertures provided in the deck surface are shaped so that the toe and heel clips can be installed without causing any plastic deformation of the wire form.

Apertures in the deck web (108) serve as anchors for the elastic polymer that keeps the toe-clip under tension. The overbent skirt provides slots (110) for attaching the anchor cables that stabilize the deck relative to the undercarriage. Keyhole-shaped apertures (112) provide for easy tethering of the lengths of shock cord that stretch a fabric cover over the cable-mesh security bag. A knot or ball at the end of each length of cord is held by the narrow end of the keyhole.

At the end of the deck furthest from the boot mounts, a slot with a narrowed waist (118) provides a place to store the unit's coiled locking cable (not shown.)

Figure 5C:
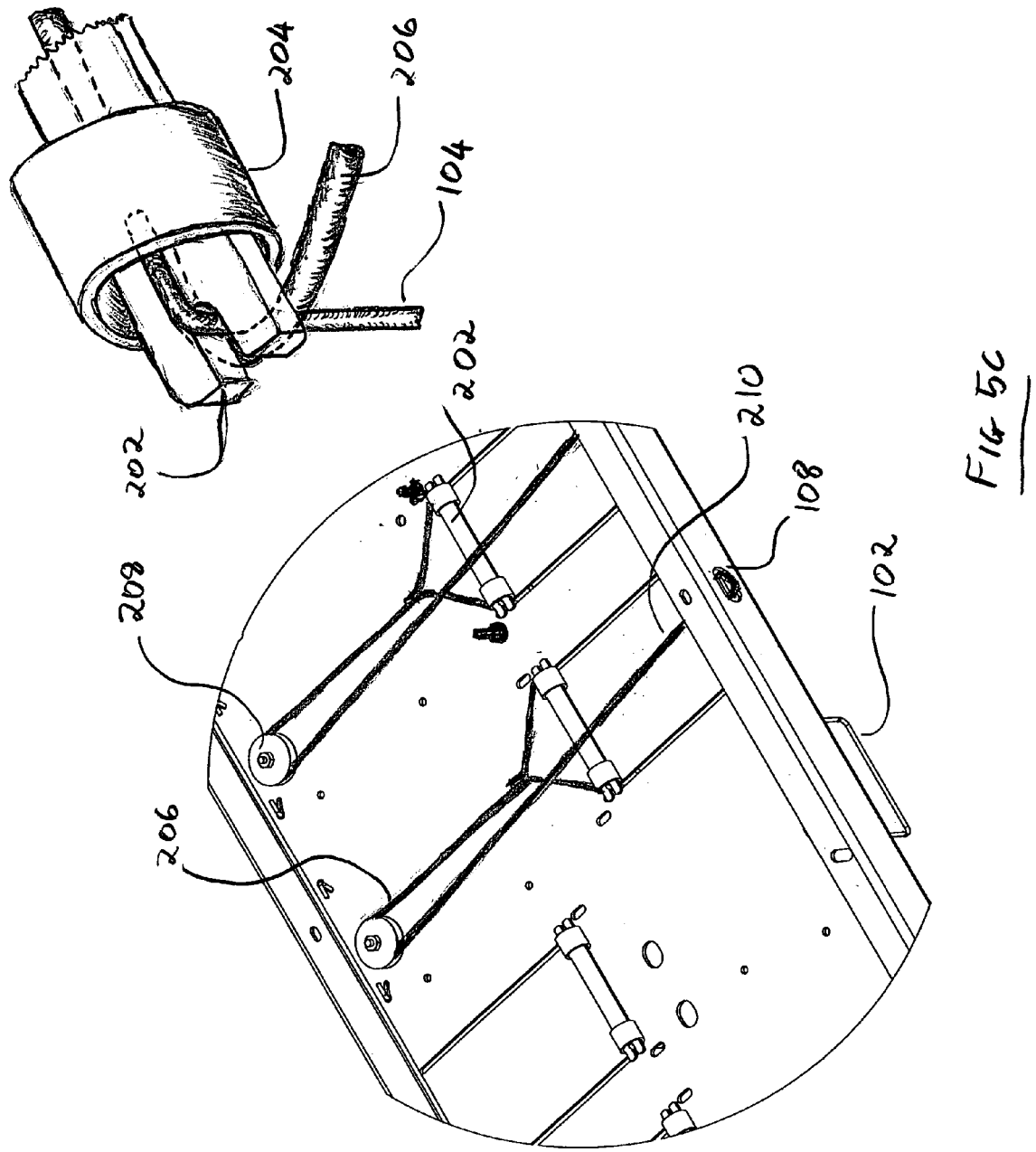

FIG. 5c Arrangement for Tensioning the Toe Clips, Emb. Y

FIG. 5c shows a view of the underside of the portion of the deck that carries the boots, with the tensioning arrangement shown for one pair of boots.

The tensioning arrangement for the toe clips includes an elastic cord (206), a sheave (208) and the bale assembly to which the toe clip (104) mounts. Use of a longer elastic element by means of the sheave and the anchor point at (108) allows the tension to be more constant over the clip's length of travel. This arrangement also means that longer, and therefore heavier boots, are automatically held with greater force to the deck.

A tubular spacer (204) supports a cross-bar (202) in such a position that the hook of the toe clip (104) is held away from the underside of the deck. These elements are sized so that the gap between the underside of the deck and the inside of the toe clip hook is the same as the difference in height above the deck surface. This arrangement allows for the toe and heel clip wireforms to be identical, although other arrangements may be preferred for larger-quantity production.

Skewing of the cross-bar is reduced by attaching each of its ends to the elastic cord in the form of a yoke as shown. The toe clip is retained in its slot in the cross-bar by the elastic cord (206), and is prevented from dropping by the tubular spacer.

The elastic cord forming the yoke passes between the cross-bar and the upper wall of the spacer, along the cross-bar, and back via a similar path through the opposing spacer. The elastic cord (210) passes underneath the cross-bar, thus keeping it positioned against the underside of the deck while allowing the toe clip to give way without being damaged if necessary.

When no boot is present, the toe clip is held more or less perpendicular to the deck surface so that the aperture remains large enough for the toe of the boot to be inserted. This is achieved by providing posts for the cross-bar to rest against at the same stage that the clip wire comes up against the ends of the slots in the deck. Since the elastic cord tension is applied to the cross-bar assembly at a level between the two support points, the toe clip remains in the desired position.

The heel clips are also kept off the surface of the deck and ready to receive the heel. This is achieved by means of a coil spring threaded on to each arm of the clip, pushing against the deck surface at one end and a retainer (such as a washer trapped by swaged ears) at the other.

FIG. 6 Partially Loaded and Folded for Shuttle Bus Access.

At many ski resorts, shuttle buses are available to carry skiers from outlying parking lots to the base facilities. In most cases the buses have outside racks for carrying skis and poles. The cart allows its users to take advantage of shuttles by folding down into a roll-on configuration that two people can easily lift into the bus and that is narrow enough to traverse the aisle.

Users unclip skis or boards from the cart and place them in the shuttle's racks. Boots, poles and the storage bag remain in place. To fold the main handle down as shown in the figure, one lifts the strut free of its connection with main frame. As the handle folds down, the wheels also fold down towards the platform and draw in to a narrower span than before. The figure shows the cart resting on a partially-folded handle, but the handle must be pushed all the way down in order to rotate the wheels into the desired position. The parallelogram arrangement of the golf-cart undercarriage keeps the wheels parallel to each other and perpendicular to the ground, so that the cart can be wheeled like a dolly down the aisles of the bus.

In this embodiment, the platform, undercarriage and ski poles are arranged so that they do not interfere with each other when the cart is in this "roll-aboard" position.

FIG. 7 Partially Loaded and Folded for Shuttle Bus Access, Emb. Y

In the "dolly" or narrow mode configuration, the bottom hoop is deployed so that it supports the overhung weight of the ski boots (not shown) and prevents the cart from toppling over backwards. The extension handle is shown stowed in this figure, but the length of the handle is such that it need not be stowed for the dolly configuration.

FIG. 8 Ski Mounting, Emb. X

The preferred loading sequence for embodiment X calls for the skis to be mounted only after the boots have been mounted and the cart is returned to the upright position. If the skis are mounted before the boots, and the cart is parked on forward-sloping ground, and the cart is bumped from the rear, the cart and skis could topple forward. Mounting the boots first provides enough counterweight to avoid this possibility.

Skis are mounted by using the nested pairing that skiers are familiar with. With the skis held pointing upwards, the nested pair is first turned so that the binding lever of the outside ski will be above the binding lever of the inside ski. In this embodiment, the ski cart has two pairs of binding shoes (402) configured to engage the receiving cavities in a forward ski binding. After positioning the bottom of the skis just ahead of the nearside wheel, the inner ski binding is lowered onto the pair of binding shoes as indicated by the arrow. The pair of skis is then secured by bringing together the two ski straps (503, 505) and drawing the adjusting strap tight while squeezing the two skis together.

The pair of skis is thus supported by the binding shoes and restrained by the ski straps.

FIG. 8a Ski-Mounting Details, Lower Ski Mounting Bracket, Emb. Y

The pair of skis (411) rests against a sleeve (408) and non-slip trim (410) on the lower ski mounting bracket (413). An elastic cord (502) or some other form of strap holds the pair of skis in place against the mounting bracket (413) and the non-slip trim (410). After being stretched by hand, the cord is held in tension by pulling it through the pair of slots (414) and (416) under tension. These slots are in a material that is thin relative to the diameter of the cord, such as the sheetmetal elbow piece (403), and are sized so that the poisson expansion of the cord when the end tension is released helps to prevent the cord from slipping. A polymer cord such as the "Polyflex" brand manufactured by Proflex Manufacturing of Macon, Ga., works well in this configuration.

Figure 8B:
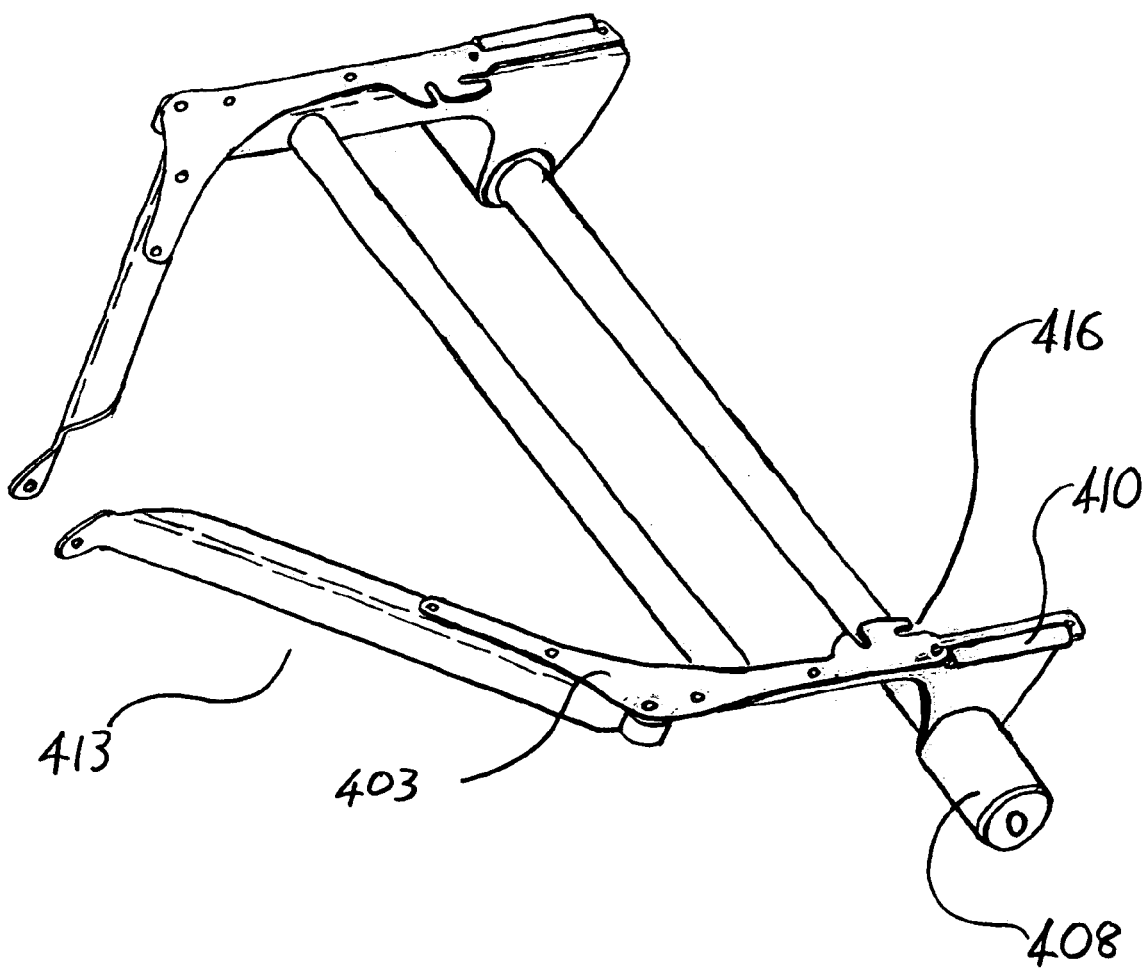

FIG. 8b Lower Ski Mounting Bracket Main Arms, Emb. Y

The lower ski mounting bracket main arms of this embodiment are offset from the main pivot point in such a way that the distance between the ski horn and the point where the ski rests against the lower bracket is short enough to accommodate bindings for small boots. The offset also permits the tail of each main arm to clear the bottom of the ski horn when the main arm is folded. The front pivot of the main arms is also offset, to prevent interference with the undercarriage support strut in the folded configuration.

Figure 9:
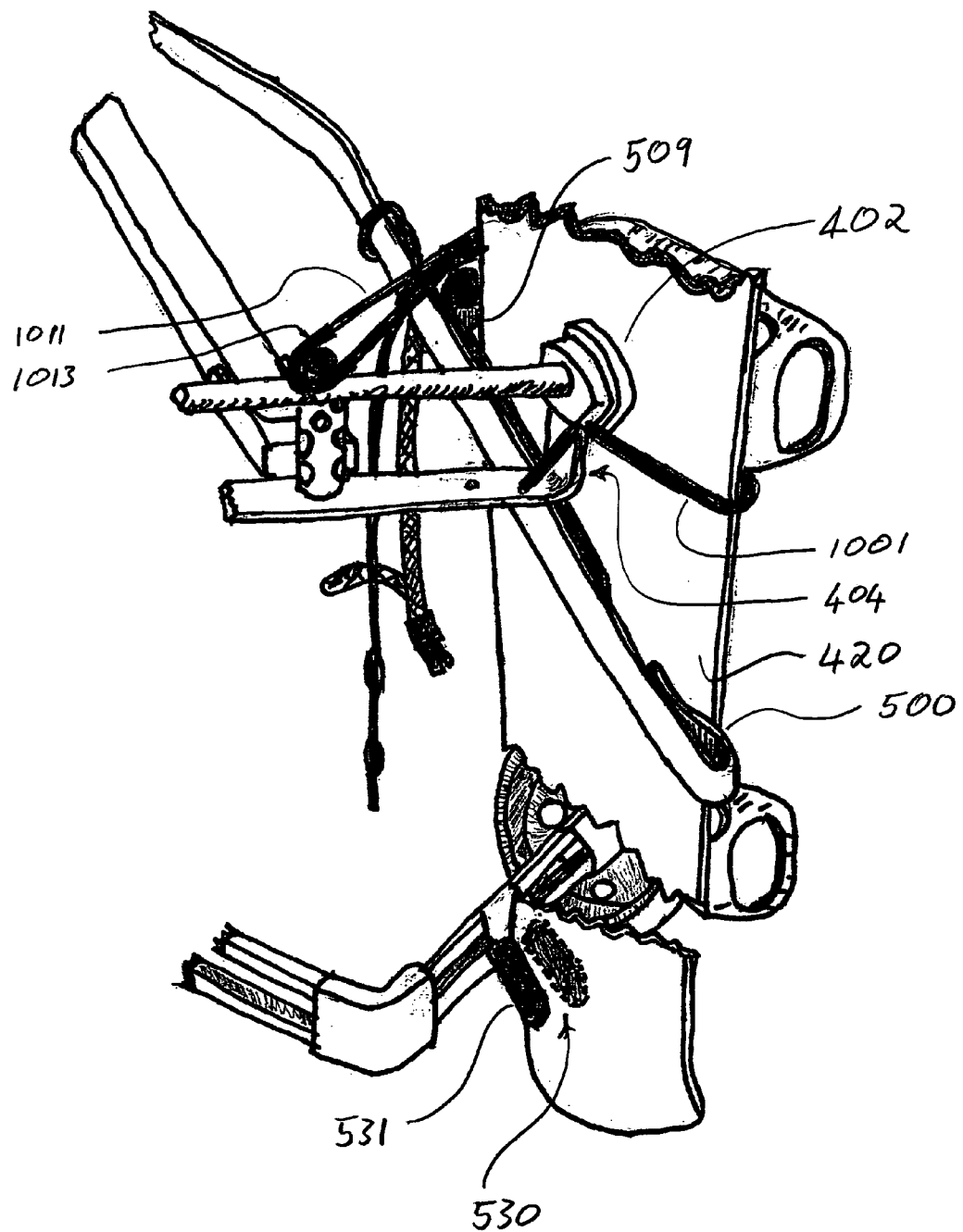
Figure 10:
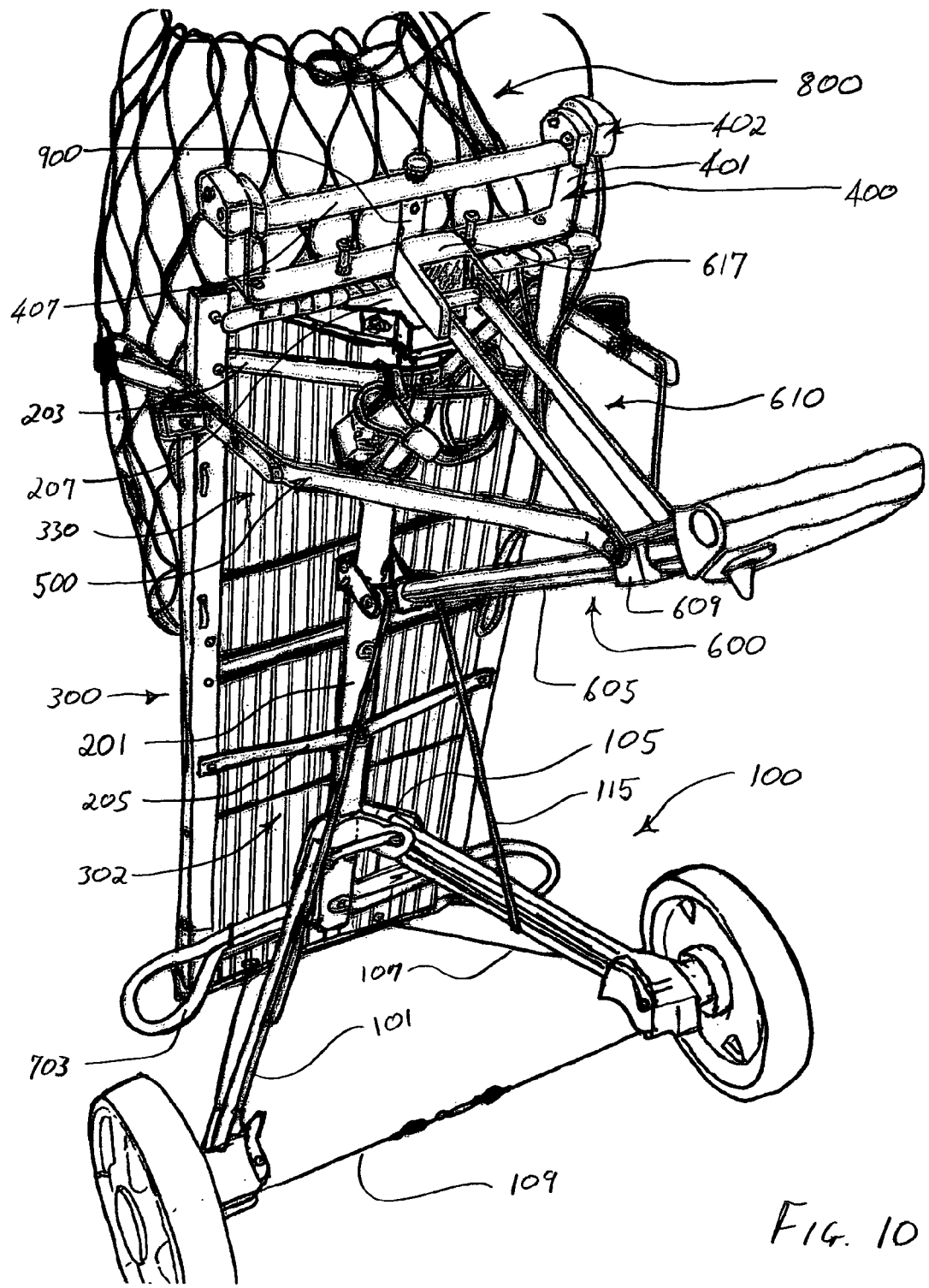

FIG. 9 Snowboard Mounting, Emb. X

To mount a snowboard, the lever (508) incorporating the edge guide (513) is rotated through 180 degrees from its ski position (to the rear of the main platform) to its snowboard position in front of the main platform.

Mounted to an arm of the undercarriage there is a snowboard guide (530) that serves to restrain the lower end of the snowboard. The guide is configured so that the slot formed by the two prongs is in a plane that allows the snowboard to rest against the lower mounting bracket as shown (513). The guide prongs are covered with a material such as rubber or plastic hose (531) that protects the surface of the board and also tends to grip the board due to the material's resilience and frictional properties. If the sheathing material is resilient so that it must give way when a snowboard is inserted, then the combination of slot size, sheath thickness and sheath material properties must be such that a snowboard can be reinserted if the sheathing material has stiffened due to resting at cold temperatures. As part of the color-coding scheme for facilitating use of the cart's many features, this embodiment color-codes the snowboard guide blue because of the mnemonic value of the "blue/board" association.

A vinyl-covered length of aircraft cable (1001) that emerges from the upper ski mounting bracket (404) functions as a locking cable for boards and skis. Its also functions to hold a snowboard in place by means of a loop of shock cord (1011) that is attached to the locking cable by hog rings. The raw joint between cable and shock cord is rough, so it is desirable to sheath the joint in rubber tubing held in place by heat shrinkable tubing. This sheathing protects both the snowboard and the shock cord where they press against each other. The looped end of the shock cord is also protected by a length of thin-walled plastic tubing (1013). This tubing is also color-coded to the color chosen for snowboard-related fittings on the cart, which is blue in this embodiment.

To mount a snowboard, the lower end of the snowboard is inserted into the snowboard guide so that the bottom of the 'board rests on the ground. Then the central section of the snowboard is leaned against the lower mounting bracket (513) and the edge guide (509). The locking cable (1001) is then drawn underneath the upper binding as shown, and brought around the forward edge of the snowboard above the edge guide. The shock cord is stretched and hooked over the head of the locking post bolt.

The shock cord pulls the upper part of the 'board inwards, but the snowboard guide is located laterally on the undercarriage arm so that the upper part of the 'board does not come up against the ski binding shoes (402). This arrangement maintains pressure between the underside of the 'board and the slip-resistant sheathing material that covers the edge guide (509) and the loop at the rear of the lower mounting bracket (513). This loop serves to push the trailing edge of the 'board outwards so that it does not interfere with the toes of long ski-boots projecting over the edge of the boot deck, and also to strengthen the cantilevered end of the lower mounting bracket.

When the cart is tipped forward from the upright position to the balanced position for walking, the bottom of the snowboard is lifted off the ground.

For all but the longest snowboards mounted on carts of the dimensions shown below, the loop of shock cord and the locking cable both pull upwards against the bottom of the binding and hold the bottom of the snowboard clear of the ground when the cart is being pulled along. A shock cord diameter of 0.125" with the correct length and attachment point effectively holds the snowboard in place even over rough ground.

FIG. 10 Unloaded, View from Front, Emb. X

This view shows several main sub-assemblies of this embodiment of the cart. The undercarriage (100) includes the wheels, parallelogram arms (101), and undercarriage attachment bracket (105). Bracing wires (107,109) act to stiffen and strengthen the undercarriage.

The main handle (600) folds or extends the parallelogram arms through the undercarriage struts (115). The main tube (201) forms the structural spine of the cart in this embodiment. The lower mounting brackets (500) attach to a slider (609) mounted on the main handle tube (605). The handle is held in the deployed position by the main handle strut (610), which has a latching cap (617) that slides on to the nose of the cradle (207).

The main platform (300) is constructed of two side rails (301) connected to two sections of wire mesh. The lower part of the platform carries boots and is referred to as the boot deck (302). The upper part (380) supports the security bag (800). Two cross-braces (203,205) provide for greater main platform stiffness. Two ski pole stirrups (703) are attached to the underside of the boot deck.

The upper mounting bracket assembly (400) includes a u-bracket (401), two pairs of ski binding shoes (402), the cross handle (407) and the locking post (900). The cradle (207) is a resin fitting used here to transfer load from the upper mounting bracket into the main tube.

The undercarriage, main tube, main handle, upper yoke and latching cap of this embodiment are modified components of a mass-produced golf pull-cart. Certain details of this submission relate to incorporation of these components drawn from the Model M300 golf pull cart sold in the U.S.A. by Bag Boy Inc. The components are used in a different arrangement from that of the original golf cart. The main tube has one end bent into an offset, which on the golf cart serves to align the lower cradle that supports the golf bag with the upper cradle. On the golf cart, the undercarriage is attached to the main tube near this offset. For use in this embodiment of the ski equipment cart, the main tube is inverted, so that the offset is at the upper end of the assembly rather than near the undercarriage. Here it serves instead to support the cradle.

The cradle, in turn, is adapted from the upper cradle of the golf cart. To achieve these modifications, the main tube is drilled for new positions of the undercarriage, main handle and other fittings.

Other mass-produced golf pull-cart frames could be adapted in a similar way, provided the components are sufficiently strong and durable and the overall golf cart configuration is similar to that shown here.

Figure 10A:
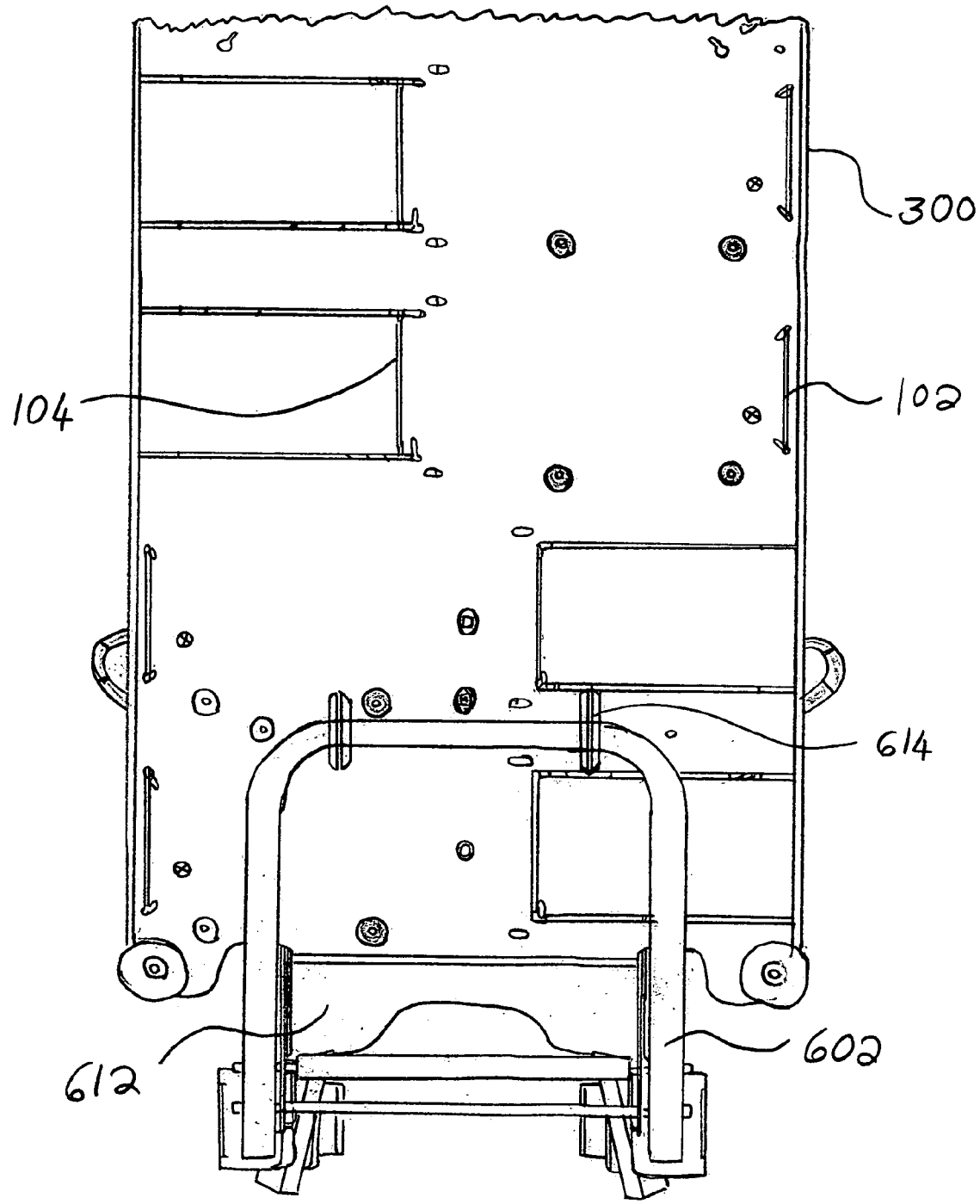

FIG. 10a Storage Position for Bottom Handle, Emb. Y

The bottom hoop folds back over the deck for storage, and does not interfere with the boot clips.

Figure 10B:
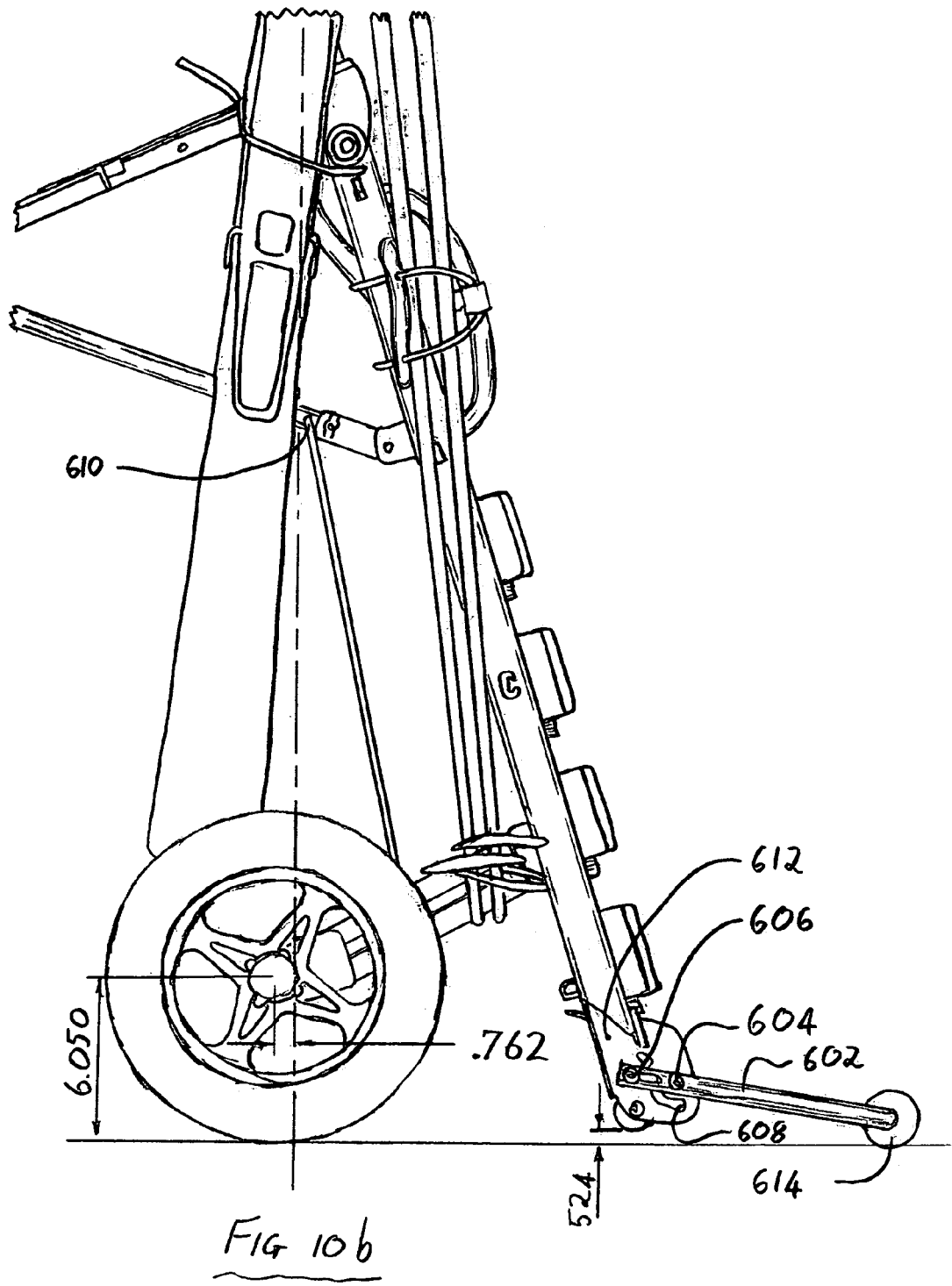

FIG. 10b Partially Loaded, View from Side, Emb. Y

The cart rests on a rear rest assembly incorporating a bottom hoop (602) provided with rests or bumpers (614) that keep the handle portion clear of the ground. A pivot rod (604) and a detent rod (606) extend to the other side of the bottom hoop. The detent rod locates the bottom hoop in three different operating positions by means of the slot (608). A compression spring within the hollow tube (602) and between (604) and (606) keeps the detent bar engaged.

The subframe (612) serves as the mount for the hoop assembly and stiffens the deck plate structure by mounting to the underside of the deck.

The undercarriage deployment strut (610) pivots off a different hole in the main handle tube than that originally provided by the golf pull-cart manufacturer. This allows for the correct range of motion for the undercarriage between the standard traveling or wide-mode configuration and the narrow-mode configuration.

Figure 10C:
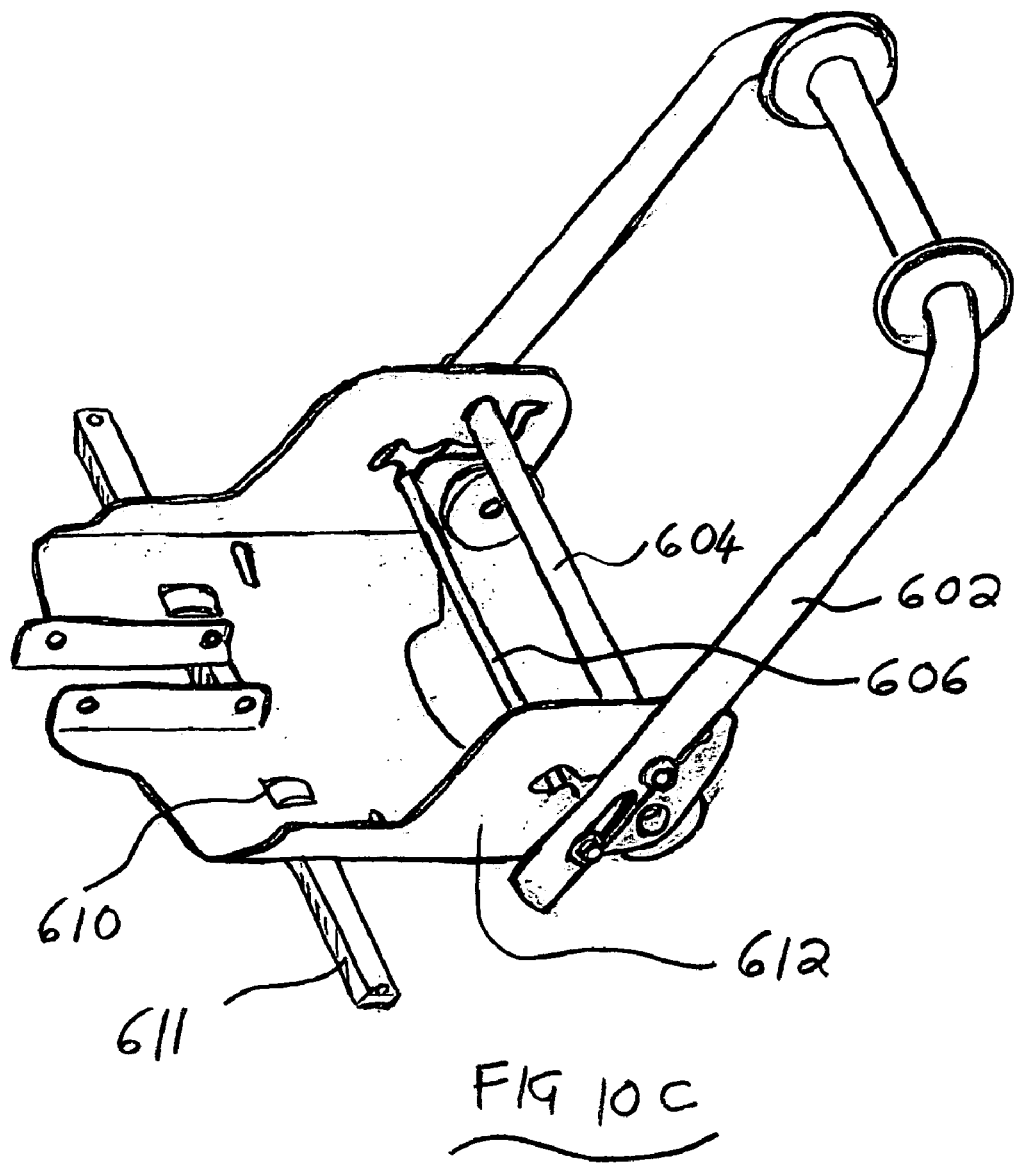

FIG. 10c Subframe and Kickstand or Bottom Hoop Assembly, Emb. Y

The subframe (612) connects to the main deck.

Figure 11:
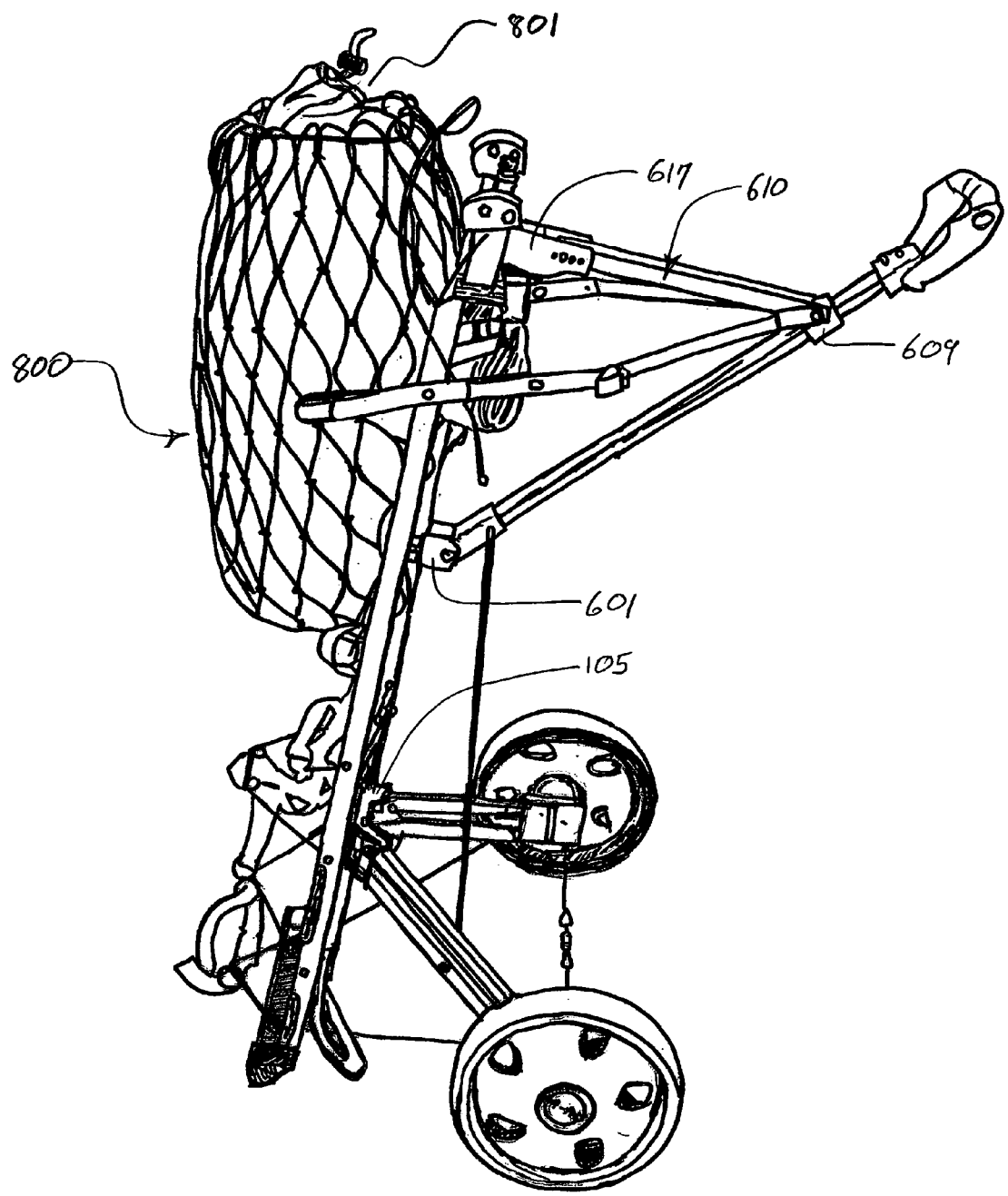
Figure 11A:
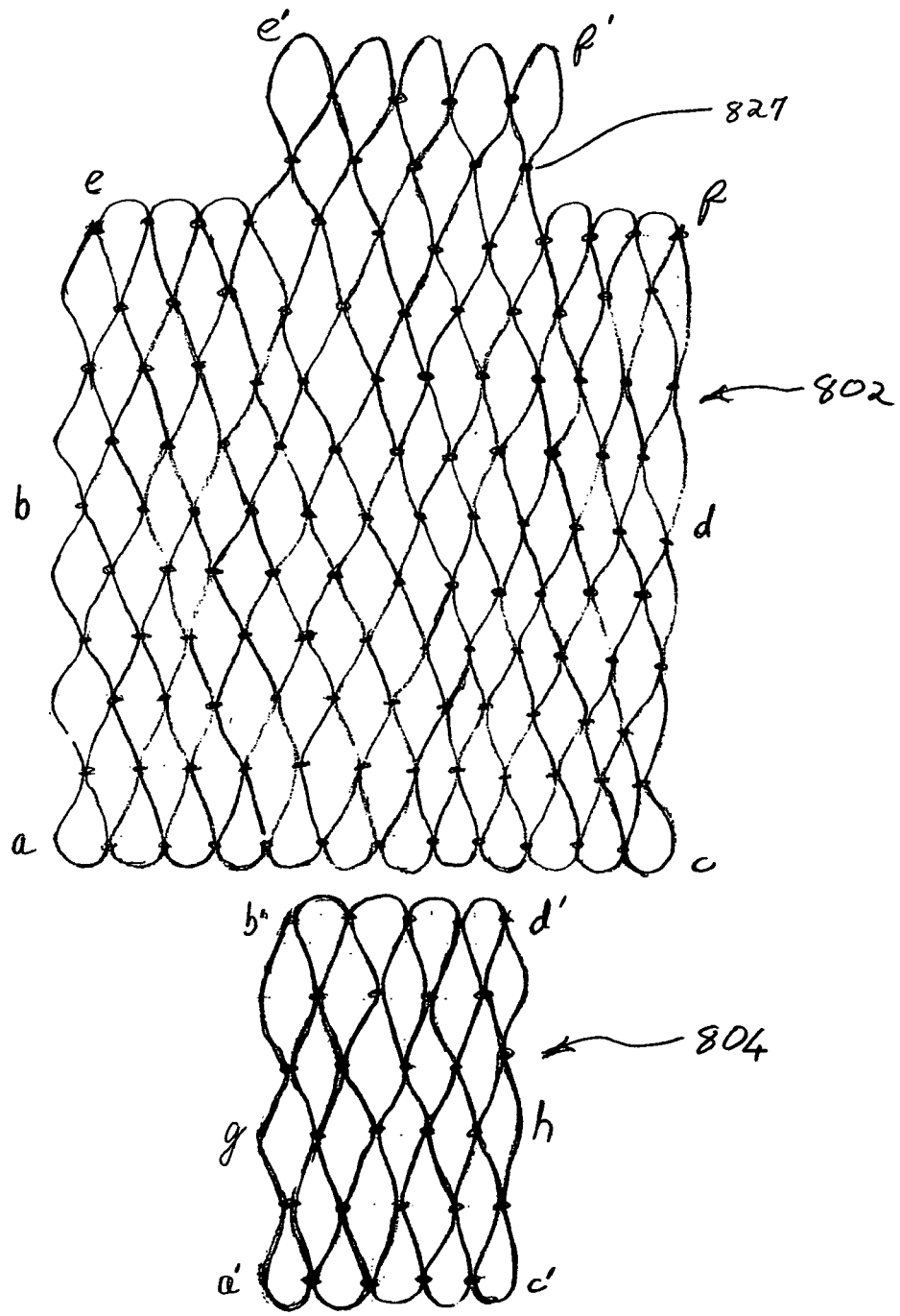
Figure 12:
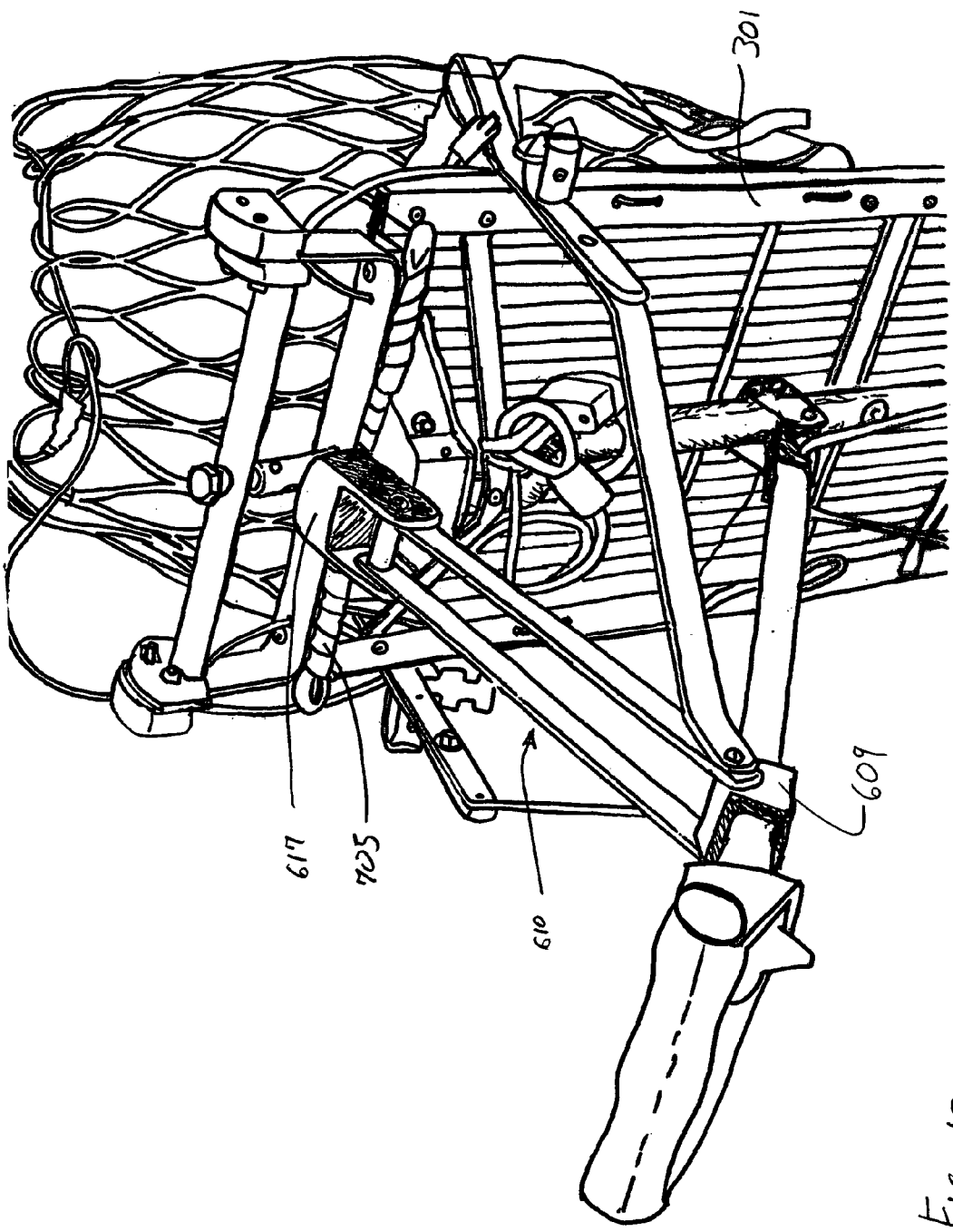
Figure 12A:
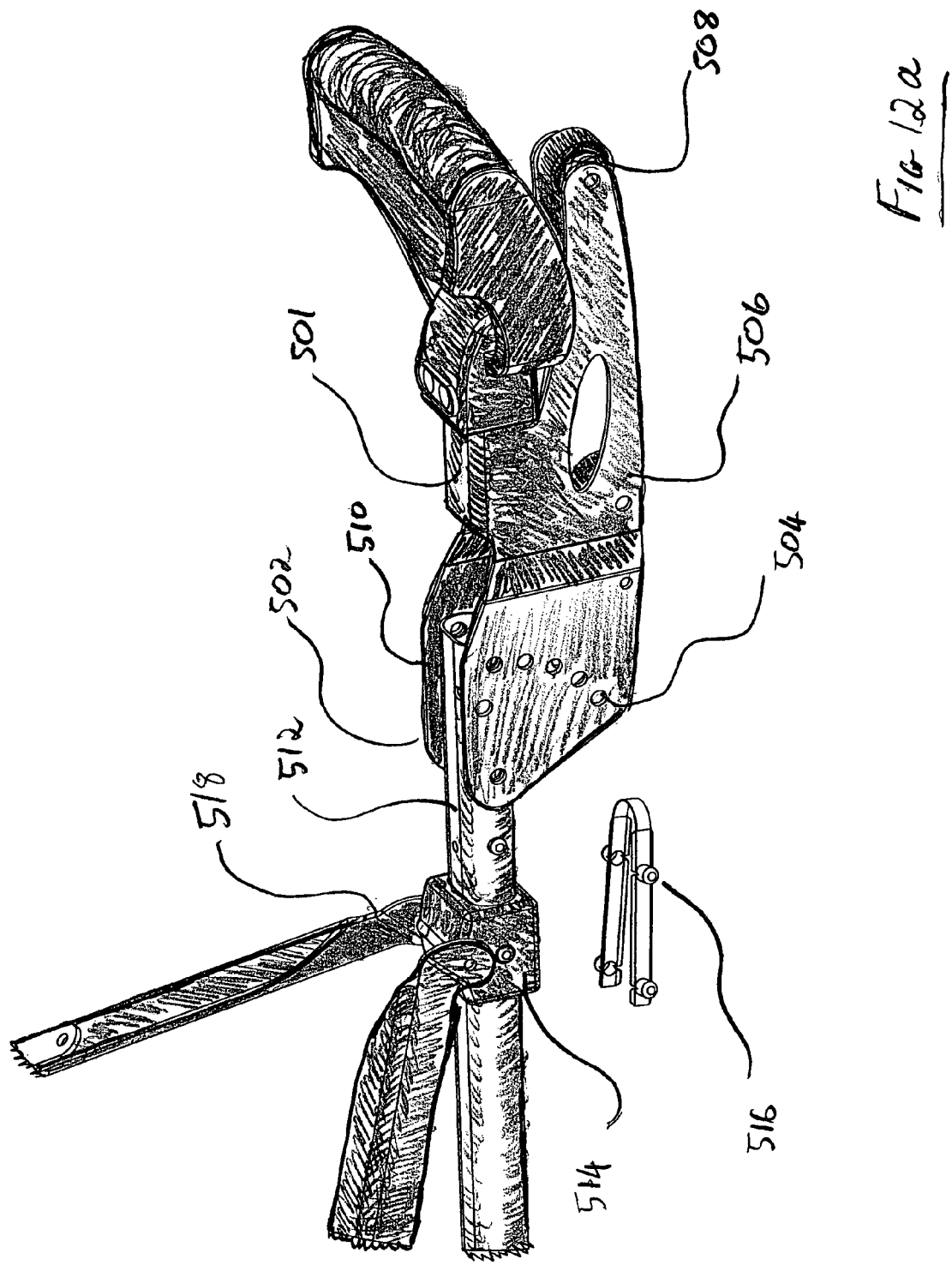

FIG. 11 Unloaded, View from Side.

The main handle hinge bracket (601) provides the fulcrum for the main handle's operation. To allow the handle and undercarriage to fold up completely for storage, the distance between the handle hinge bracket and the undercarriage bracket (105) is kept the same as on the original golf cart assembly.

The main handle strut (610) serves to displace the main handle from its original position on the golf cart, where the latching cap (617) was connected directly to the main tube slider (609).

The wheels used in this embodiment are the wheels supplied with the Bag Boy golf cart, with the transverse overhang of the wide golfing tires trimmed down flush to the wheel rim. To allow easier movement through snow and slush, it is best for the wheels and tires to be as narrow as possible. A narrow profile allows the wheels to cut through the snow onto firm ground, and avoids the tires from having to push a berm of snow ahead of them. For small-volume production, trimming the original tires is a suitable solution, but a better solution where economically feasible is to have wheels and tires that are between 0.50" and 1.0" wide, with solid rubber tires that have a tread similar to that used on mountain-bike tires. Such a tread has the practical purpose of providing better traction when the cart is being pulled across an icy slope, and the aesthetic purpose of differentiating the product from golf carts and making a connection with mountain biking.

The tires used in this embodiment have an outer diameter of nine inches, but using a larger diameter wheel would provide for easier travel over rough ground, curbs and steps. Wheels giving an O.D. of between 12 and 16 inches would be desirable if economically justifiable.

The integrated security bag (800) is a key aspect of the invention, as it allows users to store their street shoes right at the slope, without the time and effort of two or more trips to the base lodge that may require traversing several flights of stairs to find and rent a locker. It is desirable that the security compartment on the cart be collapsible for compact storage and transportation of the unit. In addition to the design illustrated here that uses flexible aircraft cable in the form of a mesh bag, other collapsible designs that make use of folding and interlocking rigid panels are possible. When a cable mesh bag is used for the security compartment, the users' belongings are protected from the weather and hidden from view by use of a waterproof nylon stuff bag (801) cinched closed by a drawstring and carried inside the cable mesh bag.

Another approach to providing a security compartment is by means of a non-collapsible compartment mounted on the upper part of the platform. Such a compartment could be in the form of a hard-sided reinforced resin case typical of some suitcases and briefcases, or in the form of the type of aluminum equipment case often used for photographic equipment or tools. To compensate for the security compartment not being collapsible, the compartment could be detachable from the platform.

FIG. 11a Security Bag Panels.

The security compartment shown in this embodiment is in the form of a flexible bag made of vinyl coated aircraft cable. This version uses two panels of the cable mesh that are joined together and secured to the wire mesh of the upper platform to form a bag open at the top end.

Stainless steel hog rings are the preferred means of tying the cable together into a mesh. At the nodes of the mesh, adjacent pieces of 7×7 galvanized steel cable of 3/32" diameter and vinyl coated to a 0.125" diameter are effectively joined by ½" size, C-ring style hog rings (827). For a more flexible mesh, 7×19 cable may be used. The hog rings are applied by a pneumatically-powered automatic hog ringing tool. The vinyl coating serves firstly to allow the hog rings to firmly grip the pair of cables so that they do not slip relative to each other, and secondly to provide an acceptably smooth tactile feel to the mesh. Power tools for hog rings smaller than ½" are currently not readily available in the U.S.A., so the incorporation of the vinyl coating as a filler or shim in the joint is useful if the mesh is to be kept light and flexible by using small-diameter cable. A grade of vinyl that remains fairly flexible at low temperatures and that resists damage from sunlight is preferred.

Although heavier and lighter gauge cable may be used, the 3/32 size provides an attractive combination of weight, flexibility, resistance to cutting and ease of hog-ringing.

Hog rings are attractive for this application because the cost of the rings and the installation cost is a fraction of other methods used to produce cable mesh.

The two mesh panels of FIG. 11a are woven on a loom disclosed in a separate submission. Each panel is woven using a single length of cable (804) at e, f, b' and d', with the ends of the cable located away from the bag opening. To form the main body of the bag, the smaller panel is joined to the larger bag panel (802) by hog-ringing. Corner a' is connected at a, b' connected at b, d' at d and c' at c. Additional hog rings are used to complete the joins between a and b and d and c. The front opening of the bag is then formed by the opening remaining around a-c-c'-a'.

Part of the bag bottom is formed by folding the lateral wings and the tongue e'-f' of the large panel towards each other and joining the loops at suitable intersection points. Then the smaller panel partially completes the underside of the bag nearest the mouth completed by the smaller panel, still leaving an opening in the underside that will be closed in the next step by the floor of the platform. To do this and complete the security compartment, the mesh assembly is anchored to the upper platform by weaving a separate cable between the platform's cross-bars, side-rails and the edges of the mesh assembly. The anchoring cable captures the edges along b-e-e'-f-f-d-d'-b'-b. Note that only edge b'-d' is woven to the platform, leaving the mesh along b-d free.

The axial orientation of the diamonds formed in the mesh allows the mouth of the mesh bag to be neatly drawn closed by a cinching cable, and also allows the bag to collapse when empty. To achieve a neat, secure closure when the cinching cable is drawn tight there must be several rows of mesh that form a complete tube behind the mouth of the bag. Hence the smaller panel has a length a'-b'. This length has the unintended result of allowing a filled bag to lean outwards and away from the platform. To correct this, the bag is held in place against the platform by cable ties at g and h. These fastenings also serve to expand the mesh locally, helping to keep the mouth of the bag open for ease of use.

FIG. 12 Main Handle, Upper Structures and Lower Mounting Brackets, Emb. X

In this less preferred version of the main handle strut arrangement, the base of the handle strut slides with the main tube slider (609), rather than being pivoted from the side-arms of the support prop as shown in FIG. 15.

The main handle strut (610) is held in place by the latching cap (617) that fits over the cradle's nose. The angle of the strut to the nose is near to 90 degrees, so that the cap does not slip off the nose when the cart is resting in the horizontal position for boot loading.

The side-rail (301) at the right of the figure shows the positions of the holes for threading the security bag anchor cable and the fasteners connecting the side rail to the upper platform mesh and upper brace.

The ski pole bumpers (705) wound onto the outside cross-bar of the mesh flange also serve to cap the ends of the protruding cross-bar.

FIG. 12a Adjustable Main Handle, Emb. Y

The handle extension piece (501) serves to extend the handle's length, provide height adjustment via the fan of holes (504) (linch-pin not shown) and keep the handle grip clear of the ground during boot mounting by providing bumpers (508) and (506) as rests. Hole (510) is located so that it engages with button (516) when the handle extension is folded counter-clockwise (in the view shown) for storage.

The ends of the lower ski bracket (518) are held by the slider (514) which in turn is located on the main handle tube (512) by the pole-clip (516).

Figure 13:
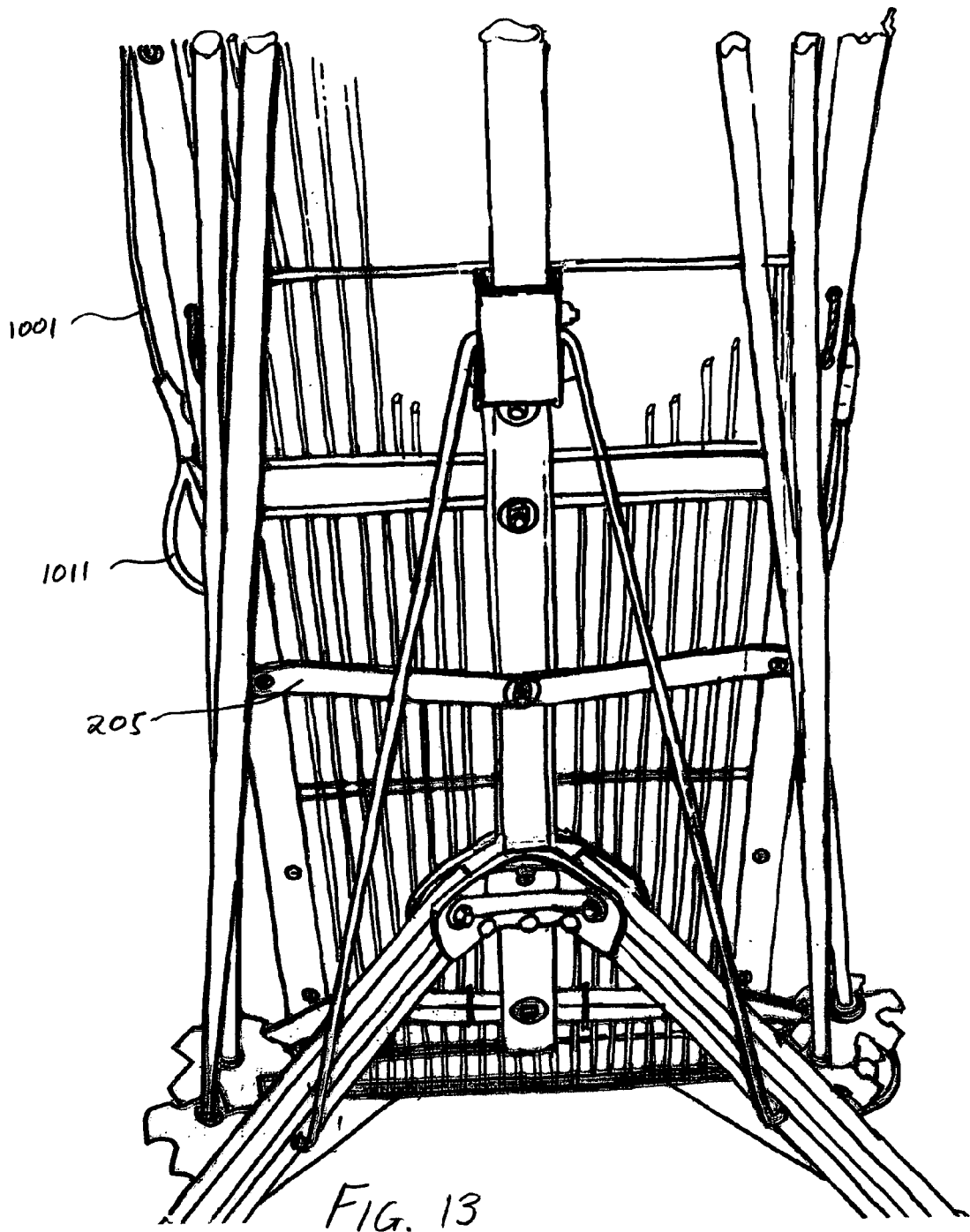

FIG. 13 Bottom of Platform, Undercarriage and Ski Pole Placement.

The shock cord loop (1011) on the ski locking cable (1001) is shown hanging free on the left of the figure. The preferred arrangement is to use the shock cord loop to hook the cable in place on the side-rail. This is conveniently achieved by having the head of a boot anchor wire mounting screw stand off from the side-rail on a short sleeve. The screw that is near to the lower cross-brace (205) serves for this purpose, and the sleeve may be color-coded to match the sleeve on the shock-cord loop.

The locations of some of the fasteners connecting the side rails to the boot deck mesh and the lower cross-brace are visible in this view.

FIG. 14 Boot Deck from Above.

The boot deck is defined as the lower part of the main platform on which the ski or snowboard boots are strapped.

This view illustrates the construction of the main platform, omitting some of the axial mesh wires for clarity. The principal structural components of the main platform are the side rails (301) and the decking (303) or floor of the platform. For the side rails, aluminum angle of 1"×1"×0.125" provides convenient mounting and fastening surfaces, and is less expensive in moderate quantities than aluminum tubing.

In this embodiment, a 12-inch length of ventilated closet shelving made from epoxy-coated wire serves as the floor of the platform. For the boot deck part of the platform, twenty-inch wide commercially-available shelving is used upside-down, so that the flange (311) faces upwards to help support the lowest boot anchor wire (309). This orientation also places the cross-bars on the shelving on the upper side of the boot deck, and these help to form bays in which individual boots rest. The surface of the boot deck is coated with a non-slip paint or non-slip tape to help grip the boots firmly when the cart is in the upright position and moving over uneven ground.

For the upper part of the platform (330), a second 12-inch length of ventilated closet shelving (331) is used, but in this case cut from 16-inch wide shelving stock. This section of wire mesh is installed with the edge flange facing down so that the axially-smooth surface of the mesh wires forms part of the bottom surface of the security bag. The location of cross-bars below this surface allows for easier insertion and removal of items into the security bag.

The fastening between the side rails and the ventilated shelving mesh is achieved by aluminum rivets and fender washers. The fender washers span the ½" gap between the wires of the high-density shelving. To ensure that the washers maintain their grip on the wires, the washers may be given a bow or lip that helps to trap the wire. A similar fastening arrangement is used with machine screws between the mesh and the main tube. At locations where a cross-bar is gripped by one edge of a washer and there is no parallel cross-bar to support the opposite edge of the washer, a spacer tube is used to keep the washer perpendicular to the fastener.

The locations of these fasteners have been selected in part so that they do not prevent the soles of the boots from resting squarely on the mesh of the boot deck. The various figures show where these locations are. Fasteners used for the upper and lower stabilizing braces do double duty in also holding the side rails and platform mesh in place.

Safety-tread tape (323) is shown installed on the edges of the side rails to help prevent the boots from sliding down the boot deck. Rather than discrete short lengths of tape under each boot, it is preferable to use a continuous length of tape extending the full length of each side-rail.

For large-volume production, it may be preferable to produce a platform of monocoque design, employing wire mesh, fiber-reinforced resin, injection-molded plastics or formed sheetmetal. Embodiment Y shown elsewhere uses formed sheetmetal. Such designs could also be arranged so that the undercarriage arms are attached to half-brackets near the lateral extremities of the platform rather than to one central bracket.

FIG. 14a Dimensions, Viewed from Behind.

The distance spanned by the wheels is great enough to provide stability against lateral toppling, but narrow enough to allow easy passage through a standard doorway. The indicated platform width of twelve inches is a result of using standard material widths, but could be wider.

Instead of arranging the boots transversely on the boot deck, an alternative arrangement could have the boots in pairs facing axially up the platform. The axial arrangement has the advantage of a less demanding boot anchoring arrangement because the gravitational overturning moment on each boot is easily countered by restraints near the toe of the boot. However, the axial arrangement has the disadvantage of requiring a boot deck that could be up to eight inches longer than the current embodiment.

FIG. 15 Lower Mounting Bracket, Main Handle and Support Prop.

The two lower mounting brackets each provide an additional line of support for a pair of skis or a snowboard. The arrangement of FIG. 15 is the preferred configuration, differing from the arrangement in other figures. The front ends of the lower mounting brackets share a common machine screw connecting them to the main handle slider (609).

The ground prop (618) is long enough to keeps the grip of the handle (607) an inch or so off the ground when the cart is horizontal for boot mounting. This prevents the handle grip from being overloaded and also keeps the handle grip free of snow, mud or slush. A rubber sheath (621) prevents the cart from slipping. The ground prop also serves as a second handle when two people carry a fully-loaded cart up or down stairs. The prop assembly is fastened to the main tube by a machine screw (623) that runs through both arms and the main tube, and by another screw (627) that draws the prop arms (619) up against the base of the handle via a washer that pulls up on a cross-bolt (625) running between the two prop arms.

When the cart is unfolded by lifting the main handle away from the folded undercarriage, the forward ends of the lower support brackets (500) move with the main handle slider (609) until their forward tabs push up under the support prop arms (619). When the main handle support strut (610) is pressed into place, these forward tabs wedge more firmly under the support prop arms. This wedging action helps to increase the stiffness of the lower mounting bracket assembly.

The ski/board adaptor lever (508) carries the edge guide (513) at one end. For mounting skis, the edge guide must be in the position adjacent to the main platform. Part of the ski holding strap assembly is attached to a ring or rectangular loop (507) that can slide over the combined thickness of the lower support bracket and the adaptor lever. This ensures that skis of different widths will all be held snugly when the ski holding strap (503) is tightened. The loop also prevents the adaptor lever from rotating under high loads. Adjacent to the loop, the buckle is sheathed by a short length of tight-fitting rubber tube (521) that will not easily slide against the skis, helping to hold the skis firmly.

The side-release buckle of the other half of the strap assembly has a rubber pad (519) bonded to its lower surface. The pad contributes to holding the skis firmly, but also raises the buckle off the surface of the skis so that the buckle is easier to insert and release. The ladderlock fitting incorporated into the male part of the buckle is used to draw the strap assembly tight. To achieve a firmer hold with less effort, a low-friction style of ladderlock is used with a finely-woven grade of polyurethane webbing strap.

The cradling surfaces of the adaptor lever and edge guide are sheathed with a non-slip rubber or vinyl coating to protect the skis and to help hold the pair of skis in place. The eye of the edge guide (513) can be filled with epoxy putty or some other suitable filler material in order to provide two flat surfaces for carrying instruction decals. The decals illustrate the correct orientations for mounting skis and snowboards respectively, and are placed so that the adaptor lever will be in the correct position for the intended type of equipment if the corresponding decal faces upwards. Consistent with the color coding scheme described earlier, the decal for the snowboard illustration has a blue background and that for the ski position has a red background.

The elbow of the lower mounting bracket is protected by a bumper (515), in this case formed by wrapping rubber cord around the elbow. The bumper also serves to prevent the strap-holding ring from sliding down the bracket and interfering with the seating action at the main handle slider. The elbow is located so that there is enough room for the ski poles to remain in place when the handle is folded down for the roll-aboard configuration or for storage. The length and riderail positioning of the lower mounting bracket is such that the main handle can fold completely without the main handle slider running into any obstructions.

The main handle strut incorporates a top plate (613) that is held in place by cable ties at each end. The top plate carries an instructional decal.

The binding shoes (402) may be manufactured by cutting discs off three-inch diameter PVC bar stock or other suitable material, followed by further trimming and drilling. The forward-facing angle of the resulting keystone shape serves as a reminder of the direction in which the skis must hang as they are mounted.

FIG. 15a Dimensions, Upper and Lower Mounting Brackets.

The adaptor lever (508) has an indexing arrangement which holds it in different positions for skis and snowboards. The method shown uses a small ball bearing (511) that is held in a stepped hole by three indentations around the rim of the larger hole. The spring loading for the indexing action is provided by the flexibility of the selector lever and the lower mounting bracket.

Dimensions in FIG. 15a that are shown in millimeters relate to ski and snowboard dimensions, which are universally specified in SI units.

The overall height of the binding shoes (402) above ground level is sufficient to allow skis and snowboards to clear the ground when the cart is the upright and walking positions. The dimension between the binding shoes and the lower mounting bracket (500) is sufficiently short to allow all but the very smallest ski bindings to fit.

The lateral position of edge guide (513) relative to the binding shoes aligns the bottom of the skis just in front of the wheel hub, and the relative transverse position keeps the bottoms of the skis to the inside of the wheel. These positions are important for aligning the skis correctly to satisfy the constraints of the walking geometry.

FIG. 16 Stirrups for Ski Poles.

The ski pole stirrups (703) each support the baskets of a pair of poles. They are mounted so as to present the face of the loop upwards and forward to readily receive the tips of the ski poles. The loops are made of a flexible material with an upward-facing flat surface to accept an instruction decal. This design allows ski poles to remain in place when the cart is folded, because the poles can move outwards and backwards when pushed by the lower mounting brackets as they fold. The stirrup flexibility also allows the unit to be stored in less space and eliminates the hazard that would arise from rigidly projecting receptacles.

The stirrup location is such that the poles or baskets don't interfere with the wheels in any rolling position. This embodiment of the stirrups is obtained by using the roughly triangular sections trimmed off the Bag Boy M300 tires, and mounting the pieces to a mesh cross-bar using cable ties, taking advantage of the section properties to achieve the desired stirrup shape and orientation.

FIG. 17 Bottom End of Platform and Support Cables.

The flange (311) of the boot deck mesh forms the base structure for the bottom end of the main platform. To provide additional room for the boots and to support the lowest boot harness anchor wire (309) in the correct position, the right angle of the as-manufactured flange is increased to about 115 degrees by cold bending. In this view the boot anchor wire is shown in the folded-down position, without the webbing straps.

The corner bumpers (324) protect users' legs from injury, and influence the angle of the main platform for the upright cart position. They are held in place by cable ties and are furnished with metal studs (329) to protect the cable ties from abrasion and to prevent the cart from rolling on icy ground. Length of ¾" diameter aluminum tubing serve as spacers (327) between the bumper body and the mesh. The bumpers shown are fabricated by adapting the tips of the upper golf-bag cradle on the Bag Boy M300 cart.

The platform bracing cables (107) extend down to their attachment points on the wheel mounts. The locations at which they are bolted onto the mesh flange are such that they reduce the compressive load on the undercarriage deployment struts, stiffen the main platform against rotation relative to the undercarriage, and restrain the cantilevered tail of the boot deck from bowing under the load of resting on the corner bumpers.

FIG. 18 Boot Securing Straps, Threading Diagram.

The weight and high center of gravity of ski boots exert a significant overturning moment on the boots when they are carried cantilevered out from the boot deck as in this embodiment. To hold the boots firmly down on the deck and prevent them from lozenging downwards, a strapping arrangement that produces high hold-down forces is desirable. FIG. 18 is a schematic for a strap routing that doubles the tension imparted to the free strap-ends.

This arrangement provides a loop of webbing that is never disconnected, forming an arch into which a boot can easily be guided. Placing the ladder-lock buckles (319) at the sides of the boots allows a user to pull directly upwards against the strap-ends (313) to tighten the harness. Having separate strap-ends makes it easier to keep the connecting ring (315) in the center of the boot. Once the straps are adjusted for a particular boot size, releasing and re-mounting a boot can be done using just one of the two strap-ends.

The ladder-lock buckles used are selected for low tightening and loosening resistance and for having a large integrated release tab. Webbing strap of a fine weave is chosen to provide for easier tensioning. To reduce the degree of tensioning required, the surface of the webbing straps in contact with the uppers on the boots could be treated with a suitable non-slip coating.

The connecting ring is provided with a rubber pad (317) that helps to restrain the boot and lifts the strap loops clear of the boot to reduce interference with the strap movement. The ideal connecting ring would be selected to function as a compact back-to-back pulley, being rectangular rather than circular, about one inch wide in the direction of the straps, and formed from about ⅛" diameter chrome-plated wire.

The three-bar buckles (321) anchor each half of the strapping arrangement. Sewing or rivets could be used instead to give a more compact arrangement.

The height of an intermediate anchor wire (305) apex above the deck mesh is about two inches. This is low enough to ensure that tension generated in the straps is directed downwards to help seat the boot, rather than laterally into an adjacent strap. This also allows for sufficient strap adjustment to accommodate children's boots. The loop at the apex is large enough to allow two layers of ¾" webbing strap to nest within it.

Two possible forms of anchor wire termination are shown. The first is a loop formed into the wire itself, and the second makes use of a stake-eye swaged onto the wire.

FIG. 19 Wheel Receiver, Support Cables.

The figure shows the right-hand wheel receiver, viewed from behind and below. Two bracing cables are connected to the rear most of two machine screws that connect the wheel receiver to the undercarriage arms. The cables' attachment point and routing are such that they decrease load on vulnerable parts of the wheel receiver and reduce undercarriage deflections as well as structural deflection at other locations on the cart. This reinforcement is required because in this application the undercarriage is not fully deployed, resulting in load paths different from those for which the components were originally designed. Also, the loads carried by the undercarriage are substantially higher than would be the case for the intended golf pull-cart application.

The platform bracing cable (107) helps to counteract the moment that is produced because the wheel's axle is forward of the connections to the undercarriage arms. The transverse bracing cable (104) counteracts the splaying forces on the undercarriage as well as the tendency of the wheels to develop negative camber under load. The hole through which the cable passes is bushed by the shell of an aluminum rivet.

FIG. 20 Upper Section Structures, Main Locking Cable Stowage.

The structures in this area transfer load from the upper mounting bracket (400) into the main tube (201) via the cradle (207) and the upper cross-brace (203). The cradle is a molded a resin fitting adapted from the upper cradle of the golf cart and relocated to the other end of the golf cart's main tube. Fasteners from the upper mounting bracket (not visible in this view) pass through the flange of the wire mesh (333) and through the upper diaphragm of the cradle, where fender washers distribute the load.

Machine screws (335) or other fasteners from the main surface of the platform extend down to a land on the underside of the cradle, providing a second load path from the platform into the main tube. The open cavity generated by truncating the cradle to the correct height is covered by an aluminum plate (209) held in place by these same screws.

To protect the ski poles from damage and help keep them in place, buffers (709) line the projecting edge of the wire mesh flange. The buffers shown are formed by wrapping rubber strips around the cross-bar.

The upper cross-brace provides a third load path, with rivets connecting the brace to the side rails in order to transfer the shear loads that counter roll of the platform relative to the main tube.

The main locking cable (1001) is coiled so that it is easily stowed in the corner as shown, partially underneath the upper cross-brace and the main tube. This storage position keeps it from getting in the way of the pair of ski poles carried on that side. To protect against theft of the cart itself, the main cable's one end is pushed onto the main tube during cart assembly. The stowed cable is kept in place by a harness (1006) that terminates with a length of hook-and-loop fastener.

The gap between the main tube and the underside of the mesh in the next bay down provides a convenient place to keep a laminated instruction card, tethered to the frame by a length of light-duty shock cord.

The cable anchoring the security bag (805) loops through the side-rail holes and then continues (not shown) across the wire mesh portion by looping around the cross-bar in order to anchor the base of the small mesh panel, as described earlier.

FIG. 21 Locking: Skis and Security Bag, General View.

The locking post (900) at the midpoint of the cross-handle (407) is the central node for all the locking functions on the cart.

This view shows the general layout of the two ski-locking cables (1008) and the security-bag locking cable (806) threaded through the locking post, without the lock installed.

FIG. 22 Ski and Bag Locking Cables Threaded Through Locking Post.

The locking post secures the cables by turning the outer cylinder (903) relative to the inner bolt (901), so that the aperture through which the locking cable passed is reduced by the offset in the holes. Locking lugs swaged or bonded to the locking cables prevent withdrawal of a cable from the locking post when the padlock maintains the inner and outer sets of holes in the offset position.

The locking lugs are preferably provided with a faring on each side to facilitate easier threading and withdrawal. For small-volume production, the faring can be provided by metal beads or by adapting teardrop-shaped zinc fishing sinkers to the diameter of the locking cables. Farings can be swaged, bonded or soldered in place on the cables, which are typically 3/32" or 1/8" diameter.

For easy cinching and opening, the security bag cinching and locking cable (806) should use 7×19 or similarly fine-wired cable that provides greater flexibility.

A spacer (907) positions the head of the locking post bolt a short distance above the cross-handle, to create the seat used by the snowboard-holding shock-cord loop.

For higher-volume production, an alternative locking-post arrangement would have the locking function achieved by the cross-tube in combination with an internal cross-bolt. Such an arrangement would place the holes for the ski-locking cables adjacent to their ends of the cross-tube, with the hole set for the lock next to one of these. The hole-set for the security bag locking cable would remain at the center of the tube. Such an arrangement would make threading and removing the cables and lock easier, and would leave the center of the cross-tube free to be used as a lifting handle.

FIG. 23 Locking, Skis and Pales.

The skis and poles are locked by the same locking cable. The double wrap of cable around the pair of skis improves the security of the arrangement by making it more difficult for any slack in the locking cable to expand the circumference enough to allow a binding to slip through.

FIG. 24 Locking Cable Path for Ski and Pole Locking, Viewed from Above.

This view of the cable path for ski and pole locking is from directly above the upper mounting bracket, with the pair of skis sectioned for clarity. To allow the ski poles to be locked in addition to the skis, looping of the cable around the skis must start in the correct direction so that it can thread through the pole locking loop on the correct side of the upper bracket assembly. The arrows show the direction of cable threading.

FIG. 25 Locking Post with Index Lever.

The main parts of the locking post are the inner bolt and the outer cylinder, the latter being able to rotate over the inner— which is bolted to the cart's structure. The locking post has sets of aligned radial holes arranged in two groups. The first group comprises the holes through which the locking cables pass. When the locking post is in the threading position, the threading holes through the bolt and the cylinder are aligned, so that cables can be threaded through. FIG. 25 shows the locking post in the threading position.

The second group of holes is for the padlock, just visible in the view of FIG. 25. When the outer cylinder is turned so that the padlock holes in the bolt and the outer cylinder align, the cable holes are partially closed by the offset. For a combination of 3/32" and 1/8" cables running through the same locking post, an angle of offset of about 32 degrees provides sufficient overlap to prevent locking lug withdrawal without pinching the cables.

To ease passage through the locking post, the outside of the holes in the cylinder are countersunk both sides, with the exception of the padlock hole, which is only countersunk on the side from which the lock is inserted.

FIG. 25a Axial Locking Post Assembly.

The locking post assembly comprises the following components, listed from top to bottom:

9001 bolt, 5" long by 1/2" diameter.
9002 spacer for board shock cord.
9003 short compression spring, 1/2" I.D., between top of cylinder and cross-tube, to keep cylinder in place axially.
9004 hardened shim washer between top of cylinder and bottom of compression spring, to prevent spring ends from gouging the top of the cylinder, which may be of aluminum.
9005 indexing plunger, comprising a steel ball and compression spring mounted in a stepped radial hole in the bolt. The ball engages with a pair of radial holes in the cylinder when the cylinder is aligned for threading and for locking.
9006 outer cylinder with two pair of holes for ski locking cables, one pair of holes for bag locking cable, one offset pair of holes for the padlock, and one pair plus a single small diameter hole for indexing the ball plunger and carrying the mounting stub-axles of the index lever.
9007 shim washers, used to provide a positive axial locating surface for the cylinder so that its holes are properly aligned with the holes in the bolt.
9008 circlip mounted in a groove in the shank of the bolt at a level just above where the bolt enters the u-bracket.
9009 washer and nut, pulling the circlip down against the u-bracket, mesh flange, spacer plate and cradle upper diaphragm through which the bolt is mounted.

In principle, this design of locking post is such that it can be adapted to accommodate any number of locking cables for this or other unrelated applications. For example, an additional set of holes could be added for a locking cable used to provide security for ski boots.

FIG. 25b Transverse Locking Tube Assembly.

Another embodiment of the locking post assembly of FIG. 25a is achieved by placing the locking assembly transverse to the axis of the platform, and selecting the length so that it spans the width of the deck. This preferred embodiment provides easier access to the cable holes and provides a cross-bar to serve as an upper handle for the cart.

FIG. 26 Padlock Insertion into Axial-Type Locking Post.

Before inserting the padlock, the padlock holes in the cylinder must be aligned with those in the bolt. To help align the holes correctly, an index lever (905) stops cylinder rotation at the correct positions for both threading and locking. The two index lever positions are visually indicated by instruction decals mounted on the cross-handle, with decal tape of the matching color positioned on the index lever itself, so that the instruction decal on the cross-handle and the tape on the lever are next to each other when the lever and outer cylinder are in the position indicated by the decal.

For the particular upper bracket assembly shown in these figures, when a padlock with a standard shank length is used rather than one with a long shank, the lock must be inserted as shown in FIG. 26 in order for the body of the lock to clear the surrounding obstacles.

When the main locking cable is stiff, aligning and inserting the padlock is made easier by providing links between the main locking cable and the lock.

The bag cinching and locking cable (806) is anchored by hog rings to a loop at the mouth of the mesh bag so that, when the cable is drawn through the thimble (811), the cable runs toward the locking post at about the same angle that the cable will lie in once the cylinder is turned to the locked position. Since the cinching cable sometimes requires a fair amount of tension to keep the locking lug on the far side of the locking post, having the proper approach angle allows the indexing plunger to hold the cylinder in the locked position while the padlock is guided into place.

The thimble mounted in the fixed loop of the cinching cable allows the cable to slide more easily when being drawn through under tension.

FIG. 27 Locking, Snowboard.

By arranging for ski locking to be achieved by a double wrap of the ski locking cable, ski and board locking can be achieved using the same locking cable with only two locking lugs mounted on the cable for adjustment to different working lengths.

The figure shows the cable routing for securing a snowboard. Threading the locking cable underneath the diagonal portion of the locking cable ensures that the cable loop is small enough that bindings can not be slipped out. For some binding designs, it may be possible to secure the board by threading the locking cable through the binding itself.

The locking cable must be threaded without mounting the board-holding shock-cord loop. The loop can be hooked on to the center post after threading, if needed.

FIG. 28 Spring Clip for Padlock Retention.

The spring clip shown in FIG. 26 ensures that the lock is always retained on the locking cable, while at the same time allowing for a flexible connection that permits easy lock alignment. The coils of the clip grip the shank of the lock and resist the deflection needed to move around the bend in the shank. The clip is manufactured by coiling suitable wire on a mandrel slightly smaller than the shank of the lock for which it is intended. To shield users from sharp coil ends, the clip may be assembled with a short length of thin-walled plastic tubing such as heat shrink tubing covering the coils.

I claim:

1. A ski equipment and accessories transport device comprising:
   (a) a hand-cart configured for a user to adjust an attitude of the hand-cart until a load supported by the hand-cart is substantially balanced for rolling travel about a wheel axis of the hand-cart;
   (b) at least one ski mount assembly supported by the hand-cart and configured to hold a pair of skis joined to the hand-cart by the ski mount in a substantially vertical attitude when said hand-cart is substantially balanced for rolling travel;
   (c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;
   (d) said pair of skis is held in such a way by said ski mount assembly that said pair of skis is positioned outside the planar surface of said plate;
   (e) the securable container joined to the plate, the securable container further accommodating at least one item of the user in addition to the at least one pair of shoes, and
   (f) a locking apparatus configured to lock the hand-cart and the securable container to a structure.

2. The device of claim 1, wherein said securable container comprises:
   (a) a cable mesh bag, and;
   (b) at least one flexible elongated security element configured to securely close the cable mesh bag.

3. A ski equipment and accessories transport device comprising:
   (a) a hand-cart configured for a user to adjust an attitude of the hand-cart until a load supported by the hand-cart is substantially balanced for rolling travel about a wheel axis of the hand-cart;
   (b) at least one ski mount assembly supported by the hand-cart and configured to hold a pair of skis joined to the hand-cart by the ski mount in a substantially vertical attitude when said hand-cart is substantially balanced for rolling travel;
   (c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;
   (d) said pair of skis is held in such a way by said ski mount assembly that said pair of skis is positioned outside the planar surface of said plate; and
   (e) the ski mount assembly including:
      (i) a ski horn configured to support said pair of skis from one toe binding of said pair skis;
      (ii) a lower ski bracket located at a predetermined distance below said ski horn;
      (iii) a lateral ski rest extending past at least one edge of the pair of skis; and
      (iv) a strap or elastic cord configured to releasably urge the pair of skis against at least the ski horn and the lower ski bracket.

4. A ski equipment and accessories transport device comprising:
   (a) a hand-cart configured for a user to adjust an attitude of the hand-cart until a load supported by the hand-cart is substantially balanced for rolling travel about a wheel axis of the hand-cart;
   (b) at least one ski mount assembly supported by the hand-cart and configured to hold a pair of skis joined to the hand-cart by the ski mount in a substantially vertical attitude when said hand-cart is substantially balanced for rolling travel;
   (c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;
   (d) said pair of skis is held in such a way by said ski mount assembly that said pair of skis is positioned outside the planar surface of said plate; and
   (e) at least one set of ski pole mounts configured to releasably attach at least one pair of ski poles to the hand-cart, and comprising:
      (i) an upper mount comprising at least two elongated non-slip resilient members, each member flexed into an arc such that in combination the two members form a saddle to receive a pair of shafts of the at least one pair of ski poles, and further incorporating flexible non-slip elements tensioned by fastening means to draw the at least two resilient members together so as to conformingly hold the at least one pair of ski poles in place; and (ii) a lower mount comprising at least one loop formed from a flexible yet resilient material, and positioned to accept the tips of the at least one pair of ski poles and support baskets of the at least one pair of ski poles.

5. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate;

(e) the securable container joined to the plate of the platform, and at least one locking cable for securing at least the hand-cart and at least the securable container;

(f) at least one locking device capable of securing a set of locking cables that includes the at least one locking cable by use of a single lock; and (g) each cable of the set of locking cables being configured with such predetermined length and anchoring location so as to secure an item when each at least one locking cable is also held by the at least one locking device.

6. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate;

(e) at least a portion of the plate is constructed from sheet material;

(f) at least one set of elastically-urged heel and toe clips is pivotally mounted to the plate and adapted to releasably join the at least one pair of ski boots to the plate;

(g) apertures are formed integrally into the sheet material to receive at least portions of the heel and toe clips therethrough;

(h) each of the heel and toe clips is positioned on the plate so that each ski boot of the at least one pair of ski boots is joined to the plate alongside the other ski boot of the at least one pair of ski boots; and (i) at least one bale is joined to each said toe clip, said bale spanning between legs of each toe clip and sliding on the underside of the sheet material.

7. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate;

(e) a main handle having at least one deployed position capable of supporting the loaded weight of the hand-cart when the hand-cart is tipped forward so as to rest a forward portion of the main handle on the ground;

(f) the main handle incorporating at least one stand-off proximate to a grip of the main handle and positioned to keep the grip clear of contact with the ground; and (g) an undercarriage assembly including a pair of wheels, the platform and the main handle so disposed relative to one another such that the platform rests at a substantially horizontal attitude when the pair of wheels contacts and the at least one stand-off of the main handle rests on the ground.

8. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate;

(e) a U-shaped bottom handle/stand assembly pivotally joined to a lower end of the platform and indexable to be held in at least three predetermined positions:

(i) a first or unrotated storage position;

(ii) a second or partially-rotated position wherein the handle/stand provides support for the hand-cart to rest with a pair of wheels in a wide-stance mode, and wherein the handle/stand may also serve as a lifting handle for the lower end of the platform; and (iii) a third or fully-rotated position, wherein the handle/stand provides support for the hand-cart to rest stably upright with the pair of wheels in a narrow-stance mode.

9. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate;

(e) a lower ski mounting bracket slidably and pivotably connected to a main handle of the hand-cart;

(f) the lower ski mounting bracket arranged to releasably hold the main handle of the hand-cart in place for a wide-stance mode of an undercarriage joined to the hand-cart;

(g) the lower ski mounting bracket and the main handle of the hand-cart arranged to jointly fold proximate to an underside of the platform; and (h) the main handle of the hand-cart incorporates a predetermined pivot location for a set of undercarriage deployment struts such that the undercarriage may be selectively deployed for rolling travel in either a narrow-stance mode or the wide-stance mode.

10. A ski equipment and accessories transport device comprising:

(a) a hand-cart configured for a user to adjust an attitude of the hand-cart until a load supported by the hand-cart is substantially balanced for rolling travel about a wheel axis of the hand-cart;

(b) at least one ski mount assembly supported by the hand-cart and configured to hold a pair of skis joined to the hand-cart by the ski mount in a substantially vertical attitude when said hand-cart is substantially balanced for rolling travel;

(c) a platform supported by the hand-cart and extending substantially from proximate said ski mount assembly to a lower end portion of said hand-cart, the platform including a plate defining a planar surface of sufficient area to carry at least one pair of ski boots and a securable container sufficiently voluminous to accommodate at least one pair of shoes;

(d) said pair of skis is held in such a way by said ski mount assembly that said pair of skis is positioned outside the planar surface of said plate; and (e) the ski mount assembly includes:

(i) at least one ski horn configured to engage a toe piece of a binding of said pair of skis nested with bindings opposed; and (ii) at least one locking cable with one end fixed proximate to the at least one ski horn and the at least one locking cable is configured to loop around said pair of skis intermediate to heel and toe pieces of said bindings, and thereafter to pass through an aperture proximate to the at least one ski horn, and thereafter to be held by a locking device in such a way as to maintain a loop small enough to prevent the bindings from being withdrawn from the cable loop.

11. At least one ski pole mounting apparatus joined to a ski-transporting cart and configured to releasably mount a pair of ski poles on the ski-transporting cart, and comprising:

(a) an upper ski pole mount including at least two elongate non-slip resilient members wherein:

i. a longitudinal axis of the elongate members is oriented so as to be substantially parallel to an axis between the upper ski pole mount and a lower ski pole mount;

ii. the ends of each of the elongate members are joined to the cart such that the elongate members are held in the form of an arc;

iii. the elongate members are further joined to the cart such that their longitudinal axes are substantially parallel to each other and separated by a dimension suitable to allow accommodation of a pair of nested shafts of the pair of ski poles;

iv. fastening means are joined to the elongate members and configured so as to conformingly draw the elongate members together about the nested shafts of the pair of ski poles, and;

(b) the lower ski pole mount joined to the ski-transporting cart and configured to include:

i. at least one closed loop defining a plane approximately perpendicular to the axes of the elongate members of the upper ski pole mount;

ii. the at least one closed loop made of a material flexible enough to give way fully elastically if bumped yet stiff enough to support the weight of the pair of ski poles;

iii. one diametral end of the closed loop forming a neck section joined to the cart, and;

iv. the closed loop having a loop diameter sized to accept both nested tips of the ski poles and also to support at least one basket of the pair of ski poles when nested together.

12. A hand-cart adapted to carry snowsports equipment and configured for a user to adjust an attitude of the hand-cart about a wheel axis of the hand-cart to balance a load supported by the hand-cart during rolling travel, further including:

(a) an undercarriage assembly arranged to have a first or fully deployed stance such that the undercarriage assembly holds a pair of wheels at a predetermined distance away from a main load-carrying structure of the hand-cart, and the undercarriage assembly is also arranged to have a second or partially deployed stance holding the pair of wheels tucked close to the main load-carrying structure of the hand-cart, and each of the undercarriage assembly stances maintains a rolling axis of the pair of wheels co-axial and capable of supporting the hand-cart for rolling travel in a direction parallel to a primary longitudinal axis of the hand-cart;

(b) a U-shaped handle/stand joined by a pair of pivots to a lower end of the hand-cart, and positionable by an indexing apparatus in at least three predetermined positions dorsal to the main load-carrying structure of the hand-cart;

(c) the handle/stand having a first or unrotated storage position lying in apposition to a dorsal portion of the main load-carrying structure of the hand-cart;

(d) the handle/stand having a second or partially-rotated position wherein an outboard portion of the handle/stand may be positioned by a user to rest on the ground to the rear of the lower end of the hand-cart, when the undercarriage assembly is placed in the fully deployed stance, and the handle/stand when placed in the partially-rotated position is configured to also serve as a lifting handle for the hand-cart, and;

(e) the handle/stand having a third or fully-rotated position, wherein the outboard portion of the handle/stand may be positioned by a user to rest on the ground to the rear of the lower end of the hand-cart to support the hand-cart stably in an upright position when the undercarriage assembly is placed in the second or partially deployed stance, and the handle/stand in the fully rotated position is also arranged to serve as a lifting handle for the hand-cart.

13. Apparatus joined to a ski-carrying cart and configured to lock a pair of skis to the ski-carrying cart, with the apparatus comprising:

(a) at least one ski horn configured to support a toe binding of a first ski of the pair of skis and including a male element having predetermined proportions for insertably engaging a toe slot of the toe binding;

(b) at least one locking cable with one end affixed to a structure directly supporting the male element, and the at least one locking cable configured to be looped by a user around the pair of skis between the heel and toe bindings and thereafter to pass through an aperture affixed to the structure directly supporting the male element, and thereafter the cable is equipped to be engaged by a locking device affixed to the ski-carrying cart, with the cable capable of being held by the locking device in such a way as to maintain a loop small enough to prevent the pair of ski bindings from being withdrawn from the cable loop, and;

(c) the at least one locking cable in combination with the locking device is equipped with means to adjust a locked length of the locking cable to suit a sectional dimension of the skis and bindings enclosed by the cable loop.

\* \* \* \* \*